United States Patent
Maekawa et al.

(10) Patent No.: US 9,827,613 B2
(45) Date of Patent: Nov. 28, 2017

(54) METHOD FOR PRODUCING METAL MICROPARTICLES

(71) Applicant: M. TECHNIQUE CO., LTD., Izumi-shi, Osaka (JP)

(72) Inventors: Masaki Maekawa, Izumi (JP); Masakazu Enomura, Izumi (JP)

(73) Assignee: M. TECHNIQUE CO., LTD., Izumi-shi, Osaka (JP)

( * ) Notice: Subject to any disclaimer, the term of this patent is extended or adjusted under 35 U.S.C. 154(b) by 261 days.

(21) Appl. No.: 14/411,792

(22) PCT Filed: Sep. 12, 2013

(86) PCT No.: PCT/JP2013/074756
§ 371 (c)(1),
(2) Date: Dec. 29, 2014

(87) PCT Pub. No.: WO2014/042227
PCT Pub. Date: Mar. 20, 2014

(65) Prior Publication Data
US 2015/0283616 A1  Oct. 8, 2015

(30) Foreign Application Priority Data

Sep. 12, 2012 (JP) .................................. 2012-201027
Oct. 2, 2012 (WO) ................... PCT/JP2012/075464
(Continued)

(51) Int. Cl.
*B22F 9/24* (2006.01)
*B22F 1/00* (2006.01)
(Continued)

(52) U.S. Cl.
CPC ............... *B22F 9/24* (2013.01); *B01J 2/10* (2013.01); *B22F 1/0014* (2013.01); *C22B 11/04* (2013.01);
(Continued)

(58) Field of Classification Search
None
See application file for complete search history.

(56) References Cited

U.S. PATENT DOCUMENTS 8,747,699 B2   6/2014   Enomura
2004/0112477 A1   6/2004   Hattori et al.
(Continued)

FOREIGN PATENT DOCUMENTS

CN   101495257 A   7/2009
CN   101790430 A   7/2010
(Continued)

OTHER PUBLICATIONS

Mizutani et al., "Size control of magnetite nanoparticles in hydrothermal synthesis by coexistence of lactate and sulfate ions," Current Applied Physics, vol. 10, No. 3, May 2010 (Available online Oct. 2, 2009), pp. 801-806, XP026832425.
(Continued)

*Primary Examiner* — George Wyszomierski
(74) *Attorney, Agent, or Firm* — Birch, Stewart, Kolasch & Birch, LLP

(57) ABSTRACT

Provided is a method for producing metal microparticles in which the ratio of crystallite diameter to the particle diameter of the metal microparticles is controlled. At least two types of fluid to be processed are used, including a metal fluid in which a metal or a metal compound is dissolved in a solvent, and a reducing agent fluid which includes a reducing agent. Sulfate ions are included in one or both of the metal fluid and the reducing agent fluid. The fluid to be (Continued)

processed is mixed in a thin film fluid formed between at least two processing surfaces, at least one of which rotates relative to the other, and which are disposed facing each other and capable of approaching and separating from each other, and metal microparticles are precipitated. The present invention is characterized in that at this time, the ratio (d/D) of the crystallite diameter (d) of the metal microparticles to the particle diameter (D) of the metal microparticles is controlled by controlling the molar ratio of metal and sulfate ions in the mixed fluid to be processed.

20 Claims, 36 Drawing Sheets

(30) Foreign Application Priority Data

Dec. 28, 2012 (JP) ................................ 2012-288327
Feb. 12, 2013 (JP) ................................ 2013-024473

(51) Int. Cl.
  *C22B 3/00* (2006.01)
  *C22B 15/00* (2006.01)
  *B01J 2/10* (2006.01)
(52) U.S. Cl.
  CPC ...... *C22B 15/0089* (2013.01); *C22B 23/0461* (2013.01)

(56) References Cited

U.S. PATENT DOCUMENTS

| | | |
|---|---|---|
| 2008/0028889 A1 | 2/2008 | Irizarry-Rivera et al. |
| 2008/0148904 A1 | 6/2008 | Tomonari et al. |
| 2009/0025510 A1 | 1/2009 | Lee et al. |
| 2010/0009191 A1 | 1/2010 | Kuba et al. |
| 2010/0155310 A1* | 6/2010 | Enomura .............. B01F 3/0807 209/668 |
| 2010/0243947 A1* | 9/2010 | Enomura .............. B01D 9/0054 252/62.55 |
| 2010/0327236 A1 | 12/2010 | Enomura |
| 2013/0333520 A1 | 12/2013 | Enomura |
| 2014/0155247 A1 | 6/2014 | Aoyagi et al. |
| 2015/0174660 A1 | 6/2015 | Maekawa et al. |

FOREIGN PATENT DOCUMENTS

| | | |
|---|---|---|
| EP | 2177294 A1 | 4/2010 |
| JP | 2004-124257 A | 4/2004 |
| JP | 2006-28637 A | 2/2006 |
| JP | 2006-97116 A | 4/2006 |
| JP | 2007-169680 A | 7/2007 |
| JP | 2007-197836 A | 8/2007 |
| JP | 2008-31526 A | 2/2008 |
| JP | 2008-255377 A | 10/2008 |
| JP | 2009-24254 A | 2/2009 |
| JP | 4335968 B2 | 9/2009 |
| JP | 2011-195888 A | 10/2011 |
| JP | 2012-52240 A | 3/2012 |
| JP | 2012-92295 A | 5/2012 |
| JP | 5126862 B1 | 1/2013 |
| JP | 5261780 B1 | 8/2013 |
| JP | 5376483 B1 | 12/2013 |
| WO | WO 2007/143125 A2 | 12/2007 |
| WO | WO 2009/008390 A1 | 1/2009 |
| WO | WO 2012/014530 A1 | 2/2012 |
| WO | WO 2012/124046 A1 | 9/2012 |
| WO | WO 2013/008706 A1 | 1/2013 |

OTHER PUBLICATIONS

Zhang, "Doctoral Thesis: Electrochemical Synthesis of Titanium Dioxide Nano Composite Powder," Kunming University of Science and Technology, Mar. 15, 2004 (thesis filed Jun. 30, 2003), with partial English translation, 11 pages.

* cited by examiner

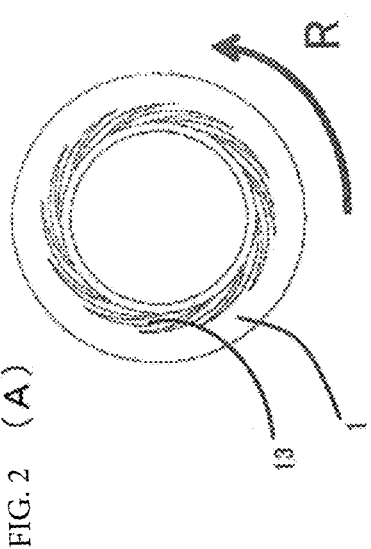
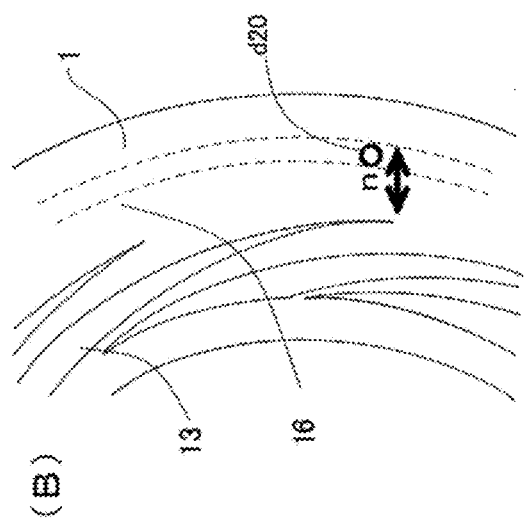
FIG. 2 (A)
FIG. 2 (B)

METHOD FOR PRODUCING METAL MICROPARTICLES

The present invention relates to a method for producing metal microparticles.

In recent years, metal microparticles are wanted in a wide range of field including a catalyst, an electrically conductive material, a magnetic material, a secondary electron emission material, a luminous material, a heat absorber, an energy storage material, an electrode material, and a color material; and microparticles having the particle diameter and particle diameter distribution thereof controlled in accordance with the purposes are being used. In addition, physical properties of the metal microparticles are different depending on the crystallite's diameter thereof; therefore, for example, even in metal microparticles having the same particle diameter, the microparticles having small crystallites can be burnt at a low burning temperature, while those having large crystallites can suppress the shrinkage after a heat treatment. Accordingly, to control the crystallite's diameter of metal microparticles, especially to establish a technology to control the ratio of the crystallite's diameter to the particle diameter of metal microparticles is extremely useful.

Generally, the crystallite means the maximum congregate that can be considered to be a single crystal; and the size of this crystallite is called as the crystallite diameter. To measure the crystallite diameter of microparticle, there are a method that lattice fringe of the crystallite is confirmed by using an electron microscope and a method that the crystallite diameter is calculated from the diffraction pattern obtained by using an X-ray diffraction apparatus and the Scherrer equation.

$$\text{Crystallite diameter } D = K \times \lambda / (\beta \times \cos \theta) \quad \text{Scherrer equation}$$

Here, for calculation, K, the Scherrer's constant, is K=0.9; $\lambda$ is the wavelength of the X-ray tube used; $\beta$ is the half-width; and $\theta$ is the diffraction angle.

With regard to the method for producing metal microparticles, various methods have been proposed.

For example, nickel microparticle, which is a widely used material as an electrically conductive material including a laminated ceramic condenser and a substrate thereof, as well as an electrode material, can be produced by the methods which are roughly classified into a gas phase method and a liquid phase method.

In Patent Document 1, the nickel powder having, relative to total number of the particles, 20% or less as the number of the particles which have the particle diameter of 1.5 times or more relative to the average particle diameter (D50 value) as obtained by the particle diameter distribution measurement by the laser diffraction scattering method, while having, relative to total number of the particles, 5% or less as the number of the particles which have the particle diameter of 0.5 times or less relative to the average particle diameter (D50 value), and also having 400 Å or more as the average crystallite's diameter in the nickel particles, is described. Also, it is described therein that this nickel powder is obtained by the way in which after the nickel powder produced by the wet method or the dry method is mixed with fine powder of an alkaline earth metal compound or by the way in which surface of each of the nickel powders is coated with the alkaline earth metal compound, these are heat-treated at the temperature lower than the melting temperature of the alkaline earth metal compound in the atmosphere of an inert gas or a slightly reductive gas; and it is further described that the powder having the average particle diameter in the range of 0.05 to 1 pin as measured by the SEM observation is preferable.

In Patent Document 2, the nickel fine powder is described which is obtained by vaporizing the nickel by the thermal plasma followed by condensing and then making it fine powder; this powder having the number-average particle diameter in the range of 0.05 to 0.2 µm as measured by the scanning electron microscopic observation, the sulfur content therein being in the range of 0.1 to 0.5% by mass, and the ratio of the coarse particle with the size of 0.6 µm or more contained in the nickel fine powder being 50 ppm or less based on the number thereof. Besides, it is described that this nickel fine powder has its crystallite's diameter of preferably 66% or more relative to the foregoing number-average particle diameter as measured by the X-ray diffraction analysis.

In Patent Document 3, the nickel nanoparticle which is obtained by the way in which a reducing agent, a dispersant, and a nickel salt are added to a polyol solvent to obtain a mixed solution, and then, after this mixed solution is stirred and heated, a reduction reaction is carried out by controlling the reaction temperature and time is described. Besides, it is described that the nickel microparticle having the uniform particle diameter as well as excellent dispersibility can be obtained.

Generally speaking, the particle size distribution of the nickel microparticle obtained by the gas phase method is widely spread, so that not only to make the particle diameter and the crystallite's diameter of the nickel microparticle uniform is difficult but also the energy cost in the production thereof becomes higher. In addition, in order to obtain the nickel microparticle having the narrow particle diameter distribution and the large crystallite's diameter as described in Patent Document 1 and also to obtain the nickel microparticle having a lower ratio of the coarse particle relative to the total and also having a larger ratio of the crystallite's diameter relative to the average particle diameter as described in Patent Document 2, the producing process thereof becomes complicated so that the energy consumption during the producing thereof becomes larger. Besides, there is a problem of contamination with foreign matters.

In the liquid phase method, as compared with the gas phase method, the particle diameter of the nickel microparticle can be controlled easier and the production cost thereof may be made low more easily; however, control of the crystallite's diameter is more difficult. In Patent Documents 3 and 10 later-mentioned, the particle diameter of the metal microparticle including the nickel microparticle is described; however, there is no description as to the crystallite's diameter thereof. Therefore, there has been no disclosure yet with regard to the method for producing the nickel microparticle whose ratio of the crystallite's diameter relative to the particle diameter of the nickel microparticle is controlled by the liquid phase method.

Silver microparticle, which is a widely used material such as an electrically conductive material and an electrode material, can be produced by general methods such as a supercritical method, a thermal decomposition method, an ultrasonic wave method, a laser abrasion method, a reverse micelle method, and a gas phase method; in addition, such a method as a microwave method as disclosed in Patent Document 4 may be exemplified. Furthermore, there is a liquid phase method, as shown in Patent Documents 5, 6, and 10, with which the particle diameter thereof can be controlled relatively readily, and the production cost thereof can be lowered readily.

The particle diameter distribution of silver microparticles obtained by these generally used conventional methods or by the method shown in Patent Document 4 is so wide that not only to make the particle diameter and crystallite's diameter of the silver microparticle uniform is difficult, but also the energy cost to produce it becomes high.

With the liquid phase method, as compared with the gas phase method, control of the particle diameter of silver microparticle is easier, and the production cost thereof can be lowered more readily; but control of the crystallite's diameter is difficult. In Patent Documents 5, 6, and 10, there are description with regard to the particle diameter of metal microparticles including silver microparticle; however, there is no description with regard to control of the crystallite's diameter relative to the particle diameter thereof.

Copper microparticle, which is a widely used material in the fields such as a laminated ceramic condenser and a printable electronics as electronically conductive material and electrode material, can be produced by many methods which include generally used methods such as a supercritical method, a thermal decomposition method, an ultrasonic wave method, a reverse micelle method, and a gas phase method; and in addition, there is a method such as the one described in Patent Document 7 in which an ammonia-containing gas is blown to the copper in the molten state. With regard to the liquid phase method with which control of the particle diameter thereof is relatively easy and the production cost thereof can be lowered readily, there are the methods as described in Patent Documents 8 to 11.

The particle diameter distribution of the copper microparticles which are obtained by generally used conventional methods and the method such as the one shown in Patent Document 7 are wide; and with these methods, not only to make the particle diameter and crystallite's diameter of the copper microparticle uniform is difficult, but also the energy cost in the producing thereof is high. For example, the metal copper microparticle which is described in Patent Document 7 is characterized by that the particle diameter thereof measured by the BET method is 3 µm or less, and the crystallite's size is in the range of 0.1 to 10 µm, with having a pearl-like shape. However, as shown in Examples therein, the particle diameter of the metal copper microparticle obtained by the SEM observation is in the range of a nanometer size to a micrometer size, so that the particle diameter thereof is wide; and therefore, to make the particle diameter and crystallite's diameter thereof uniform is difficult.

With the liquid phase method, as compared with the gas phase method, control of the particle diameter of copper microparticle is easier, and the production cost thereof can be lowered more readily; but control of the crystallite's diameter is difficult. In Patent Documents 8 to 11, there are description with regard to the particle diameter and/or the crystallite's diameter of metal microparticles including copper microparticle; however, there is no description with regard to control of the crystallite's diameter relative to the particle diameter thereof.

For example, in claim 1 of Patent Document 8, the method to produce the dispersion solution of metal microparticles, wherein an organometallic compound is dissolved in a solvent which contains an amino-containing substituted alcohol, quantity thereof being equal to or more than equimolar relative to an organic compound which constitutes the organometallic compound, whereby a solution of the organometallic compound is obtained in which its metal-equivalent concentration is at least 1% by mass and water is not substantially contained, which is then followed by reduction thereof by at least one compound selected from the group consisting of an organic reducing agent, a hydrazine, and a hydroxyl amine. The particle diameter of the metal microparticles in the dispersion solution of the metal microparticles described in Patent Document 8 is about the size to form a general colloid, but is not definitive, and it is described that the preferable particle diameter thereof is in the range of 1 to 100 nm; and also, it is described that the crystallite's average size of the metal microparticles of Patent Document 8 is usually in the range of 1 to 100 nm. However, there is no description therein with regard to the method how to control the particle diameter and crystallite's size thereof.

In claim 1 of Patent Document 9, the method for producing copper microparticle is described, wherein a divalent copper oxide and a reducing agent are mixed in a liquid medium in the presence of at least one complexing agent selected from amines, nitrogen-containing heteroaromatic compounds, nitriles, cyano-compounds, ketones, amino acids, and alkanolamines, as well as a protective colloid, whereby the metal copper microparticle is produced. In this Document, although it is described that the divalent copper oxide has the average crystallite's diameter of 20 to 500 µm, there is no description with regard to the crystallite's diameter of the metal copper microparticle.

In Patent Document 10 filed by Applicant of the presently applied invention, the description is made with regard to the method for producing metal microparticle of a metal including nickel, silver, and copper, wherein by using an apparatus in which stirring-mixing is carried out in a thin film fluid formed between processing surfaces which are disposed in a position they are faced with each other so as to be able to approach to and separate from each other, at least one of which rotates relative to the other, in the said thin film fluid, an aqueous solution which contains a metal compound of a metal such as nickel, silver, and copper is converged with an aqueous solution of a reducing agent thereby carrying out a reducing reaction of the metal compound with mixing the solutions uniformly. In this Document, it is shown Examples such as following: nickel microparticle is separated by converging an aqueous solution containing nickel sulfate hexahydrate and a polymer dispersant with an aqueous solution containing a hydrazine and a polymer dispersant; silver microparticle is separated by converging an aqueous solution containing silver nitrate and a polymer dispersant with an aqueous solution containing hydrazine or with an aqueous solution of dimethylamino ethanol; and copper microparticle is separated by converging an aqueous solution of copper nitrate with an aqueous solution containing a hydrazine and a polymer dispersant. However, in Patent Document 10, the description was only about the way how to control diameter of metal microparticles and of monodispersibility of metal colloid solution by changing the rotation number of the processing surfaces, the distance between the processing surfaces, the flow rate of the thin film fluid, and the concentration of raw materials, so that there is no reference the way how to control the crystallite's diameter relative to the particle diameter. More specifically, the description was only about the use of ascorbic acid and organic acids having a reducing ability (citric acid, malic acid, oxalic acid, and the like) as the acid to constitute the thin film fluid, so that there is no description about the way how to control the crystallite's diameter and particle diameter thereof by sulfuric acid.

In Patent Document 11 which is filed by Applicant of the present invention, the disclosure is made about the way how to control the crystallite's diameter of microparticles including copper microparticle by changing the kind and concentration of the fluids to constitute the thin film fluid, pH of the fluids, the introduction temperature of the fluids, and the introduction rate of the fluids. However, with regard to the substances used in the raw material fluid and the separating fluid, and to the substance used for pH control, so many substances are mentioned; and on top of it, there is neither the description about the way how to control the crystallite's diameter relative to the particle diameter nor the description about a specific tendency thereof. Therefore, there were the cases to require many trials and errors with regard to practical production of the microparticles. To mention specifically, it is shown in an embodiment of Examples thereof that against the raw material fluid which contains copper chloride or copper nitrate trihydrate as well as a polyol, the separating fluid which contains hydrazine monohydrate and a polyol is used; more specifically, what are shown therein are control of pH by benzotriazole and change of the introduction rate of the fluids. However, it is presumed that the fluid after mixing was not acidic, and that therefore the intention thereof is to control neither the crystallite's diameter nor d/D by controlling the molar ratio of copper to sulfate ion in the fluid after mixing.

The apparatus and the method which are described in Patent Document 10 and 11 have been developed by Applicant of the present applied invention; and they are receiving high marks of appreciation because these can contribute to producing of microparticles, especially to producing of the particle in a nanometer size; however the status quo thereof is that there are still unsolved problems in production of individual microparticles as well as with regard in control of various characteristics of the obtained microparticles including physical properties thereof.

PRIOR ART DOCUMENTS

Patent Document

Patent Document 1: Japanese patent Laid-Open Publication No. 2007-197836
Patent Document 2: Japanese patent Laid-Open Publication No. 2011-195888
Patent Document 3: Japanese patent Laid-Open Publication No. 2009-24254
Patent Document 4: Japanese patent Laid-Open Publication No. 2007-169680
Patent Document 5: Japanese patent Laid-Open Publication No. 2006-28637
Patent Document 6: Japanese patent Laid-Open Publication No. 2008-255377
Patent Document 7: Japanese patent Laid-Open Publication No. 2004-124257
Patent Document 8: Japanese patent Laid-Open Publication No. 2006-97116
Patent Document 9: Japanese patent Laid-Open Publication No. 2012-52240
Patent Document 10: International Patent Laid-Open Publication No. WO 2009/008390
Patent Document 11: International Patent Laid-Open Publication No. WO 2013/008706

Problems to be Solved by the Invention

In view of the situation as mentioned above, an object of the presently applied invention is to provide a method for manufacturing metal microparticle, wherein the method is for controlling crystallite's diameter of the metal microparticle, especially for controlling a ratio of the crystallite's diameter to the particle diameter of the metal microparticle.

Means for Solving the Problems

Inventors of the presently applied invention carried out extensive investigation by repeating many experiments: and as a result, it was found that a sulfate ion plays an important role in control of the crystallite's diameter thereof. This finding was great surprise even for inventors of the presently applied patent; and based on this finding, they could accomplish the presently applied invention.

That is, in the method for producing metal microparticle of the presently applied invention, at least two fluids to be processed are used, of these fluids to be processed, at least one fluid to be processed is a metal fluid in which a metal or a metal compound is dissolve in a solvent, and at least one fluid to be processed other than the said fluid to be processed is a reducing agent fluid which contains a reducing agent. If necessary, a third fluid to be processed other than the metal fluid and the reducing agent fluid may be used as well. A sulfate ion is contained in at least one fluid to be processed among the metal fluid, the reducing agent fluid, and the third fluid to be processed which is added if necessary. The fluids to be processed as mentioned above are introduced into between at least two processing surfaces which are disposed in a position they are faced with each other so as to be able to approach to and separate from each other, at least one of which rotates relative to the other. The fluids to be processed which are introduced thereinto form a thin film fluid between the at least two processing surfaces. The presently applied invention includes a mixing and separating process in which the fluids to be processed are mixed in the said thin film to effect a reaction between the metal or the metal compound and the reducing agent in the thin film fluid, whereby separating the metal microparticle.

The presently applied invention has a main feature in control of a ratio (d/D) of the crystallite's diameter (d) of the metal microparticle to the particle diameter (D) of the metal microparticle by controlling a molar ratio between the metal and the sulfate ion in the mixed fluid to be processed as mentioned above.

For example, wide-ranging variety of the ratios (d/D) can be obtained in accordance with the conditions of the fluids to be processed such as the raw materials thereof including the metal and the metal compound, and with the conditions of the intended metal microparticle. Even when a heat is applied to the obtained metal microparticle, in order to obtain the characteristics that the shrinkage thereof is not readily formed, it is appropriate if the above-mentioned ratio (d/D) is controlled in such a way that the ratio may be in the range preferably 0.3 or more, or more preferably 0.5 or more. In other words, inventors of the presently applied invention found that by controlling the ratio (d/D) in the range preferably 0.3 or more, or more preferably 0.5 or more, the metal microparticle having the comparatively large crystallite's diameter relative to the particle diameter can be obtained. Moreover, by obtaining the metal microparticle having the comparatively large crystallite's diameter relative to the particle diameter, even if a heat is applied to the obtained metal microparticle, the characteristics that the shrinkage thereof is not readily formed can be provided to the metal microparticle.

The presently applied invention may be executed as the embodiment wherein a polyol is included in at least one fluid to be processed among the above-mentioned fluids to be processed.

The above-mentioned polyol is not particularly restricted; however, at least one polyol selected from, for example, ethylene glycol, propylene glycol, trimethylene glycol, tetraethylene glycol, polyethylene glycol, diethylene glycol, glycerin, and polypropylene glycol may be used.

When as the solvent, especially as the solvent for the metal fluid, a polyol solvent which contains the polyol is used whereby controlling the molar ratio of the sulfate ion to the metal in the mixed fluid to be processed so as to be high, the control can be made in such a way that a high d/D ratio may be obtained.

Further, the presently applied invention may be executed as the embodiment wherein in the mixing and stirring process, the molar ratio of the metal to the sulfate ion in the mixed fluid to be processed is controlled by controlling concentration of the metal in the metal fluid, concentration of the sulfate ion in the fluid to be processed before the mixing, and mixing ratio of the fluids to be processed which are going to be mixed. For example, (1) concentration of the metal in the metal fluid, (2) concentration of the sulfate ion in the fluid to be processed before the mixing, and (3) mixing ratio of the fluids to be processed which are going to be mixed may be made constant in each of them, or all of (1) to (3) may be changed, or a part of (1) to (3) may be made constant with the rest thereof being changed.

Moreover, the presently applied invention may be executed as the embodiment wherein in the mixing and separation process, in addition to control of the molar ratio of the metal and the sulfate ion in the mixed fluid to be processed, by controlling pH of the mixed fluid to be processed, the ratio (d/D) of the crystallite's diameter (d) of the metal microparticle to the particle diameter (D) of the metal microparticle is controlled.

In the presently applied invention, the control as mentioned above is done by controlling the above-mentioned specific conditions in the fluids to be processed at the time of mixing; and, the control of the above-mentioned specific conditions in the fluids to be processed at the time of mixing may be realized by, for example, changing the molar ratio of the sulfate ion in the metal fluid and/or in the reducing agent fluid to the metal in the metal fluid. In addition, the control of the above-mentioned specific conditions in the fluids to be processed at the time of mixing may be realized by changing the concentration of the metal in the metal fluid or by changing the concentration of the sulfate ion in the metal fluid and/or in the reducing agent fluid. Further, the control of the above-mentioned specific conditions in the fluids to be processed at the time of mixing may be realized by changing the mixing ratio between the metal fluid and the reducing agent fluid.

The presently applied invention may also be executed advantageously by controlling pH of the metal fluid and/or the reducing agent fluid which are introduced into between the at least two processing surfaces.

Specifically, it is preferable to control pH of the metal fluid and/or the reducing agent fluid which is introduced into between the at least two processing surfaces so as to be constant under an acidic condition. It is also preferable to control pH of the metal fluid and/or the reducing agent fluid which is introduced into between the at least two processing surfaces so as to be changed under an acidic condition.

With regard to the metal or the metal compound relating to the presently applied invention, various metals selected from the metals in the chemical periodic table may be used. The presently applied invention, though not restricting the metals mentioned above, may be executed as an embodiment wherein at least one kind selected from nickel, silver, copper, a nickel compound, a silver compound, and a copper compound is used.

In addition, the presently applied invention may be executed as the embodiment, wherein in the case that nickel or a nickel compound such as a hydrate of nickel sulfate is used as the metal or the metal compound whereby separating nickel microparticle, the control is made such that the molar ratio of the sulfate ion to nickel in the metal fluid may become higher thereby raising the ratio (d/D) while keeping pH in a room temperature condition at constant under an acidic condition of the metal fluid which is introduced into between the at least two processing surfaces; or the control is made such that the molar ratio of the sulfate ion to nickel in the metal fluid may become lower thereby lowering the ratio (d/D) while keeping pH in a room temperature condition at constant under an acidic condition of the metal fluid which is introduced into between the at least two processing surfaces.

In addition, in the case that nickel or a nickel compound is used as the metal or the metal compound whereby separating nickel microparticle, the nickel microparticle having the ratio d/D of 0.30 or more is obtained by using the below-mentioned fluid as the nickel compound fluid. Thus, the metal fluid, wherein pH of the metal fluid at room temperature is 4.1 or lower, and the molar ratio of the sulfate ion relative to the nickel contained in the metal fluid is 1.0 or more, is used.

In addition, in the case that nickel or a nickel compound is used as the metal or the metal compound whereby separating nickel microparticle, the nickel microparticle having the crystallite's diameter (d) of 30 nm or more is obtained by using the below-mentioned fluid as the metal fluid. Thus, the metal fluid, wherein pH of the metal at room temperature is 4.1 or lower, and the molar ratio of the sulfate ion relative to the nickel contained in the metal fluid is 1.0 or more, is used.

In addition, in the case that nickel or a nickel compound is used as the metal or the metal compound whereby separating nickel microparticle, the nickel microparticle having the crystallite's diameter (d) of 30 nm or more is obtained by using the below-mentioned fluid as the metal fluid. Thus, the metal fluid, wherein pH of the metal fluid at room temperature is in the range of 4.1 or more and 4.4 or lower, and the molar ratio of the sulfate ion relative to the nickel contained in the nickel compound fluid is more than 1.1, is used.

In addition, in the case that nickel or a nickel compound is used as the metal or the metal compound whereby separating nickel microparticle, the nickel microparticle having the ratio d/D of 0.30 or more is obtained by using the below-mentioned fluid as the nickel compound fluid. Thus, the metal fluid, wherein pH of the nickel compound fluid at room temperature is in the range of 4.1 or more and 4.4 or lower, and the molar ratio of the sulfate ion relative to the nickel in the metal fluid is 1.2 or more, is used.

In addition, the presently applied invention may be executed as the embodiment, wherein of the fluids to be processed, at least one fluid to be processed contains a polyol, and in the mixing and separation process, the ratio (d/D) of the crystallite's diameter (d) of the metal microparticle to the particle diameter (D) of the metal microparticle is controlled by controlling the concentration of the polyol in the mixed fluid to be processed in addition to by controlling the molar ratio of the sulfate ion to the metal in the mixed fluid to be processed.

Further, the presently applied invention may be executed as the embodiment, wherein in the case that nickel or a nickel compound is used as the metal or the metal compound whereby separating nickel microparticle, while the metal fluid contains ethylene glycol and polyethylene glycol as the polyol, when the molar ratio of the sulfate ion to nickel in the metal fluid is 1.24, the control is made such that the concentration of the polyol in the metal fluid may become higher thereby raising the ratio (d/D); and when the molar ratio of the sulfate ion to nickel in the metal fluid is 1.00, the control is made such that the concentration of the polyol in the metal fluid may become higher thereby lowering the ratio (d/D).

Furthermore, according to the presently applied invention, in the case that silver or a silver compound is used as the metal or the metal compound whereby separating silver microparticle, by using only water as the solvent for the metal fluid, the control can be made such that the ratio (d/D) may be raised by lowering the molar ratio of the sulfate ion to metal in the mixed fluid to be processed.

In addition, the present invention may be executed as an embodiment, wherein a first processing surface and a second processing surface are provided as the at least two processing surfaces, the fluids to be processed are introduced between the first processing surface and the second processing surfaces, by a pressure of the fluids to be processed, a force to move the second processing surface in a direction to separate it from the first processing surface is generated, by this force, a very narrow space is kept between the first processing surface and the second processing surface, and the fluids to be processed which pass through this narrow space that is kept between the first processing surface and the second processing surface which form the thin film fluid.

In addition, the present invention may be executed as an embodiment, wherein the any one of fluid to be processed, i.e., the metal fluid and the reducing agent fluid, goes through between the at least two processing surfaces while forming the thin film fluid, a separate introduction path independent of the flow path through which the any one of fluid to be processed, the metal fluid and the reducing agent fluid, runs is arranged, at least one opening which is connected to the separate introduction path is arranged in at least any one of the at least two processing surfaces, and the any other fluid to be processed out of the metal fluid or the reducing agent fluid is introduced through this opening into between the at least two processing surfaces, whereby the metal fluid and the reducing agent fluid are mixed in the thin film fluid.

According to mere one embodiment of the present invention, the present invention may be carried out as a method for producing a metal microparticle, wherein the method comprises:

a fluid pressure imparting mechanism for imparting a pressure to a fluid to be processed, a first processing member provided with a first processing surface of the at least two processing surfaces, a second processing member provided with a second processing surface of the at least two processing surfaces, and a rotation drive mechanism for rotating these processing members relative to each other; wherein each of the processing surfaces constitutes part of a sealed flow path through which the fluid to be processed under the pressure is passed, of the first and the second processing members, at least the second processing member is provided with a pressure-receiving surface, and at least part of this pressure-receiving surface is comprised of the second processing surface, the pressure-receiving surface receives a pressure applied to the fluid to be processed by the fluid pressure imparting mechanism thereby generating a force to move in the direction of separating the second processing surface from the first processing surface, the fluid to be processed under the pressure is passed between the first processing surface and the second processing surface which are disposed in a position they are faced with each other so as to be able to approach to and separate from each other, at least one of which rotates relative to the other, whereby the fluid to be processed forms a thin film fluid, in this thin film fluid, whereby separating metal microparticle as a method for producing metal microparticle.

Advantages

According to the present invention, it became possible to control the ratio of the crystallite's diameter relative to the particle diameter of the metal microparticle, this having been difficult by the conventional liquid phase method, and in addition, the metal microparticle having the ratio of the crystallite's diameter relative to the particle diameter controlled can be produced continuously.

In the presently applied invention, by changing the control condition of the molar ratio of the sulfate ion to the metal in the fluid to be processed at the time of mixing, especially by simple changing of the process condition to control the molar ratio of the sulfate ion in the metal fluid and/or in the reducing agent fluid to the metal in the metal fluid, the ratio of the crystallite's diameter to the particle diameter of the metal microparticle can be controlled, so that the metal microparticle can be selectively produced with a lower cost and a lower energy than ever in accordance with the purpose thereof; and thus, the metal microparticle can be provided more cheaply and stably.

Besides, the presently applied invention can provide the metal microparticle having a desired particle diameter with intended physical properties.

BRIEF DESCRIPTION OF THE DRAWINGS

FIG. 2(A) is a rough top view of the first processing surface of the fluid processing apparatus which is shown in FIGS. 1; and 2(B) is the enlarged figure of the essential part of the processing surface of the apparatus.

BEST MODES FOR CARRYING OUT THE INVENTION

Figure 1:
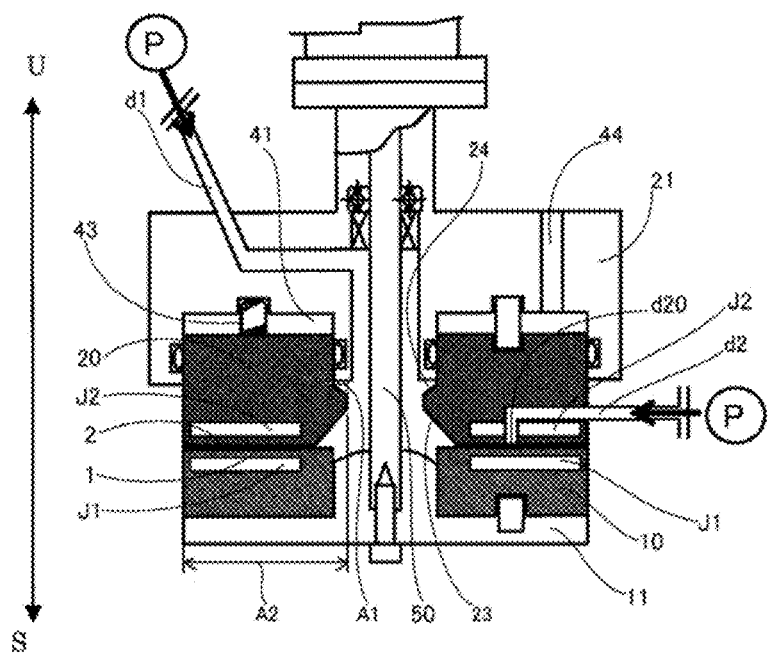
FIG. 1 is a rough cross section view of the fluid processing apparatus according to an embodiment of the presently applied invention.

Hereunder, the method for producing the metal microparticle according to the presently applied invention will be explained specifically.

Metals:

Metals in the present invention are not particularly restricted. All metal elements in the periodical table may be used. Illustrative example thereof includes Ti, Fe, W, Pt, Au, Cu, Ag, Pd, Ni, Mn, Co, Ru, V, Zn, Zr, Sn, In, Te, Ta, Bi, and Sb. These metals may be constituted of a single element; or an alloy formed of a plurality of metal elements or a substance which contains a metal element and a non-metal element may be used. Naturally, an alloy formed of a precious metal and a non-precious metal may be used.

Metal Compounds:

The metal compound of the present invention is not particularly restricted; and illustrative example thereof includes metal compounds in the form of a metal salt, an oxide, a hydroxide, a hydroxylated oxide, a nitride, a carbide, a complex, an organic salt, an organic complex, an organic compound, and a hydrate and an organic solvent adduct of them. The metal salt is not particularly restricted; and illustrative example thereof includes a nitrate, a nitrite, a sulfate, a sulfite, a formate, an acetate, a phosphate, a phosphite, a hypophosphite, a chloride, an oxysalt, an acetylacetonato salt, and a hydrate or an organic solvent adduct of them. These metal compounds may be used singly or as a mixture of two or more of them.

Reducing Agent:

The reducing agent is not particularly restricted; and thus, all reducing agents to metals can be used. Illustrative example of the reducing agent which can be used includes hydrazines such as hydrazine, hydrazine monohydrate, hydrazine sulfate, and phenyl hydrazine; amines such as dimethyl formamide, dimethylamino ethanol, triethyl amine, octyl amine, and dimethylamino borane; organic acids such as citric acid, ascorbic acid, oxalic acid, malic acid, malonic acid, tannic acid, formic acid, and the salts of them; as alcohols, monoalcohols such as aliphatic monoalcohols including methanol, ethanol, isopropyl alcohol, and butanol, as well as alicyclic monoalcohols including terpineol; and polyvalent alcohols such as ethylene glycol, diethylene glycol, triethylene glycol, propylene glycol, dipropylene glycol, glycerin, trimethylolpropane, tetraethylene glycol, benzotriazole, polyethylene glycol, and polypropylene glycol. Furthermore, illustrative example thereof includes hydrides such as sodium borohydride, lithium borohydride, lithium triethyl borohydride, lithium aluminum hydride, diisopropyl aluminum hydride, tributyl tin hydride, lithium tri(sec-butyl) borohydride, potassium tri(sec-butyl) borohydride, tetrabutyl ammonium borohydride, zinc borohydride, and sodium acetoxy borohydride; sugars such as glucose; and others such as formaldehyde, sodium formaldehyde sulfoxylate, sodium hypochlorite ($NaH_2PO_2$), salts of transition metals (titanium and iron) such as iron sulfate, and hydrates and solvates of them. These reducing agents maybe used solely or as a combination of two or more of them.

The metal fluid according to the presently applied invention is those having the metal or the metal compound dissolved or molecular dispersed in a solvent. Hereunder, unless otherwise specified, "dissolved or molecular dispersed" is simply referred to as "dissolved".

The reducing agent fluid according to the presently applied invention is used preferably by dissolving or molecular dispersing the above-mentioned reducing agent in a solvent; however, other state is permissive if the above-mentioned reducing agent is contained therein.

In the case when a reducing agent which requires securing of a certain pH region for the reduction activity, a pH-controlling substance maybe used together with this reducing agent. Illustrative example of the pH-controlling substance includes inorganic or organic acidic substances such as hydrochloric acid, sulfuric acid, nitric acid, aqua regia, trichloroacetic acid, trifluoroacetic acid, phosphoric acid, citric acid, and ascorbic acid; alkali hydroxides such as sodium hydroxide and potassium hydroxide; basic substances such as amines including triethylamine and dimethylamino ethanol; and salts of these acidic substances and basic substances. These pH-controlling substances may be used solely or as a combination of two or more of them.

The solvent to be used for a raw material fluid and separating fluid in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. If the foregoing alcoholic organic solvents or polyol solvents (polyvalent alcohols) are used as the solvent, there is a merit that these solvents can act also as the reducing substance; particularly it is effective in the case of producing a metal microparticle. These solvents each may be used solely or as a combination of two or more of them.

In the present invention, a polyol is contained in at least any one of the metal compound fluid and the reducing agent fluid. The polyol is an alcohol having a valency of divalent or a higher valency; and illustrative example thereof includes ethylene glycol, propylene glycol, trimethylene glycol, tetraethylene glycol, diethylene glycol, glycerin, polyethylene glycol, and polypropylene glycol. These polyols may be used solely or as a combination of two or more of them.

In the present invention, the metal microparticle is obtained by the polyol reduction method in which the metal ion is reduced by using the above-mentioned reducing agent and polyol together.

In the presently applied invention, the sulfate ion is contained in at least any one of the metal fluid and the reducing agent fluid, namely, in the metal fluid and/or in the reducing agent fluid. The usable sources of the sulfate ion are not only sulfuric acid but also sulfate salts including sodium sulfate, potassium sulfate, ammonium sulfate, copper sulfate, nickel sulfate, iron sulfate, and their hydrates and organic solvates. Nickel sulfate and copper sulfate mentioned above can be used as the raw materials of the metal fluid, and at the same time, they also act as the sources of the sulfate ion. Also, hydrazine sulfate is a reducing agent of the metal, and at the same time, it also acts as the source of the sulfate ion. Further, depending on the kind of the metal, iron sulfate is the reducing agent of the metal, and at the same time, it also acts as the source of the sulfate ion. It is in the public domain that the particle diameter changes by changing the ratio of a reducing agent to a metal ion; however, on top of it, because the crystallite's diameter relative to the particle diameter can be controlled by using the reducing agent which contains the sulfate ion, the ratio of the crystallite's diameter to the particle diameter of the metal microparticle to be obtained can be controlled precisely and readily. That is, the presently applied invention can also be executed as the embodiment wherein the reducing agent is the compound which acts as the reducing agent as well as the source of the sulfate. Hereunder, the source of the sulfate ion is called as the sulfate compound.

In the presently applied invention, the metal fluid and/or the reducing agent fluid contains the sulfate ion, and by changing the concentration thereof the molar ratio of the sulfate ion in the metal fluid and/or in the reducing agent fluid to the metal in the metal fluid can be changed. At the same time, pH of the metal fluid and/or the reducing agent fluid can be changed; however, with regard to pH of these fluids, it can also be adjusted separately by using the afore-mentioned pH-adjusting agent. Further, at the time when the metal fluid and the reducing agent fluid are mixed by the way as mentioned later, by controlling the molar ratio of the sulfate ion in the mixed fluid to the metal in the metal fluid, that is, by controlling the molar ratio of the sulfate ion to the metal in the mixed fluid in which the separation reaction takes place, the ratio (d/D) of the crystallite's diameter (d) to the particle diameter of the metal microparticle to be obtained can be controlled. Furthermore, by controlling pH of the mixed fluid, the ratio (d/D) of the crystallite's diameter (d) to the particle diameter of the metal microparticle to be obtained can be controlled. Meanwhile, pH of the fluids to be processed, especially pH of the metal fluid or the reducing agent fluid, the both not containing the sulfate ion, is not particularly restricted.

Inventors of the presently applied invention presume that the sulfate ion has the function to control the growth of the crystallite and the particle of the metal microparticle, and as a result of it, by controlling the molar ratio of the sulfate ion in the metal fluid and/or in the reducing agent fluid to the metal in the metal fluid, or more specifically, by controlling the molar ratio of the sulfate ion to the metal in the mixed fluid of the metal fluid and the reducing agent fluid, the ratio (d/D) of the crystallite's diameter (d) to the particle diameter of the metal microparticle to be obtained could be controlled.

Here, the metal in the metal fluid means all the metals which are contained in the metal fluid regardless of the state thereof such as, for example, a metal ion and a complex metal ion.

Inventors of the presently applied invention carried out various experiments by using different acids; and as a result, it was found that only sulfuric acid could control the ratio (d/D). This finding was a big surprise to the inventors of the presently applied invention; and the reason for it is not clear yet. Inventors of the presently applied invention presume that some properties of the sulfate ion and the sulfide ion or sulfur which constitutes the sulfate ion might involve in control of the d/D; however, the mechanism thereof has not been clear yet. It was found that especially when sulfuric acid and a polyol solvent are used, the ratio (d/D) could be controlled more surely. The presently applied invention could be completed based on these findings.

The molar ratio of the sulfate ion in the metal fluid and/or in the reducing agent fluid to the metal in the metal fluid is not particularly restricted. The molar ratio can be arbitrarily selected in accordance with the intended particle diameter and crystallite's diameter of the metal. Meanwhile, in the case that the sulfate ion is contained in the metal fluid, the balance between the solubility of the solvent to the metal or the metal compound and to the sulfate compound, and the molar ratio of the sulfate ion in the metal fluid and/or in the reducing agent fluid to the metal in the metal fluid is important.

As discussed above, in the presently applied invention, at the time when the metal fluid and the reducing agent fluid are mixed by the way as mentioned later, by controlling the molar ratio of the sulfate ion to the metal in the mixed fluid of the metal fluid and the reducing agent fluid, the ratio of the crystallite's diameter to the particle diameter of the metal microparticle to be obtained can be controlled. The concentration of the sulfate ion in the mixed fluid of the metal fluid and the reducing agent fluid can be changed by changing the concentration of the sulfate ion in the metal fluid and/or in the reducing agent fluid, or by changing the mixing ratio of the metal fluid and the reducing agent fluid. For example, by changing the concentration of the sulfate compound in the reducing agent fluid, the concentration of the sulfate ion in the reducing agent fluid can be changed. At this time, by changing the concentration of the sulfate ion in the reducing agent fluid, not only the concentration of the sulfate ion in the reducing agent fluid but also pH thereof can be changed. Change of pH of the mixed fluid of the metal fluid and the reducing agent fluid can be effected by changing pH of the metal fluid and/or the reducing agent fluid, or by changing the mixing ratio of the metal fluid and/or the reducing agent fluid. Further, the concentration of the sulfate ion in the metal fluid and pH thereof can be changed similarly to the reducing agent fluid. With regard to pH of the metal fluid and the reducing agent fluid, it can also be adjusted separately by using the afore-mentioned pH adjusting agents. Furthermore, the concentration of the metal in the mixed fluid of the metal fluid and the reducing agent fluid can be changed by changing the concentration of the metal in the metal fluid or by changing the mixing ratio of the metal fluid and the reducing agent fluid.

In the presently applied invention, pH of the metal fluid and of the reducing agent fluid is not particularly restricted; and thus, it can be selected arbitrarily in accordance with the intended crystallite's diameter and particle diameter of the metal microparticle; however, it may also be preferable if pH is adjusted in such a way that at the time when the metal fluid is mixed with the reducing agent fluid in the way as mentioned later, pH of the mixed fluid is controlled so as to be constant under the acidic condition.

As a matter of course, together with the control of the molar ratio of the sulfate ion to the metal in the mixed fluid, the control wherein pH of the mixed fluid is changed under the acidic condition may be advantageously used as well. In this way, the particle diameter, the crystallite's diameter, and the ratio of them can be controlled in a more dynamic range.

Dispersant, Etc.:

In the present invention, in accordance with the purpose and the necessity thereof, various kinds of dispersant and surfactant may be used. There are no particular restrictions on them, so that generally used various surfactants and dispersants that are commercially available goods and products, newly synthesized substances, or the like may be used. Anionic surfactants, cationic surfactant, nonionic surfactants, and various polymer dispersants may be exemplified for them, though not limited to these surfactants and dispersants. These may be used solely or as a combination of two or more of them. When polyethylene glycol, polypropylene glycol, or the like is used as the polyol, these polyols can function as the dispersants as well.

In addition, in the present invention, during the time when the metal fluid and the reducing agent fluid are mixed by the method as mentioned later, the ratio of d/D, i.e., the ratio of the crystallite's diameter (d) relative to the particle diameter (D) of the metal microparticle to be obtained, maybe controlled by controlling the molar ratio of the sulfate ion relative to the metal contained in the mixed fluid of the metal fluid and the reducing agent fluid and also by controlling the concentration of polyol in the mixed fluid of the metal fluid and the reducing agent fluid is contained in at least any one of the metal fluid and the reducing agent fluid.

Further, provided that the metal is dissolved, in the metal fluid or in the reducing agent fluid, a solid state and a crystal state, such as a dispersion solution and a slurry, may be included.

As discussed above, the presently applied invention is not restricted to (A) the method for producing nickel microparticle, (B) the method for producing silver microparticle, and (C) the method for producing copper microparticle; however, in order to help to understand more specifically, each of the production methods will be explained in the order of (A) to (C). Hereunder, in (A) the metal fluid is expressed as the nickel compound fluid, in (B) the metal fluid is expressed as the silver-containing fluid, and in (C) the metal fluid is expressed as the copper-dissolved fluid.

(A) Method for Producing Nickel Microparticle

Hereunder, the method for producing nickel microparticle, which is one embodiment of the presently applied invention, will be explained specifically.

The nickel compound fluid of the present invention is the one having a nickel compound dissolved or molecular-dispersed in a solvent, and also the nickel compound fluid contains a sulfate ion.

The reducing agent fluid of the present invention is the one having a reducing agent dissolved or molecular-dispersed in a solvent (hereinafter, this is simply referred to as "dissolved").

In addition, a polyol is contained in at least any one of the nickel compound fluid and the reducing agent fluid.

The nickel compound to be used may be various nickel compounds including nickel sulfate, nickel nitrate, nickel chloride, basic nickel carbonate, and hydrates of them; among them, nickel sulfate which can serve also as the source of the sulfate ion (this will be mentioned later) is preferable. These nickel compounds may be used solely or as a combination of two or more of them.

The reducing agent is not particularly restricted. Illustrative example thereof includes hydrazine, hydrazine monohydrate, hydrazine sulfate, formaldehyde sodium sulfoxylate, a boron hydride metal salt, an aluminum hydride metal salt, a triethylboron hydride metal salt, glucose, citric acid, ascorbic acid, tannic acid, dimethylformamide, tetrabutylammonium borohydride, sodium hypophosphite ($NaH_2PO_2.H_2O$) may be used. These reducing agent may be used solely or as a combination of two or more of them.

In the case when a reducing agent which requires securing of a certain pH region for the reduction activity, such as for example, hydrazine and hydrazine monohydrate is used, a pH-controlling substance may be used together with this reducing agent. Illustrative example of the pH-controlling substance includes inorganic or organic acidic substances such as hydrochloric acid, sulfuric acid, nitric acid, aqua regia, trichloroacetic acid, trifluoroacetic acid, phosphoric acid, citric acid, and ascorbic acid; alkali hydroxides such as sodium hydroxide and potassium hydroxide; basic substances such as amines including triethylamine and dimethylamino ethanol; and salts of these acidic substances and basic substances. These pH-controlling substances may be used solely or as a combination of two or more of them.

The solvent to be used for a raw material fluid and separating fluid in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. If the foregoing alcoholic organic solvents or polyol solvents (polyvalent alcohols) are used as the solvent, there is a merit that these solvents can act also as the reducing substance; particularly it is effective in the case of producing a nickel microparticle. These solvents each may be used solely or as a combination of two or more of them.

In the present invention, a polyol is contained in at least any one of the nickel compound fluid and the reducing agent fluid. The polyol is an alcohol having a valency of divalent or a higher valency; and illustrative example thereof includes ethylene glycol, propylene glycol, trimethylene glycol, tetraethylene glycol, diethylene glycol, glycerin, polyethylene glycol, and polypropylene glycol. These polyols may be used solely or as a combination of two or more of them.

In the present invention, the nickel microparticle is obtained by the polyol reduction method in which the nickel ion is reduced by using the above-mentioned reducing agent and polyol together.

In the present invention, the sulfate ion is contained in the nickel compound fluid. Illustrative example of the source of the sulfate ion includes, besides sulfuric acid, sulfate salts of sodium sulfate, potassium sulfate, ammonium sulfate, or their hydrates and organic solvates. The afore-mentioned hydrazine sulfate can act as the reducing agent as well as the source of the sulfate ion. Hereunder, the source of the sulfate ion other than nickel sulfate is referred to as the sulfate compound.

In the present invention, the nickel compound fluid contains the sulfate ion; and by changing the concentration thereof, the molar ratio of the sulfate ion relative to the nickel contained in the nickel compound fluid can be changed. At the same time with this, pH of the nickel compound fluid can be changed; however, pH of the nickel compound fluid may also be adjusted separately by using the afore-mentioned pH-controlling substance. And then, during the time when the nickel compound fluid and the reducing agent fluid are mixed by the way as mentioned later, by controlling pH of the nickel compound fluid as well as the molar ratio of the sulfate ion relative to the nickel contained in the nickel compound fluid, the ratio of d/D, i.e., the ratio of the crystallite's diameter (d) relative to the particle diameter (D) of the nickel microparticle to be produced, may be controlled. Applicant of the present invention presumes that the sulfate ion has a function to control the particle growth of the nickel microparticle whereby helping the growth of the crystallite thereof; and as a result, by controlling pH of the nickel compound fluid as well as the molar ratio of the sulfate ion relative to the nickel contained in the nickel compound fluid, the ratio d/D of the crystallite's diameter (d) relative to the particle diameter (D) of the nickel microparticle to be obtained could be controlled. Here, the nickel contained in the nickel compound fluid means all the nickel contained in the nickel compound fluid regardless of the states thereof including a nickel ion and a nickel complex ion.

In order to well control the ratio of the crystallite's diameter relative to the particle diameter of the nickel microparticle, the molar ratio of the sulfate ion relative to the nickel contained in the nickel compound fluid is preferably more than 1.00. In this regard, it is preferable to use nickel sulfate or a hydrate thereof as the nickel compound because this contains both the nickel ion and the sulfate ion equally. Depending on the solvent used for dissolving the nickel compound, if a sulfate compound is added excessively to increase the molar ratio of the sulfate ion relative to the nickel contained in the nickel compound fluid, the sulfate ion and the nickel ion in the nickel compound fluid interact; and as a result, for example, deposit such as, for example, nickel sulfate may be separated. It is important to have a proper balance between the molar ratio of the sulfate ion relative to the nickel contained in the nickel compound fluid and the solubilities of the solvent to the nickel compound and to the sulfate compound.

As discussed above, in the present invention, during the time when the nickel compound fluid and the reducing agent fluid are mixed by the way as mentioned later, by controlling pH of the nickel compound fluid and the molar ratio of the sulfate ion relative to the nickel contained in the nickel compound fluid, the ratio of the crystallite's diameter relative to the particle diameter of the nickel microparticle to be obtained can be controlled. The pH of the nickel compound fluid may be changed by changing the concentration of the nickel sulfate contained in the nickel compound fluid, for example, by changing the concentration of nickel sulfate, the nickel compound, and the concentration of the sulfate compound contained in the nickel compound fluid; and besides, pH of the nickel compound fluid may be adjusted separately by using the afore-mentioned pH-controlling substance. By changing the concentration of the sulfate ion contained in the nickel compound fluid, not only the concentration of the sulfate ion in the nickel compound fluid but also pH therein may be changed.

In the present invention, in order to well control the ratio of the crystallite's diameter relative to the particle diameter of the nickel microparticle, pH of the nickel compound fluid at room temperature needs to be acidic; and further, pH of the nickel compound fluid at room temperature is preferably 4.4 or lower, or more preferably 4.1 or lower. Meanwhile, the operation including preparation of the fluids and mixing thereof for this control may be carried out at room temperature; however, even when the operation is carried out under the environment other than at room temperature, it may be allowed as far as the above-mentioned condition of pH at room temperature is fulfilled.

In the present invention, pH of the reducing agent fluid is not particularly restricted. It may be arbitrarily chosen in accordance with the reducing agent, the concentration thereof, and so forth.

Alternatively, the afore-mentioned sulfate compound may be added to the reducing agent fluid.

During the time when the nickel compound fluid and the reducing agent fluid are mixed by the method as mentioned later, this operation is carried out preferably as following: the control is made so as to obtain a higher d/D ratio, i.e., the ratio of the crystallite's diameter (d) relative to the particle diameter (D) of the nickel microparticle to be obtained, by raising the molar ratio of the sulfate ion relative to the nickel contained in the nickel compound fluid while pH of the nickel compound fluid at room temperature is being kept constant in an acidic condition; and the control is made so as to obtain lower d/D ratio by lowering the molar ratio of the sulfate ion relative to the nickel contained in the nickel compound fluid while pH of the nickel compound fluid at room temperature is being kept constant in an acidic condition. Meanwhile, the operation including preparation of the fluids and mixing thereof for this control may be carried out at room temperature; however, even when the operation is carried out under the environment other than at room temperature, it may be allowed as far as the condition that pH of the nickel compound fluid at room temperature is kept constant in an acidic condition is fulfilled.

In addition, during the time when the nickel compound fluid and the reducing agent fluid are mixed by the method as mentioned later, as the nickel compound fluid, it is preferable that the nickel compound fluid having 4.1 or lower in its pH at room temperature and also having more than 1.0 in the molar ratio of the sulfate ion relative to the nickel contained in the nickel compound fluid be used. This is preferable in order to obtain the nickel microparticle having the ratio d/D of 0.30 or more, preferably 0.35 or more, or more preferably 0.40 or more, and the crystallite's diameter (d) of 30 nm or more, preferably 35 nm or more, or more preferably 40 nm or more.

Furthermore, during the time when the nickel compound fluid and the reducing agent fluid are mixed by the method as mentioned later, in order to obtain the nickel microparticle having the crystallite's diameter (d) of 30 nm or more, as the nickel compound fluid, it is preferable that the nickel compound fluid having pH in the range of 4.1 or higher to 4.4 or lower and also having more than 1.1 in the molar ratio of the sulfate ion relative to the nickel contained in the nickel compound fluid be used; and in order to obtain the nickel microparticle having 0.30 or more in the ratio d/D, as the nickel compound fluid, it is preferable that the nickel compound fluid having pH in the range of 4.1 or higher to 4.4 or lower and also having more than 1.2 in the molar ratio of the sulfate ion relative to the nickel contained in the nickel compound fluid be used. Meanwhile, the operation including preparation of these fluids and mixing thereof for this control may be carried out at room temperature; however, even when the operation is carried out under the environment other than at room temperature, it maybe allowed as far as the above-mentioned condition of pH at room temperature is fulfilled.

The nickel microparticle having the ratio d/D of 0.30 or more and the nickel microparticle having the crystallite's diameter of 30 nm or more are suitable for the ceramic condenser, because the shrinkage after heat-treatment can be suppressed in these microparticles.

Dispersant, etc.:

In the present invention, in accordance with the purpose and the necessity thereof, various kinds of dispersant and surfactant may be used. There are no particular restrictions on them, so that generally used various surfactants and dispersants that are commercially available goods and products, newly synthesized substances, or the like may be used. Anionic surfactants, cationic surfactant, nonionic surfactants, and various polymer dispersants may be exemplified for them, though not limited to these surfactants and dispersants. These may be used solely or as a combination of two or more of them. When polyethylene glycol, polypropylene glycol, or the like is used as the polyol, these polyols can function as the dispersants as well.

During the time when the nickel compound fluid and the reducing agent fluid are mixed by the method as mentioned later, the ratio of d/D, i.e., the ratio of the crystallite's diameter (d) relative to the particle diameter (D) of the nickel microparticle to be obtained, may be controlled by controlling the molar ratio of the sulfate ion relative to the nickel contained in the nickel compound fluid and also by controlling the concentration of polyol that can function also as the dispersant and is contained in at least any one of the nickel compound fluid and the reducing agent fluid.

In this case, the polyol that can function also as the dispersant is preferably contained in the nickel compound fluid; and when the molar ratio of the sulfate ion relative to the nickel contained in the nickel compound fluid is 1.24, the control is made so as to give the higher d/D ratio by increasing the concentration of the polyol that can function also as the dispersant in the nickel compound fluid; on the other hand, when the molar ratio of the sulfate ion relative to the nickel contained in the nickel compound fluid is 1.00, the control is made so as to give the lower d/D ratio by increasing the concentration of the polyol that can function also as the dispersant in the nickel compound fluid.

The nickel compound fluid and the reducing agent fluid may be used even if these include the state of solid and crystal such as a dispersion solution and a slurry of them.

(B) Method for Producing Silver Microparticle

Hereunder, the method for producing silver microparticle, which is one embodiment of the presently applied invention, will be explained specifically.

The silver-containing fluid according to the presently applied invention is silver or a silver compound having dissolved or molecular-dispersed in a solvent (hereunder, this is simply called as dissolved).

With regard to the silver compound, various raw materials such as silver nitrate, silver sulfate, silver chloride, silver carbonate, silver oxide, silver citrate, silver lactate, and hydrates of them may be used. These silver compounds may be used solely or as a mixture of two or more of them.

Reducing Agent:

The reducing agent is not particularly restricted; and thus, all reducing agents to silver can be used. Illustrative example of the reducing agent which can be used includes hydrazines such as hydrazine, hydrazine monohydrate, hydrazine sulfate, and phenyl hydrazine; amines such as dimethylamino ethanol, triethyl amine, octyl amine, and dimethylamino borane; organic acids such as citric acid, ascorbic acid, oxalic acid, malic acid, malonic acid, tannic acid, formic acid, and the salts of them; as alcohols, monoalcohols such as aliphatic monoalcohols including methanol, ethanol, isopropyl alcohol, and butanol, as well as alicyclic monoalcohols including terpineol; and polyvalent alcohols such as ethylene glycol, diethylene glycol, triethylene glycol, propylene glycol, dipropylene glycol, glycerin, trimethylolpropane, tetraethylene glycol, benzotriazole, polyethylene glycol, and polypropylene glycol. Furthermore, illustrative example thereof includes hydrides such as sodium borohydride, lithium borohydride, lithium triethyl borohydride, lithium aluminum hydride, diisopropyl aluminum hydride, tributyl tin hydride, lithium tri(sec-butyl) borohydride, potassium tri(sec-butyl) borohydride, tetrabutyl ammonium borohydride, zinc borohydride, and sodium acetoxy borohydride; sugars such as glucose; and others such as formaldehyde, sodium formaldehyde sulfoxylate, sodium hypochlorite ($NaH_2PO_2$), salts of transition metals (titanium and iron) such as iron sulfate, and hydrates and solvates of them. These reducing agents maybe used solely or as a combination of two or more of them.

In the case when a reducing agent which requires securing of a certain pH region for the reduction activity, a pH-controlling substance maybe used together with this reducing agent. Illustrative example of the pH-controlling substance includes inorganic or organic acidic substances such as hydrochloric acid, sulfuric acid, nitric acid, aqua regia, trichloroacetic acid, trifluoroacetic acid, phosphoric acid, citric acid, and ascorbic acid; alkali hydroxides such as sodium hydroxide and potassium hydroxide; basic substances such as amines including triethylamine and dimethylamino ethanol; and salts of these acidic substances and basic substances. These pH-controlling substances may be used solely or as a combination of two or more of them.

The solvent to be used for a raw material fluid and separating fluid in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. These solvents each may be used solely or as a combination of two or more of them.

In the presently applied invention, the sulfate ion is contained in at least any one of the silver-containing fluid and the reducing agent fluid, namely, in the silver-containing fluid and/or in the reducing agent fluid. The usable sources of the sulfate ion are not only sulfuric acid but also sulfate salts including sodium sulfate, potassium sulfate, ammonium sulfate, iron sulfate, and their hydrates and organic solvates. Also, iron sulfate and hydrazine sulfate are a reducing agent of the silver, and at the same time, it also acts as the source of the sulfate ion. It is in the public domain that the particle diameter changes by changing the ratio of a reducing agent to a metal ion; however, on top of it, because the crystallite's diameter relative to the particle diameter can be controlled by using the reducing agent which contains the sulfate ion, the ratio of the crystallite's diameter to the particle diameter of the silver microparticle to be obtained can be controlled precisely and readily. That is, the presently applied invention can also be executed as the embodiment wherein the reducing agent is the silver which acts as the reducing agent as well as the source of the sulfate. Hereunder, the source of the sulfate ion is called as the sulfate compound.

In the presently applied invention, the silver-containing fluid and/or the reducing agent fluid contains the sulfate ion, and by changing the concentration thereof the molar ratio of the sulfate ion in the silver-containing fluid and/or in the reducing agent fluid to the silver in the silver-containing fluid can be changed. At the same time, pH of the silver-containing fluid and/or the reducing agent fluid can be changed; however, with regard to pH of these fluids, it can also be adjusted separately by using the afore-mentioned pH-adjusting agent. Further, at the time when the silver-containing fluid and the reducing agent fluid are mixed by the way as mentioned later, by controlling the molar ratio of the sulfate ion in the mixed fluid to the silver in the silver-containing fluid, that is, by controlling the molar ratio of the sulfate ion to the silver in the mixed fluid in which the separation reaction takes place, the ratio (d/D) of the crystallite's diameter (d) to the particle diameter of the silver microparticle to be obtained can be controlled. Furthermore, by controlling pH of the mixed fluid, the ratio (d/D) of the crystallite's diameter (d) to the particle diameter of the silver microparticle to be obtained can be controlled.

Inventors of the presently applied invention presume that the sulfate ion has the function to control the growth of the crystallite and the particle of the silver microparticle, and as a result of it, by controlling the molar ratio of the sulfate ion in the silver-containing fluid and/or in the reducing agent fluid to the silver in the silver-containing fluid, or more specifically, by controlling the molar ratio of the sulfate ion to the silver in the mixed fluid of the silver-containing fluid and the reducing agent fluid, the ratio (d/D) of the crystallite's diameter (d) to the particle diameter of the silver microparticle to be obtained could be controlled. Here, the silver in the silver-containing fluid means all the silvers which are contained in the silver-containing fluid regardless of the state thereof such as, for example, a silver ion and a complex silver ion.

The molar ratio of the sulfate ion in the silver-containing fluid and/or in the reducing agent fluid to the silver in the silver-containing fluid is not particularly restricted. The molar ratio can be arbitrarily selected in accordance with the intended particle diameter and crystallite's diameter of the silver. Meanwhile, in the case that the sulfate ion is contained in the silver-containing fluid, the balance between the solubility of the solvent to the silver or the silver compound and to the sulfate compound, and the molar ratio of the sulfate ion in the silver-containing fluid and/or in the reducing agent fluid to the silver in the silver-containing fluid is important.

As discussed above, in the presently applied invention, at the time when the silver-containing fluid and the reducing agent fluid are mixed by the way as mentioned later, by controlling the molar ratio of the sulfate ion to the silver in the mixed fluid of the silver-containing fluid and the reducing agent fluid, the ratio of the crystallite's diameter to the particle diameter of the silver microparticle to be obtained can be controlled. The concentration of the sulfate ion in the mixed fluid of the silver-containing fluid and the reducing agent fluid can be changed by changing the concentration of the sulfate ion in the silver-containing fluid and/or in the reducing agent fluid, or by changing the mixing ratio of the silver-containing fluid and the reducing agent fluid. For example, by changing the concentration of the iron sulfate and the concentration of the sulfate compound in the reducing agent fluid, the concentration of the sulfate ion in the reducing agent fluid can be changed. At this time, by changing the concentration of the sulfate ion in the reducing agent fluid, not only the concentration of the sulfate ion in the reducing agent fluid but also pH thereof can be changed. Change of pH of the mixed fluid of the silver-containing fluid and the reducing agent fluid can be effected by changing pH of the silver-containing fluid and/or the reducing agent fluid, or by changing the mixing ratio of the silver-containing fluid and/or the reducing agent fluid. Further, the concentration of the sulfate ion in the silver-containing fluid and pH thereof can be changed similarly to the reducing agent fluid. With regard to pH of the silver-containing fluid and the reducing agent fluid, it can also be adjusted separately by using the afore-mentioned pH adjusting agents.

In the presently applied invention, pH of the silver-containing fluid and of the reducing agent fluid is not particularly restricted. And also there is not particularly restricted when the silver-containing fluid and the reducing agent fluid are mixed by the way as mentioned later, and thus, it can be selected arbitrarily in accordance with the intended crystallite's diameter and particle diameter of the silver microparticle.

It may also be preferable if pH is adjusted in such a way that at the time when the silver-containing fluid is mixed with the reducing agent fluid in the way as mentioned later, pH of the mixed fluid is controlled so as to be constant under the acidic condition. As a matter of course, together with the control of the molar ratio of the sulfate ion to the silver in the mixed fluid, the control wherein pH of the fluid to be processed is changed under the acidic condition may be advantageously used as well. In this way, the particle diameter, the crystallite's diameter, and the ratio of them can be controlled in a more dynamic range.

Dispersant, Etc.:

In the present invention, in accordance with the purpose and the necessity thereof, various kinds of dispersant and surfactant may be used. There are no particular restrictions on them, so that generally used various surfactants and dispersants that are commercially available goods and products, newly synthesized substances, or the like may be used. Anionic surfactants, cationic surfactant, nonionic surfactants, and various polymer dispersants maybe exemplified for them, though not limited to these surfactants and dispersants. These may be used solely or as a combination of two or more of them.

The silver-containing fluid and the reducing agent fluid may be used even if these include the state of solid and crystal such as a dispersion solution and a slurry of them.

(C) Method for Producing Copper Microparticle

Hereunder, the method for producing silver microparticle, which is one embodiment of the presently applied invention, will be explained specifically.

The copper-dissolved fluid according to the presently applied invention is copper or a copper compound having dissolved or molecular-dispersed in a solvent (hereunder, this is simply called as dissolved).

With regard to the copper compound, various raw materials such as copper nitrate, copper sulfate, copper chloride, copper carbonate, copper oxide, copper hydroxide, copper citrate, copper lactate, and hydrates of them may be used. These copper compounds may be used solely or as a mixture of two or more of them.

Reducing Agent:

The reducing agent is not particularly restricted; and thus, all reducing agents to copper can be used. Illustrative example of the reducing agent which can be used includes hydrazines such as hydrazine, hydrazine monohydrate, hydrazine sulfate, and phenyl hydrazine; amines such as dimethylamino ethanol, triethyl amine, octyl amine, and dimethylamino borane; organic acids such as citric acid, ascorbic acid, oxalic acid, malic acid, malonic acid, tannic acid, formic acid, and the salts of them; as alcohols, monoalcohols such as aliphatic monoalcohols including methanol, ethanol, isopropyl alcohol, and butanol, as well as alicyclic monoalcohols including terpineol; and polyvalent alcohols such as ethylene glycol, diethylene glycol, triethylene glycol, propylene glycol, dipropylene glycol, glycerin, trimethylolpropane, tetraethylene glycol, benzotriazole, polyethylene glycol, and polypropylene glycol. Furthermore, illustrative example thereof includes hydrides such as sodium borohydride, lithium borohydride, lithium triethyl borohydride, lithium aluminum hydride, diisopropyl aluminum hydride, tributyl tin hydride, lithium tri(sec-butyl) borohydride, potassium tri(sec-butyl) borohydride, tetrabutyl ammonium borohydride, zinc borohydride, and sodium acetoxy borohydride; sugars such as glucose; and others such as formaldehyde, sodium formaldehyde sulfoxylate, sodium hypochlorite ($NaH_2PO_2$), salts of transition metals (titanium and iron) such as iron sulfate, and hydrates and solvates of them. These reducing agents maybe used solely or as a combination of two or more of them.

The reducing agent fluid according to the presently applied invention is used preferably by dissolving or molecular dispersing the above-mentioned reducing agent in a solvent; however, other state is permissive if the above-mentioned reducing agent is contained therein.

In the case when a reducing agent which requires securing of a certain pH region for the reduction activity, a pH-controlling substance maybe used together with this reducing agent. Illustrative example of the pH-controlling substance includes inorganic or organic acidic substances such as hydrochloric acid, sulfuric acid, nitric acid, aqua regia, trichloroacetic acid, trifluoroacetic acid, phosphoric acid, citric acid, and ascorbic acid; alkali hydroxides such as sodium hydroxide and potassium hydroxide; basic substances such as amines including triethylamine and dimethylamino ethanol; and salts of these acidic substances and basic substances. These pH-controlling substances may be used solely or as a combination of two or more of them.

The solvent to be used for a raw material fluid and separating fluid in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. These solvents each may be used solely or as a combination of two or more of them.

In the presently applied invention, the sulfate ion is contained in at least any one of the copper-dissolved fluid and the reducing agent fluid, namely, in the copper-dissolved fluid and/or in the reducing agent fluid. The usable sources of the sulfate ion are not only sulfuric acid but also sulfate salts including sodium sulfate, potassium sulfate, ammonium sulfate, copper sulfate, iron sulfate, and their hydrates and organic solvates. Copper sulfate mentioned above can be used as the raw materials of the copper-dissolved fluid, and at the same time, they also act as the sources of the sulfate ion. Also, hydrazine sulfate is a reducing agent of the copper, and at the same time, it also acts as the source of the sulfate ion. It is in the public domain that the particle diameter changes by changing the ratio of a reducing agent to a metal ion; however, on top of it, because the crystallite's diameter relative to the particle diameter can be controlled by using the reducing agent which contains the sulfate ion, the ratio of the crystallite's diameter to the particle diameter of the copper microparticle to be obtained can be controlled precisely and readily. That is, the presently applied invention can also be executed as the embodiment wherein the reducing agent is the compound which acts as the reducing agent as well as the source of the sulfate. Hereunder, the source of the sulfate ion is called as the sulfate compound.

In the presently applied invention, the copper-dissolved fluid and/or the reducing agent fluid contains the sulfate ion, and by changing the concentration thereof the molar ratio of the sulfate ion in the copper-dissolved fluid and/or in the reducing agent fluid to the copper in the copper-dissolved fluid can be changed. At the same time, pH of the copper-dissolved fluid and/or the reducing agent fluid can be changed; however, with regard to pH of these fluids, it can also be adjusted separately by using the afore-mentioned pH-adjusting agent. Further, at the time when the copper-dissolved fluid and the reducing agent fluid are mixed by the way as mentioned later, by controlling the molar ratio of the sulfate ion in the mixed fluid to the copper in the copper-dissolved fluid, that is, by controlling the molar ratio of the sulfate ion to the copper in the mixed fluid in which the separation reaction takes place, the ratio (d/D) of the crystallite's diameter (d) to the particle diameter of the copper microparticle to be obtained can be controlled. Furthermore, by controlling pH of the mixed fluid, the ratio (d/D) of the crystallite's diameter (d) to the particle diameter of the copper microparticle to be obtained can be controlled.

Inventors of the presently applied invention presume that the sulfate ion has the function to control the growth of the crystallite and the particle of the copper microparticle, and as a result of it, by controlling the molar ratio of the sulfate ion in the copper-dissolved fluid and/or in the reducing agent fluid to the copper in the copper-dissolved fluid, or more specifically, by controlling the molar ratio of the sulfate ion to the copper in the mixed fluid of the copper-dissolved fluid and the reducing agent fluid, the ratio (d/D) of the crystallite's diameter (d) to the particle diameter of the copper microparticle to be obtained could be controlled.

Here, the copper in the copper-dissolved fluid means all the coppers which are contained in the copper-dissolved fluid regardless of the state thereof such as, for example, a copper ion and a complex copper ion.

The molar ratio of the sulfate ion in the copper-dissolved fluid and/or in the reducing agent fluid to the copper in the copper-dissolved fluid is not particularly restricted. The molar ratio can be arbitrarily selected in accordance with the intended particle diameter and crystallite's diameter of the copper. Meanwhile, in the case that the sulfate ion is contained in the copper-dissolved fluid, the balance between the solubility of the solvent to the copper or the copper compound and to the sulfate compound, and the molar ratio of the sulfate ion in the copper-dissolved fluid and/or in the reducing agent fluid to the copper in the copper-dissolved fluid is important.

As discussed above, in the presently applied invention, at the time when the copper-dissolved fluid and the reducing agent fluid are mixed by the way as mentioned later, by controlling the molar ratio of the sulfate ion to the copper in the mixed fluid of the copper-dissolved fluid and the reducing agent fluid, the ratio of the crystallite's diameter to the particle diameter of the copper microparticle to be obtained can be controlled. The concentration of the sulfate ion in the mixed fluid of the copper-dissolved fluid and the reducing agent fluid can be changed by changing the concentration of the sulfate ion in the copper-dissolved fluid and/or in the reducing agent fluid, or by changing the mixing ratio of the copper-dissolved fluid and the reducing agent fluid. For example, by changing the concentration of the sulfate compound in the reducing agent fluid, the concentration of the sulfate ion in the reducing agent fluid can be changed. At this time, by changing the concentration of the sulfate ion in the reducing agent fluid, not only the concentration of the sulfate ion in the reducing agent fluid but also pH thereof can be changed. Change of pH of the mixed fluid of the copper-dissolved fluid and the reducing agent fluid can be effected by changing pH of the copper-dissolved fluid and/or the reducing agent fluid, or by changing the mixing ratio of the copper-dissolved fluid and/or the reducing agent fluid. Further, the concentration of the sulfate ion in the copper-dissolved fluid and pH thereof can be changed similarly to the reducing agent fluid. With regard to pH of the copper-dissolved fluid and the reducing agent fluid, it can also be adjusted separately by using the afore-mentioned pH adjusting agents. Furthermore, the concentration of the copper in the mixed fluid of the copper-dissolved fluid and the reducing agent fluid can be changed by changing the concentration of the copper in the copper-dissolved fluid or by changing the mixing ratio of the copper-dissolved fluid and the reducing agent fluid.

In the presently applied invention, pH of the copper-dissolved fluid and of the reducing agent fluid is not particularly restricted; and thus, it can be selected arbitrarily in accordance with the intended crystallite's diameter and particle diameter of the copper microparticle; however, it may also be preferable if pH is adjusted in such a way that at the time when the copper-dissolved fluid is mixed with the reducing agent fluid in the way as mentioned later, pH of the mixed fluid is controlled so as to be constant under the acidic condition.

As a matter of course, together with the control of the molar ratio of the sulfate ion to the copper in the mixed fluid, the control wherein pH of the mixed fluid is changed under the acidic condition may be advantageously used as well. In this way, the particle diameter, the crystallite's diameter, and the ratio of them can be controlled in a more dynamic range.

As discussed above, in the embodiment that the fluids to be processed, i.e., the copper-dissolved fluid and the reducing agent fluid, are mixed in the thin film fluid formed between at least two processing surfaces which are disposed in a position they are faced with each other so as to be able to approach to and separate from each other, at least one of which rotates relative to the other, wherein pH of the mixed fluid is acidic with the condition of using the afore-mentioned polyol solvent as the solvent for the copper-dissolved fluid, when the molar ratio of the sulfate ion to the copper in the mixed fluid to be processed is controlled so as to be high, the control so as to obtain high ratio (d/D) of the crystallite's diameter to the particle diameter can be surely executed.

Dispersant, Etc.:

In the present invention, in accordance with the purpose and the necessity thereof, various kinds of dispersant and surfactant may be used. There are no particular restrictions on them, so that generally used various surfactants and dispersants that are commercially available goods and products, newly synthesized substances, or the like may be used. Anionic surfactants, cationic surfactant, nonionic surfactants, and various polymer dispersants may be exemplified for them, though not limited to these surfactants and dispersants. These may be used solely or as a combination of two or more of them.

Further, provided that the copper is dissolved, in the copper-dissolved fluid or in the reducing agent fluid, a solid state and a crystal state, such as a dispersion solution and a slurry, may be included.

Fluid Processing Apparatus:

In the present invention, it is preferable to use the method wherein the metal fluid and the reducing agent fluid are mixed in the thin film fluid formed between at least two processing surfaces which are disposed in a position they are faced with each other so as to be able to approach to and separate from each other, at least one of which rotates relative to the other; and thus, for example, it is preferable to mix these fluids thereby separating the metal microparticle by using the apparatus based on the same principle as the apparatus shown in Patent Document 10 and 11.

Hereinafter, embodiments of the above-mentioned fluid processing apparatus will be explained by using the drawings.

Explanation of the Apparatus

Figure 3:
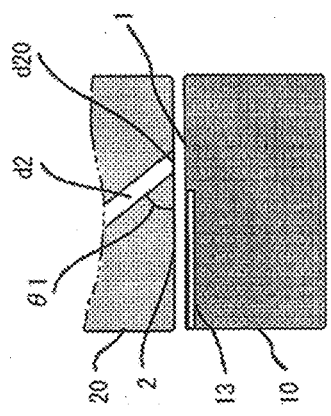
FIG. 3 (A) a cross section view of the second introduction part of the apparatus; and 3(B) is the enlarged figure of the processing surface to explain the second introduction part.

The fluid processing apparatus shown in FIG. 1 to FIG. 3 which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 □m to 50 □m. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the movement of fluid, the dimensionless number which expresses the ratio of inertia force to viscosity force is called as Reynolds number, which is expressed by the following equation.

Reynolds number $Re$=inertia force/viscosity force=$\rho VL/\mu = VL/v$

Here, $v=\mu/\rho$ shows dynamic viscosity, V shows representative velocity, L shows representative length, $\rho$ shows density, and $\mu$ shows viscosity.

Flow of the fluid changes at the borderline of the critical Reynolds number; namely below the critical Reynolds number is the laminar flow, while above the critical Reynolds number is the turbulent flow.

Because the space between the processing surfaces 1 and 2 of the fluid processing apparatus is controlled so narrow that amount of the fluid that kept between the processing surfaces 1 and 2 is extremely small. Therefore, the representative length L is very short, so that the centrifugal force of the thin film fluid which passes through between the processing surfaces 1 and 2 is so small that the effect of the viscosity force in the thin film fluid becomes large. Accordingly the Reynolds number becomes smaller so that the thin film fluid becomes the laminar flow.

The centrifugal force, one of the inertia forces in rotation movement, is a force acting from a center to an outside. The centrifugal force can be expressed by the following equation.

Centrifugal force $F=ma=mv^2/R$

Here, "a" shows acceleration, "m" shows mass, "v" shows velocity, and R shows radius.

As mentioned above, amount of the fluid kept between the processing surfaces 1 and 2 is so small so that the ratio of the velocity relative to the fluid mass becomes very large, so that the said mass can be neglected. Accordingly, the effect of gravity can be neglected in the thin film fluid formed between the processing surfaces 1 and 2. Because of this, a microparticle of an alloy or a composite metal compound which contains two or more metal elements having different specific gravities can be separated in the thin film fluid formed between the processing surfaces 1 and 2, even though these are intrinsically difficult to be separated as the microparticle.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Shape of the opening part d20 may be circular as shown by the solid lines in FIG. 2(B) and FIG. 3(B), or a concentric circular ring shape which encloses the central opening of the processing surface 2 having a form of a ring-like disk as shown by the dotted lines in FIG. 2(B). The opening part d20 with the circular ring shape may not be necessarily arranged in the way that it encircles concentrically around the central opening of the processing surface 2. In the case that the opening part is made in the circular ring shape, the opening part having the circular ring shape may be continuous or discontinuous.

If the opening part d20 having the circular ring shape is arranged in the way that it encircles concentrically around the central opening of the processing surface 2, the second fluid that is introduced into between the processing surfaces 1 and 2 can be introduced under the same condition, so that the fluid processing including diffusion, reaction, and separation may be done more uniformly. If the microparticle is wanted to be produced in large quantity, the shape of the opening part is preferably made in the circular ring shape.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned fluid processing apparatus, a treatment such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, specific embodiments as to the method for producing metal microparticles by using the above-mentioned apparatus will be explained.

In the fluid processing apparatus as discussed above, the metal fluid and the reducing agent fluid are mixed in the thin film fluid formed between the processing surfaces 1 and 2 which are disposed in a position they are faced with each other so as to be able to approach to and separate from each other, at least one of which rotates relative to the other, whereby the metal microparticle is separated. During this time, the sulfate ion is contained in the at least any one of fluid to be processed, i.e., the metal fluid and the reducing agent fluid, whereby the molar ratio of the sulfate ion in the mixed fluid to be processed relative to the metal contained in the metal fluid that is introduced into between the processing surfaces 1 and 2 are controlled.

At the time when metal microparticle, especially nickel microparticle is separated by using the fluid processing apparatus as mentioned above, the metal fluid is made to contain the sulfate ion, and at least any one of the fluids to be separated, i.e., at least any one of the metal fluid and the reducing agent fluid is made to contain a polyol, and then, pH of the metal fluid introduced into between the processing surfaces 1 and 2 as well as the molar ratio of the sulfate ion to the metal in the metal fluid may be controlled. Further, the metal fluid is made to contain the sulfate ion, and at least any one of the fluids to be processed, i.e., at least any one of the metal fluid and the reducing agent fluid is made to contain a polyol, and then, the concentration of the polyol in at least any one of the fluids to be separated, i.e., the concentration of the polyol in at least any one of the metal fluid and the reducing agent fluid which is introduced into between the processing surfaces 1 and 2 as well as the molar ratio of the sulfate ion to the metal in the metal fluid may be controlled.

The separation of the metal microparticles takes place in the apparatus as shown in FIG. 1 of the present application while the fluids are being mixed forcibly and uniformly between the processing surfaces 1 and 2 which are disposed in a position they are faced with each other so as to be able to approach to and separate from each other, at least one of which rotates relative to the other.

At first, the reducing agent fluid is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Next, from the second introduction part d2, which is the separate flow path, the metal fluid is introduced as the second fluid directly into the first fluid film formed between the processing surfaces 1 and 2.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby separating the metal microparticles.

As mentioned before, the processing apparatus may be provided with, in addition to the first introduction part d1 and the second introduction part d2, the third introduction part d3; and in this case, for example, each of the metal fluid, the reducing agent fluid, and the sulfate ion may be introduced respectively into the processing apparatus. By so doing, concentration and pressure of each fluid can be controlled separately so that the separation reaction and particle diameter of the microparticles may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided.

In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Temperature:

In the present invention, the temperature at the time when the metal fluid and the reducing agent fluid are mixed is not particularly restricted. Arbitrary temperature may be chosen in accordance with the kinds of the metal, metal compound and of the reducing agent, pH of the fluids, and the like.

The case that oxide or hydroxide is included:

In addition, the presently applied invention may be executed as the embodiment in which the metal microparticle partly contains an oxide, a hydroxide, an oxyhydroxide, or the like.

EXAMPLES

Hereinafter, the present invention will be explained in more detail by Examples; but the present invention is not limited only to these Examples.

It is to be noted here that the term "from the center" in the following Examples means "from the first introduction part d1" of the fluid processing apparatus shown in FIG. 1; the first fluid means the first fluid to be processed that is introduced through the first introduction part d1 of the fluid processing apparatus as described before; and the second fluid means the second fluid to be processed that is introduced through the second introduction part d2 of the processing apparatus shown in FIG. 1, as described before.

In addition, the opening part d20 of the second introduction part d2 having a concentric circular ring shape which encloses the central opening of the processing surface 2 as shown by the dotted lines in FIG. 2(B) was used.

Each of Examples will be identified by adding "A" in front of Example No. and Comparative Example No. for Examples and Comparative Examples relating to the method for producing the nickel microparticle, "B" in front of Example No. and Comparative Example No. for Examples and Comparative Examples relating to the method for producing the silver microparticle, and "C" in front of Example No. and Comparative Example No. for Examples and Comparative Examples relating to the method for producing the copper microparticle. However, in Tables 1 to 56, "A", "B", and "C" are omitted.

(A) Method for Producing Nickel Microparticle

Firstly, the method for producing the nickel microparticle will be specifically explained by showing Examples.

Separation of the Nickel Microparticle:

By using the fluid processing apparatus shown in FIG. 1, the nickel compound fluid and the reducing agent fluid are mixed in the thin film fluid formed between the processing surfaces 1 and 2 which are disposed in a position they are faced with each other so as to be able to approach to and separate from each other, at least one of which rotates relative to the other, whereby the nickel microparticle is separated in this thin film fluid.

Specifically, from the center, the nickel compound fluid is supplied as the first fluid with the supply pressure of 0.50 MPaG. The first fluid is supplied to the closed space formed between the processing surface 1 of the processing member 10 and the processing surface 2 of the processing member 20 (between the processing surfaces) in FIG. 1. The rotation number of the processing member 10 is 3,600 rpm. The first fluid forms the forced thin film fluid between the processing surfaces 1 and 2, and then it is discharged from the circumferences of the processing members 10 and 20. The reducing agent fluid is introduced as the second fluid directly into the thin film fluid formed between the processing surfaces 1 and 2. The nickel compound fluid and the reducing agent fluid are mixed between the processing surfaces 1 and 2, the space therebetween being controlled so as to be a very narrow distance, whereby the nickel microparticle is separated. The slurry which contains the nickel microparticle (nickel microparticle dispersion solution) is discharged from between the processing surfaces 1 and 2.

Method for Recovering the Microparticle:

The nickel microparticle dispersion solution that was discharged from between the processing surfaces 1 and 2 was placed on a magnet to settle the nickel microparticle down; and after the supernatant solution was removed, the washing operation thereof by pure water was repeated for three times, and then the wet cake thus obtained was dried under the atmospheric pressure at 25° C. to obtain the dry powder of the nickel microparticle.

Measurement of pH of the first fluid and the second fluid as well as the analysis of the dry powder of the nickel microparticle was done as follows.

Measurement of pH:

Measurement of pH was done by using the pH meter (Type D-51, manufactured by HORIBA, Ltd.). Before each of the fluids to be processed was introduced into the fluid processing apparatus, pH of each of the fluids to be processed was measured at room temperature.

Observation by the Scanning Electron Microscope:

Observation by the scanning electron microscope (SEM) was done by using the field-emission-type scanning electron microscope (FE-SEM) (JSM-7500F, manufactured by JEOL Ltd.). The observation condition with the magnification of 10,000 or more was used, wherein the average value of the particle diameters of 100 nickel microparticles obtained by the SEM observation was taken as the primary particle diameter.

Measurement of the X-Ray Diffraction:

Measurement of the X-ray diffraction (XRD) was made by using the powder X-ray diffraction measurement instrument X'pert PRO MPD (XRD; manufactured by Panalytical Business Unit of Spectris Co., Ltd.). The measurement conditions were as follows: Cu anticathode, tube voltage of 45 kV, tube current of 40 mA, 0.016 step/10 second, and the measurement range of 10 to 100°/2θ (Cu). The crystallite's diameter of the obtained nickel microparticle was calculated from the XRD measurement. The peak confirmed at 47.3° C. was used for the polycrystalline silicon plate, and the Scherrer's equation was applied to the peak appeared near to 44.5° in the obtained nickel diffraction pattern.

ICP Analysis—Detection of Impure Elements:

Quantitative analysis of the elements contained in the dry powder of the nickel microparticle by the inductively coupled plasma atomic emission spectrophotometry (ICP) was carried out by using ICPS-8100 (manufactured by Shimadzu Corp.).

The solution in which the dry powder of the nickel microparticle was dissolved in nitric acid was used for the measurement. In all of Examples A and Comparative Examples A, all the elements other than the nickel element were outside the detection limit.

Examples A1 to A17

The nickel compound fluid having the composition shown in Table 1 and the reducing agent fluid having the composition shown in Table 2 were mixed to separate the nickel microparticle under the treatment condition shown in Table 3 by using the fluid processing apparatus shown in FIG. 1. The dry powder of the obtained nickel microparticle was analyzed. These results are shown in Table 4. Meanwhile, the supply pressure of the first fluid and the rotation number of the processing member 10 were those as mentioned before. In all of Examples A1 to A17, the nickel microparticle dispersion solution discharged from the processing surfaces 1 and 2 showed a basicity.

In Examples A1 to A14, the nickel compound fluid was prepared as follows: nickel sulfate hexahydrate was dissolved in the mixed solvent comprising ethylene glycol, polyethylene glycol 600, and pure water, and in order to change pH and concentration of the sulfate ion, sulfuric acid, ammonium sulfate, or potassium sulfate was added separately as the sulfate compound. In Examples A15 to A17, the nickel compound fluid was obtained by following the same procedure as Examples A1 to A14, except that polyvinyl pyrrolidone (k=30) was used in place of polyethylene glycol 600.

The abbreviations used in Table 1 to Table 16 are as follows: $NiSO_4 \cdot 6H_2O$; nickel sulfate hexahydrate, EG; ethylene glycol, PEG 600; polyethylene glycol 600, PVP (k=30); polyvinyl pyrrolidone, PW; pure water, HMH; hydrazine monohydrate, KOH; potassium hydroxide, $H_2SO_4$; sulfuric acid, $(NH_4)_2SO_4$; ammonium sulfate, $K_2SO_4$; potassium sulfate, $HNO_3$; nitric acid, $KNO_3$; potassium nitrate, $CH_3COOH$; acetic acid, $CH_3COOK$; potassium acetate, $SO_4^{2-}$; sulfate ion, and $CH_3COO^-$; acetate ion.

TABLE 1

| | First fluid: Composition | | | | | | | | |
|---|---|---|---|---|---|---|---|---|---|
| Example | EG | PEG 600 | PVP (k = 30) | PW | $NiSO_4 \cdot 6H_2O$ | $H_2SO_4$ | $(NH_4)_2SO_4$ | $K_2SO_4$ | pH |
| | Concentration (% by weight) | | | | Concentration (mol/L) | | | | |
| 1 | 81 | 0.8 | 0.0 | 13 | 0.20 | 0.0000 | 0.0000 | 0.0000 | 4.1 |
| 2 | 81 | 0.8 | 0.0 | 13 | 0.20 | 0.0000 | 0.0000 | 0.0049 | 4.1 |
| 3 | 81 | 0.8 | 0.0 | 13 | 0.20 | 0.0008 | 0.0000 | 0.0275 | 4.1 |
| 4 | 80 | 0.8 | 0.0 | 13 | 0.20 | 0.0035 | 0.0000 | 0.0014 | 3.1 |
| 5 | 80 | 0.8 | 0.0 | 13 | 0.20 | 0.0073 | 0.0000 | 0.0483 | 3.1 |
| 6 | 80 | 0.8 | 0.0 | 13 | 0.20 | 0.0073 | 0.0000 | 0.0483 | 3.1 |
| 7 | 81 | 0.8 | 0.0 | 13 | 0.20 | 0.0049 | 0.0000 | 0.0000 | 3.0 |
| 8 | 81 | 0.8 | 0.0 | 13 | 0.20 | 0.0061 | 0.0000 | 0.0222 | 3.0 |
| 9 | 81 | 0.8 | 0.0 | 13 | 0.20 | 0.0484 | 0.0000 | 0.0000 | 2.0 |
| 10 | 81 | 0.8 | 0.0 | 13 | 0.20 | 0.0754 | 0.0000 | 0.0210 | 2.0 |
| 11 | 80 | 1.6 | 0.0 | 13 | 0.20 | 0.0484 | 0.0000 | 0.0000 | 1.7 |
| 12 | 80 | 1.6 | 0.0 | 13 | 0.20 | 0.0831 | 0.0133 | 0.0000 | 1.7 |
| 13 | 80 | 0.8 | 0.0 | 13 | 0.20 | 0.0964 | 0.0000 | 0.0000 | 1.4 |
| 14 | 80 | 0.8 | 0.0 | 13 | 0.20 | 0.1213 | 0.0133 | 0.0000 | 1.4 |
| 15 | 80 | 0.0 | 0.1 | 13 | 0.30 | 0.0320 | 0.0000 | 0.0000 | 2.2 |
| 16 | 73 | 0.0 | 0.1 | 17 | 0.39 | 0.0420 | 0.0000 | 0.0000 | 2.2 |
| 17 | 64 | 0.0 | 0.1 | 26 | 0.39 | 0.0580 | 0.0000 | 0.0000 | 1.7 |

TABLE 2

Second fluid: Composition

| Concentration (% by weight) | | | |
|---|---|---|---|
| HMH | KOH | PW | pH |
| 70.00 | 10.00 | 20.00 | 14< |

TABLE 3

| | First fluid | | Second fluid | |
|---|---|---|---|---|
| Example | Supply flow rate (mL/minute) | Supply temperature (° C.) | Supply flow rate (mL/minute) | Supply temperature (° C.) |
| 1 | 400 | 135 | 30 | 30 |
| 2 | 400 | 135 | 30 | 30 |
| 3 | 400 | 135 | 30 | 30 |
| 4 | 400 | 137 | 40 | 30 |
| 5 | 400 | 137 | 35 | 30 |
| 6 | 400 | 137 | 50 | 30 |
| 7 | 400 | 133 | 30 | 30 |
| 8 | 400 | 133 | 30 | 30 |
| 9 | 400 | 136 | 35 | 30 |
| 10 | 400 | 136 | 50 | 30 |
| 11 | 400 | 154 | 30 | 30 |
| 12 | 400 | 154 | 35 | 30 |
| 13 | 400 | 155 | 50 | 30 |
| 14 | 800 | 149 | 100 | 30 |
| 15 | 400 | 154 | 52.5 | 30 |
| 16 | 800 | 155 | 140 | 30 |
| 17 | 400 | 155 | 80 | 30 |

TABLE 4

| Example | First fluid pH | $SO_4^{2-}$/Ni | Crystallite diameter d (nm) | Particle diameter D (nm) | d/D |
|---|---|---|---|---|---|
| 1 | 4.1 | 1.00 | 26.4 | 129.3 | 0.20 |
| 2 | 4.1 | 1.02 | 30.8 | 100.9 | 0.31 |
| 3 | 4.1 | 1.14 | 32.1 | 99.8 | 0.32 |
| 4 | 3.1 | 1.02 | 47.2 | 149.3 | 0.32 |
| 5 | 3.1 | 1.28 | 50.5 | 152.3 | 0.33 |
| 6 | 3.1 | 1.28 | 39.9 | 119.8 | 0.33 |
| 7 | 3.0 | 1.02 | 30.1 | 91.1 | 0.33 |
| 8 | 3.0 | 1.14 | 31.2 | 85.4 | 0.37 |
| 9 | 2.0 | 1.24 | 37.7 | 79.4 | 0.47 |
| 10 | 2.0 | 1.49 | 32.3 | 80.3 | 0.54 |
| 11 | 1.7 | 1.24 | 34.9 | 98.7 | 0.35 |
| 12 | 1.7 | 1.49 | 35.6 | 74.2 | 0.48 |
| 13 | 1.4 | 1.49 | 35.6 | 101.2 | 0.35 |
| 14 | 1.4 | 1.67 | 55.6 | 118.4 | 0.47 |
| 15 | 2.2 | 1.11 | 49.9 | 111.5 | 0.45 |
| 16 | 2.2 | 1.11 | 48.0 | 121.5 | 0.40 |
| 17 | 1.7 | 1.15 | 41.5 | 80.6 | 0.51 |

From Table 4, it was confirmed that by controlling the molar ratio of $SO_4^{2-}$/Ni, i.e., the molar ratio of the sulfate ion relative to the nickel contained in the first fluid, the growth of the crystallite's diameter could be facilitated while suppressing the growth of the particle diameter of the separated nickel microparticle. In addition, it was confirmed that the growth of the particle diameter could be suppressed as the crystallite's diameter grew. Accordingly, it was confirmed that the ratio d/D, i.e., the ratio of the crystallite's diameter relative to the particle diameter of the nickel microparticle, could be controlled.

In Examples A1 to A17, pH of the first fluid was 4.1 or lower. In the case that pH of the first fluid was 4.1 or lower, it was confirmed that by controlling the molar ratio of $SO_4^{2-}$/Ni, i.e., the molar ratio of the sulfate ion relative to the nickel contained in the first fluid, so as to be more than 1.0, the nickel microparticle having the ratio d/D of 0.30 or more and the crystallite's diameter (d) of 30 nm or more could be produced. In the nickel microparticle having the ratio d/D of 0.30 or more and the nickel microparticle having the crystallite's diameter of 30 nm or more, the shrinkage after heat-treatment can be suppressed; and thus, it was confirmed the nickel microparticle that is suitable for the ceramic condenser could be produced.

Furthermore, in Examples A15 to A18 in which polyethylene glycol 600 used in Examples A1 to A14 was replaced by polyvinyl pyrrolidone (k=30), the similar results as Examples A1 to A14 were obtained.

In Examples A1 to A14, in the case when pH of the first fluid was identical, it was found that by raising the molar ratio of $SO_4^{2-}$/Ni, i.e., the molar ratio of the sulfate ion relative to the nickel contained in the first fluid, the ratio of d/D could be made larger; while by lowering the molar ratio of $SO_4^{2-}$/Ni, i.e., the molar ratio of the sulfate ion relative to the nickel contained in the first fluid, the ratio of d/D could be made smaller.

Examples A18 to A23

The dry powder of the nickel microparticle was obtained by following the procedure of Examples A1 to A17, except that the composition of the nickel compound fluid was changed as shown in Table 5 and the process condition was changed as shown in Table 6. These results are shown in Table 7. In all of Examples A15 to A23, the nickel microparticle dispersion solution discharged from the processing surfaces 1 and 2 showed a basicity.

TABLE 5

| | First fluid: Composition | | | | | | | |
|---|---|---|---|---|---|---|---|---|
| | EG | PEG 600 | PW | $NiSO_4 \cdot 6H_2O$ | $H_2SO_4$ | $(NH_4)_2SO_4$ | $K_2SO_4$ | |
| | Concentration | | | Concentration | | | | |
| Example | (% by weight) | | | (mol/L) | | | | pH |
| 18 | 81 | 0.8 | 13 | 0.20 | 0.0000 | 0.0283 | 0.0000 | 4.2 |
| 19 | 81 | 0.8 | 13 | 0.20 | 0.0015 | 0.0000 | 0.0468 | 4.2 |
| 20 | 81 | 0.8 | 13 | 0.20 | 0.0000 | 0.0000 | 0.0283 | 4.4 |
| 21 | 81 | 0.8 | 13 | 0.20 | 0.0000 | 0.0000 | 0.0483 | 4.4 |
| 22 | 81 | 0.8 | 13 | 0.20 | 0.0000 | 0.0000 | 0.0483 | 4.6 |
| 23 | 81 | 0.8 | 13 | 0.20 | 0.0000 | 0.0000 | 0.0483 | 4.7 |

TABLE 6

| | First fluid | | Second fluid | |
|---|---|---|---|---|
| Example | Supply flow rate (mL/minute) | Supply temperature (° C.) | Supply flow rate (mL/minute) | Supply temperature (° C.) |
| 18 | 400 | 137 | 50 | 30 |
| 19 | 400 | 137 | 30 | 30 |
| 20 | 400 | 137 | 50 | 30 |
| 21 | 400 | 137 | 35 | 30 |
| 22 | 400 | 155 | 50 | 30 |
| 23 | 800 | 148 | 60 | 30 |

TABLE 7

| Example | First fluid pH | Molar ratio $SO_4^{2-}$/Ni | Crystallite diameter d (nm) | Particle diameter D (nm) | d/D |
|---|---|---|---|---|---|
| 18 | 4.2 | 1.14 | 42.3 | 153.3 | 0.28 |
| 19 | 4.2 | 1.24 | 38.5 | 123.4 | 0.31 |
| 20 | 4.4 | 1.14 | 38.3 | 141.2 | 0.27 |
| 21 | 4.4 | 1.24 | 53 | 172.9 | 0.31 |
| 22 | 4.6 | 1.24 | 36.9 | 150.0 | 0.25 |
| 23 | 4.7 | 1.24 | 22.6 | 149.0 | 0.15 |

From Table 7, it was confirmed that by controlling the molar ratio of $SO_4^{2-}$/Ni, i.e., the molar ratio of the sulfate ion relative to the nickel contained in the first fluid, the growth of the crystallite's diameter could be facilitated while suppressing the growth of the particle diameter of the separated nickel microparticle. In addition, it was confirmed that the growth of the particle diameter could be suppressed as the crystallite's diameter grew. Accordingly, it was confirmed that the ratio d/D, i.e., the ratio of the crystallite's diameter relative to the particle diameter of the nickel microparticle, could be controlled.

In Examples A18 to A23, pH of the first fluid was in the range of higher than 4.1 to 4.7 or lower. In the case that pH of the first fluid was in the range of higher than 4.1 to 4.4 or lower, it was confirmed that by controlling the molar ratio of $SO_4^{2-}$/Ni, i.e., the molar ratio of the sulfate ion relative to the nickel contained in the first fluid, so as to be more than 1.2, the nickel microparticle having the ratio d/D of 0.30 or more could be obtained. In addition, in the case that pH of the first fluid was in the range of higher than 4.1 to 4.4 or lower, it was confirmed that by controlling the molar ratio of $SO_4^{2-}$/Ni, i.e., the molar ratio of the sulfate ion relative to the nickel contained in the first fluid, so as to be more than 1.1, the nickel microparticle having the crystallite's diameter of 30 nm or more could be produced.

In Examples A18 to A23, in the case when pH of the first fluid was identical, it was found that by increasing the molar ratio of $SO_4^{2-}$/Ni, i.e., the molar ratio of the sulfate ion relative to the nickel contained in the first fluid, the ratio of d/D could be made larger; while by lowering the molar ratio of $SO_4^{2-}$/Ni, i.e., the molar ratio of the sulfate ion relative to the nickel contained in the first fluid, the ratio of d/D could be made smaller.

Comparative Examples A1 to A7

The dry powder of the nickel microparticle was obtained by following the procedure of Examples A1 to A11, except that the composition of the nickel compound fluid was changed as shown in Table 8 and the process condition was changed as shown in Table 9. These results are shown in Table 10. In all of Comparative Examples A1 to A7, the nickel microparticle dispersion solution discharged from the processing surfaces 1 and 2 showed a basicity.

The nickel compound fluid was prepared as follows: nickel sulfate hexahydrate was dissolved in the mixed solvent comprising ethylene glycol, polyethylene glycol 600, and pure water, and in order to change only pH, nitric acid and/or potassium nitrate was added separately.

TABLE 8

| Comparative Example | First fluid: Composition | | | | | | | | | |
|---|---|---|---|---|---|---|---|---|---|---|
| | EG | PEG 600 Concentration | PW | $NiSO_4 \cdot 6H_2O$ | $H_2SO_4$ | $(NH_4)_2SO_4$ Concentration | $K_2SO_4$ | $HNO_3$ | $KNO_3$ | |
| | (% by weight) | | | (mol/L) | | | | | | pH |
| 1 | 80 | 0.8 | 13 | 0.20 | 0.0000 | 0.0000 | 0.0000 | 0.0480 | 0.0000 | 1.98 |
| 2 | 80 | 0.8 | 13 | 0.20 | 0.0000 | 0.0000 | 0.0000 | 0.0988 | 0.0000 | 1.74 |
| 3 | 80 | 0.8 | 13 | 0.20 | 0.0000 | 0.0000 | 0.0000 | 0.0480 | 0.0000 | 1.98 |
| 4 | 80 | 0.8 | 13 | 0.20 | 0.0000 | 0.0000 | 0.0000 | 0.0988 | 0.0000 | 1.74 |
| 5 | 80 | 0.8 | 13 | 0.20 | 0.0000 | 0.0000 | 0.0000 | 0.0240 | 0.0240 | 3.11 |
| 6 | 80 | 0.8 | 13 | 0.20 | 0.0000 | 0.0000 | 0.0000 | 0.0000 | 0.0480 | 4.19 |
| 7 | 80 | 0.8 | 13 | 0.20 | 0.0000 | 0.0000 | 0.0000 | 0.0000 | 0.0988 | 4.38 |

TABLE 9

| Comparative Example | First fluid | | Second fluid | |
|---|---|---|---|---|
| | Supply flow rate (mL/minute) | Supply temperature (° C.) | Supply flow rate (mL/minute) | Supply temperature (° C.) |
| 1 | 400 | 135 | 40 | 30 |
| 2 | 400 | 136 | 50 | 30 |
| 3 | 400 | 154 | 40 | 30 |
| 4 | 400 | 152 | 50 | 30 |
| 5 | 400 | 153 | 40 | 30 |
| 6 | 400 | 151 | 40 | 30 |
| 7 | 400 | 153 | 40 | 30 |

TABLE 10

| Comparative Example | First fluid pH | $SO_4^{2-}$/Ni | Molar ratio $NO_3^-$/Ni | Crystallite diameter d (nm) | Particle diameter D (nm) | d/D |
|---|---|---|---|---|---|---|
| 1 | 1.98 | 1.00 | 0.24 | 34.3 | 205.4 | 0.17 |
| 2 | 1.74 | 1.00 | 0.49 | 35.9 | 224.1 | 0.16 |
| 3 | 1.98 | 1.00 | 0.24 | 28.9 | 124.5 | 0.23 |
| 4 | 1.74 | 1.00 | 0.49 | 27.5 | 112.3 | 0.24 |
| 5 | 3.11 | 1.00 | 0.24 | 21.1 | 101.1 | 0.21 |
| 6 | 4.19 | 1.00 | 0.24 | 18.6 | 94.6 | 0.20 |
| 7 | 4.38 | 1.00 | 0.49 | 16.7 | 87.6 | 0.19 |

From Table 10, in Comparative Examples A1 to A2, in which pH of the first fluid was 4.1 or lower, the supply temperature thereof was 135° C.±2° C., and the molar ratio of $SO_4^{2-}$/Ni, i.e., the molar ratio of the sulfate ion relative to the nickel contained in the first fluid, was made constant at 1.00, the crystallite's diameter (d) of the nickel microparticle obtained therein became 30 nm or more; however, at the same time, the particle diameter (D) thereof was increased as well, so that the ratio of d/D was significantly lower than 0.30. Further, in Comparative Examples A3 to A5, in which pH of the first fluid was 4.1 or lower, the supply temperature thereof was 153° C.±2° C., and the molar ratio of $SO_4^{2-}/Ni$, i.e., the molar ratio of the sulfate ion relative to the nickel contained in the first fluid, was made constant at 1.00, the crystallite's diameter (d) of the nickel microparticle obtained therein was less than 30 nm, and the ratio of d/D was less than 0.30. Further, in Comparative Examples A6 to A7, in which pH of the first fluid was in the range of more than 4.1 to 4.4 or lower, the supply temperature thereof was 153° C.±2° C., and the molar ratio of $SO_4^{2-}/Ni$, i.e., the molar ratio of the sulfate ion relative to the nickel contained in the first fluid, was made constant at 1.00, the crystallite's diameter (d) of the nickel microparticle obtained therein was less than 30 nm, and the ratio of d/D was less than 0.30. Even when the molar ratio of the total of sulfate ion and the nitrate ion relative to the nickel contained in the first fluid was more than 1.20, the ratio of d/D did not become 0.30 or more.

It was confirmed that the ratio of d/D could not be controlled by changing only pH of the first fluid while the molar ratio of $SO_4^{2-}/Ni$, i.e., the molar ratio of the sulfate ion relative to the nickel contained in the first fluid, was being kept constant at 1.00.

Comparative Examples A8 to A12

The dry powder of the nickel microparticle was obtained by following the procedure of Examples A1 to A17, except that the composition of the nickel compound fluid was changed as shown in Table 11 and the process condition was changed as shown in Table 12. These results are shown in Table 13. In all of Comparative Examples A8 to A12, the nickel microparticle dispersion solution discharged from the processing surfaces 1 and 2 showed a basicity.

The nickel compound fluid was prepared as follows: nickel sulfate hexahydrate was dissolved in the mixed solvent comprising ethylene glycol, polyethylene glycol 600, and pure water, and in order to change only pH, acetic acid and/or potassium acetate was added separately.

TABLE 11

| Comparative Example | First fluid: Composition | | | | | | | | | |
|---|---|---|---|---|---|---|---|---|---|---|
| | EG | PEG 600 | PW | $NiSO_4 \cdot 6H_2O$ | $H_2SO_4$ | $(NH_4)_2SO_4$ | $K_2SO_4$ | $CH_3COOH$ | $CH_3COOK$ | |
| | Concentration (% by weight) | | | Concentration (mol/L) | | | | | | pH |
| 8  | 80 | 0.8 | 13 | 0.20 | 0.0000 | 0.0000 | 0.0000 | 0.0480 | 0.0000 | 3.63 |
| 9  | 80 | 0.8 | 13 | 0.20 | 0.0000 | 0.0000 | 0.0000 | 0.0988 | 0.0000 | 3.04 |
| 10 | 80 | 0.8 | 13 | 0.20 | 0.0000 | 0.0000 | 0.0000 | 0.0240 | 0.0240 | 3.91 |
| 11 | 80 | 0.8 | 13 | 0.20 | 0.0000 | 0.0000 | 0.0000 | 0.0000 | 0.0480 | 4.22 |
| 12 | 80 | 0.8 | 13 | 0.20 | 0.0000 | 0.0000 | 0.0000 | 0.0000 | 0.0988 | 4.39 |

TABLE 12

| Comparative Example | First fluid | | Second fluid | |
|---|---|---|---|---|
| | Supply flow rate (mL/minute) | Supply temperature (° C.) | Supply flow rate (mL/minute) | Supply temperature (° C.) |
| 8  | 400 | 153 | 40 | 30 |
| 9  | 400 | 151 | 50 | 30 |
| 10 | 400 | 155 | 40 | 30 |
| 11 | 400 | 152 | 40 | 30 |
| 12 | 400 | 153 | 50 | 30 |

TABLE 13

| Comparative Example | First fluid pH | $SO_4^{2-}/Ni$ | Molar ratio $CH_3COO^-/Ni$ | Crystallite diameter d (nm) | Particle diameter D (nm) | d/D |
|---|---|---|---|---|---|---|
| 8  | 3.63 | 1.00 | 0.24 | 32.4 | 154.6 | 0.21 |
| 9  | 3.04 | 1.00 | 0.49 | 33.1 | 178.6 | 0.19 |
| 10 | 3.91 | 1.00 | 0.24 | 32.9 | 136.8 | 0.24 |
| 11 | 4.22 | 1.00 | 0.24 | 19.8 | 114.6 | 0.17 |
| 12 | 4.39 | 1.00 | 0.49 | 18.7 | 108.7 | 0.17 |

From Table 13, in Comparative Examples A8, A9, and A10, in which pH of the first fluid was 4.1 or lower, the supply temperature thereof was 153° C.±2° C., and the molar ratio of $SO_4^{2-}/Ni$, i.e., the molar ratio of the sulfate ion relative to the nickel contained in the first fluid, was made constant at 1.00, the crystallite's diameter (d) of the nickel microparticle obtained therein was 30 nm or more; however, the particle diameter (D) thereof was increased simultaneously, so that the ratio of d/D was significantly lower than 0.30. Further, in Comparative Examples A11 to A12, in which pH of the first fluid was in the range of higher than 4.1 to 4.4 or lower, the supply temperature thereof was 153° C.±2° C., and the molar ratio of $SO_4^{2-}$/Ni, i.e., the molar ratio of the sulfate ion relative to the nickel contained in the first fluid, was made constant at 1.00, the crystallite's diameter (d) of the nickel microparticle obtained therein was less than 30 nm, and the ratio of d/D was less than 0.30. When the molar ratio of the total of sulfate ion and the acetate ion relative to the nickel contained in the first fluid was more than 1.20, the ratio of d/D did not become 0.3 or more.

It was confirmed that the ratio of d/D could not be controlled by changing only pH of the first fluid while the molar ratio of $SO_4^{2-}$/Ni, i.e., the molar ratio of the sulfate ion relative to the nickel contained in the first fluid, was being kept constant at 1.00.

Examples A24 to A31

The nickel compound fluid having the composition shown in Table 14 and the reducing agent fluid having the composition shown in Table 15 were mixed under the treatment condition shown in Table 16 by using the fluid processing apparatus shown in FIG. 1 to separate the nickel microparticle. The dry powder of the obtained nickel microparticle was analyzed. These results are shown in Table 17. Meanwhile, the supply pressure of the first fluid and the rotation number of the processing member 10 were those as mentioned before. In all of Examples A24 to A31, the nickel microparticle dispersion solution discharged from the processing surfaces 1 and 2 showed a basicity.

The nickel compound fluid was prepared as follows: nickel sulfate hexahydrate was dissolved in the mixed solvent comprising ethylene glycol, polyethylene glycol 600, and pure water, wherein in Examples A24 to A28 the same amount of sulfuric acid was added separately, and in Examples A29 to A31, sulfuric acid was not added. In each of Examples A24 to A28 and Examples A29 to A31, the concentration of polyethylene glycol 600 contained in the nickel compound fluid was changed.

TABLE 14

| | First fluid: Composition | | | | | | | |
|---|---|---|---|---|---|---|---|---|
| Example | EG | PEG 600 Concentration (% by weight) | PW | $NiSO_4 \cdot 6H_2O$ | $H_2SO_4$ Concentration (mol/L) | $(NH_4)_2SO_4$ | $K_2SO_4$ | pH |
| 24 | 81 | 0.0 | 13 | 0.20 | 0.0484 | 0.0000 | 0.0000 | 1.9 |
| 25 | 81 | 0.4 | 13 | 0.20 | 0.0484 | 0.0000 | 0.0000 | 2.0 |
| 26 | 81 | 0.8 | 13 | 0.20 | 0.0484 | 0.0000 | 0.0000 | 2.0 |
| 27 | 81 | 1.2 | 13 | 0.20 | 0.0484 | 0.0000 | 0.0000 | 1.9 |
| 28 | 81 | 1.6 | 13 | 0.20 | 0.0484 | 0.0000 | 0.0000 | 1.7 |
| 29 | 81 | 0.8 | 13 | 0.20 | 0.0000 | 0.0000 | 0.0000 | 4.4 |
| 30 | 81 | 1.2 | 13 | 0.20 | 0.0000 | 0.0000 | 0.0000 | 4.4 |
| 31 | 81 | 1.6 | 13 | 0.20 | 0.0000 | 0.0000 | 0.0000 | 4.4 |

TABLE 15

| Second fluid: Composition | | | |
|---|---|---|---|
| Concentration (% by weight) | | | |
| HMH | KOH | PW | pH |
| 70.00 | 10.00 | 20.00 | 14< |

TABLE 16

| | First fluid | | Second fluid | |
|---|---|---|---|---|
| Example | Supply flow rate (mL/minute) | Supply temperature (° C.) | Supply flow rate (mL/minute) | Supply temperature (° C.) |
| 24 | 400 | 151 | 50 | 30 |
| 25 | 400 | 153 | 50 | 30 |
| 26 | 400 | 155 | 50 | 30 |
| 27 | 400 | 151 | 50 | 30 |
| 28 | 400 | 150 | 50 | 30 |
| 29 | 400 | 152 | 50 | 30 |
| 30 | 400 | 154 | 50 | 30 |
| 31 | 400 | 151 | 50 | 30 |

TABLE 17

| Example | First fluid pH | $SO_4^{2-}$/Ni | Crystallite diameter d (nm) | Particle diameter D (nm) | d/D | PEG 600 Concentration (% by weight) |
|---|---|---|---|---|---|---|
| 24 | 1.9 | 1.24 | 54.0 | 151.2 | 0.36 | 0.0 |
| 25 | 2.0 | 1.24 | 30.1 | 79.6 | 0.38 | 0.4 |

TABLE 17-continued

| Example | First fluid pH | $SO_4^{2-}$/Ni | Crystallite diameter d (nm) | Particle diameter D (nm) | d/D | PEG 600 Concentration (% by weight) |
|---|---|---|---|---|---|---|
| 26 | 2.0 | 1.24 | 34.4 | 81.2 | 0.42 | 0.8 |
| 27 | 1.9 | 1.24 | 36.9 | 76.9 | 0.48 | 1.2 |
| 28 | 1.7 | 1.24 | 31.3 | 81.1 | 0.39 | 1.6 |
| 29 | 4.4 | 1.00 | 53.0 | 311.2 | 0.17 | 0.8 |
| 30 | 4.4 | 1.00 | 31.1 | 251.4 | 0.12 | 1.2 |
| 31 | 4.4 | 1.00 | 16.7 | 206.1 | 0.08 | 1.6 |

From Table 17, in Examples A25 to A27, in which the molar ratio of $SO_4^{2-}$/Ni, i.e., the molar ratio of the sulfate ion relative to the nickel contained in the first fluid, was 1.24, there was a tendency that by increasing the concentration of polyethylene glycol 600, the crystallite's diameter (d) of the nickel microparticle increased, but the particle diameter (D) thereof did not become so large. It was confirmed that there is a tendency that while suppressing the growth of the particle diameter of the separated nickel microparticle, the growth of the crystallite's diameter is facilitated. In addition, it was confirmed that there is a tendency that the growth of the particle diameter is suppressed as the crystallite grows. Therefore, it was confirmed that by increasing the concentration of polyethylene glycol 600, there is a tendency that the ratio of d/D becomes larger. Further, in Examples A24 to A28, the nickel microparticle having 0.30 or more in the ratio of d/D and 30 nm or more in the crystallite's diameter (d) could be obtained.

In Examples A29 to A31, in which the molar ratio of $SO_4^{2-}$/Ni, i.e., the molar ratio of the sulfate ion relative to the nickel contained in the first fluid, was 1.00, there is a tendency that by increasing the concentration of polyethylene glycol 600, the crystallite's diameter (d) and the particle diameter (D) of the nickel microparticle become smaller. Therefore, it was confirmed that by increasing the concentration of polyethylene glycol 600, there is a tendency that the ratio of d/D becomes smaller. Further, in Examples A29 to A30, the nickel microparticle having 30 nm or more in the crystallite's diameter (d) could be obtained, though the ratio d/D thereof was significantly lower than 0.30.

Accordingly, it was shown that there is a possibility that in the region where the molar ratio of $SO_4^{2-}$/Ni, i.e., the molar ratio of the sulfate ion relative to the nickel contained in the first fluid, is more than 1.00, by increasing the concentration of polyethylene glycol 600, the ratio of d/D may be made larger.

(B) Method for Producing Silver Microparticle

Next, the method for producing the silver microparticle will be specifically explained by showing Examples.
Separation of the Silver Microparticle:

By using the fluid processing apparatus shown in FIG. 1, the silver-containing fluid and the reducing agent fluid are mixed in the thin film fluid formed between the processing surfaces 1 and 2 which are disposed in a position they are faced with each other so as to be able to approach to and separate from each other, at least one of which rotates relative to the other, whereby the silver microparticle is separated in this thin film fluid.

Specifically, from the center, the at least any one of the silver-containing fluid or the reducing agent fluid is supplied as the first fluid with the supply pressure of 0.50 MPaG. The first fluid is supplied to the sealed space formed between the processing surface 1 of the processing member 10 and the processing surface 2 of the processing member 20 (between the processing surfaces) in FIG. 1. The rotation number of the processing member 10 is 500 rpm. The first fluid forms the forced thin film fluid between the processing surfaces 1 and 2, and then it is discharged from the circumferences of the processing members 10 and 20. Anyone of the silver-containing fluid or the reducing agent fluid other than the foregoing fluid is introduced as the second fluid directly into the thin film fluid formed between the processing surfaces 1 and 2. The silver-containing fluid and the reducing agent fluid are mixed between the processing surfaces 1 and 2, the space therebetween being controlled so as to be a very narrow distance, whereby the silver microparticle is separated. The slurry which contains the silver microparticle (nickel microparticle dispersion solution) is discharged from between the processing surfaces 1 and 2.

Method for Recovering Microparticles:

The dispersion solution of the silver microparticles which was discharged from between the processing surfaces 1 and 2 was settled down to precipitate the silver microparticles; and after the supernatant solution thereof was removed, washing by pure water was repeated for 3 times, and then the obtained wet cake was dried at 25° C. and −0.10 MPa to obtain dry powders of the silver microparticles.

Measurement of pH of the first fluid and the second fluid as well as the analysis of the dry powder of the silver microparticle was done as follows.
Measurement of pH:

Measurement of pH was done by using the pH meter (Type D-51, manufactured by HORIBA, Ltd.). Before each of the fluids to be processed was introduced into the fluid processing apparatus, pH of each of the fluids to be processed was measured at room temperature.
Observation by the Scanning Electron Microscope:

Observation by the scanning electron microscope (SEM) was done by using the field-emission-type scanning electron microscope (FE-SEM) (JSM-7500F, manufactured by JEOL Ltd.). The observation condition with the magnification of 10,000 or more was used, wherein the average value of the particle diameters of 100 silver microparticles obtained by the SEM observation was taken as the primary particle diameter.

Measurement of the X-Ray Diffraction:

Measurement of the X-ray diffraction (XRD) was made by using the powder X-ray diffraction measurement instrument X'pert PRO MPD (XRD; manufactured by Panalytical Business Unit of Spectris Co., Ltd.). The measurement conditions were as follows: Cu anticathode, tube voltage of 45 kV, tube current of 40 mA, 0.016 step/10 second, and the measurement range of 10 to 100°/2θ (Cu). The crystallite's diameter of the obtained silver microparticle was calculated from the XRD measurement. The peak confirmed at 47.3° C. was used for the polycrystalline silicon plate, and the Scherrer's equation was applied to the peak appeared near to 44.5° in the obtained silver diffraction pattern.

ICP Analysis—Detection of Impure Elements:

Quantitative analysis of the elements contained in the dry powder of the silver microparticle by the inductively coupled plasma atomic emission spectrophotometry (ICP) was carried out by using ICPS-8100 (manufactured by Shimadzu Corp.).

The solution in which the dry powder of the silver microparticle was dissolved in nitric acid was used for the measurement. In all of Examples B and Comparative Examples B, all the elements other than the silver element were outside the detection limit.

Examples B1 to B17

The reducing agent fluid whose composition is shown in Table 18 and the silver-containing fluid whose composition is shown in Table 19 were mixed under the processing condition shown in Table 20 by using the fluid processing apparatus shown in FIG. 1 to separate the silver microparticles. The dry powders of the obtained silver microparticles were analyzed. The results of them are shown in Table 21. Meanwhile, the supply pressure of the first fluid and the rotation number of the processing member 10 were those as mentioned above. The dispersion solution of the silver microparticles which was discharged from between the processing surfaces 1 and 2 was acidic in all of Examples B1 to B17.

The reducing agent fluid was prepared as following: ferric sulfate (II) heptahydrate was dissolved in pure water; and in order to change pH and concentration of the sulfate ion, sulfuric acid, ammonium sulfate, or potassium sulfate was added separately as the sulfate compound.

Figure 4:
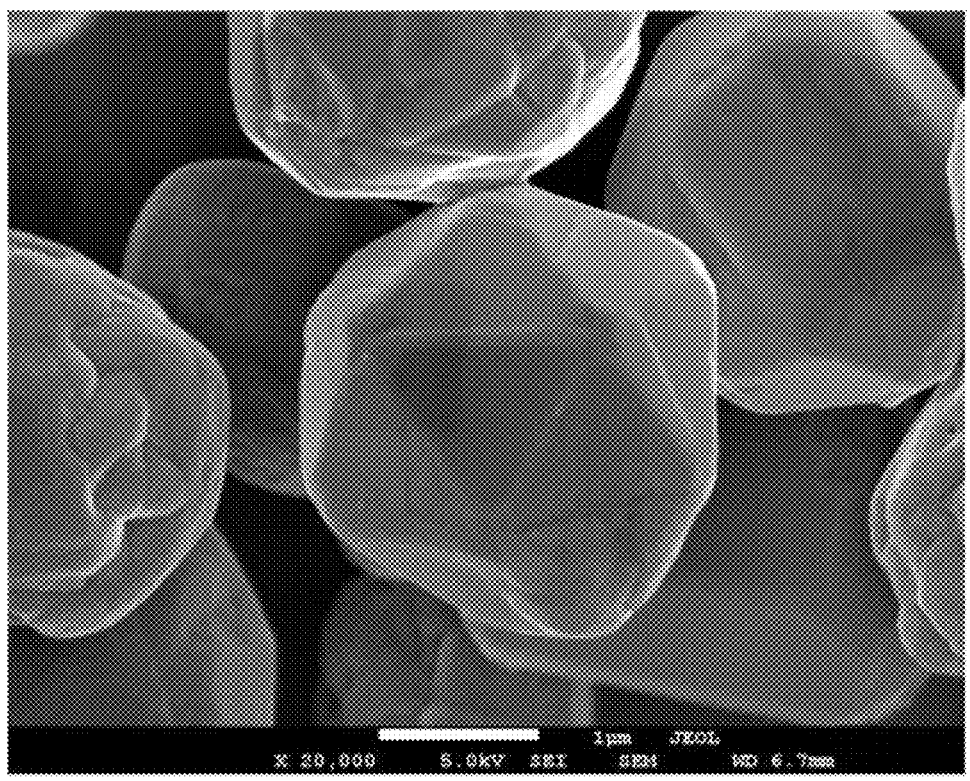
FIG. 4 is the SEM picture of the silver microparticles which is obtained in Example B1.
Figure 5:
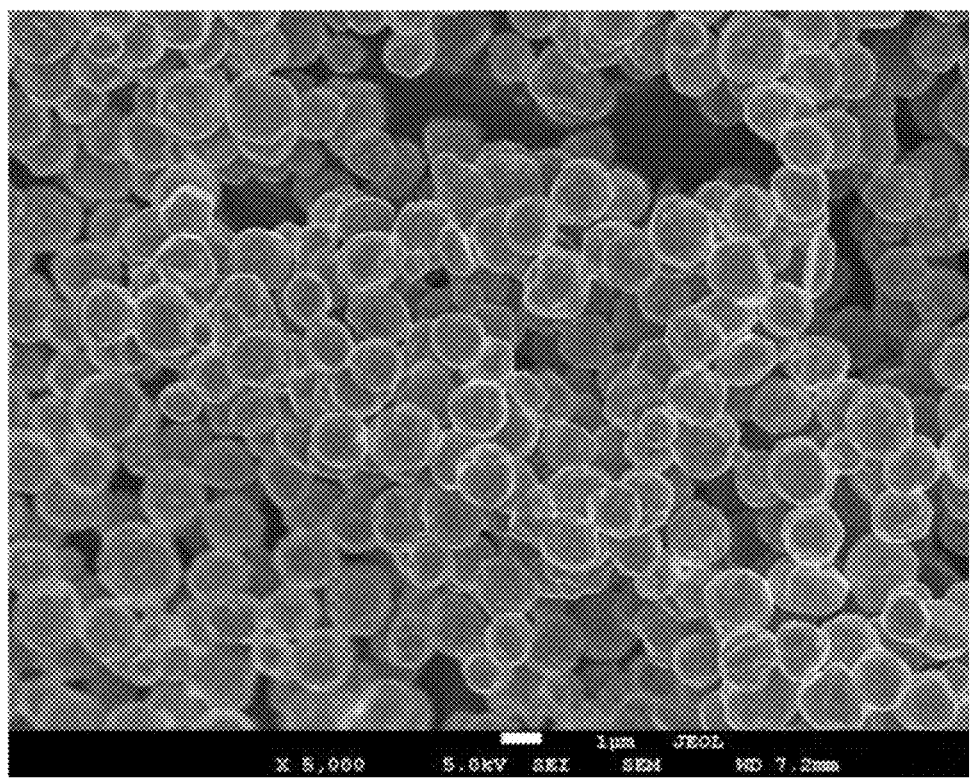
FIG. 5 is the SEM picture of the silver microparticles which is obtained in Example B4.

Abbreviations shown in Tables 18 to 30 are as follows: $AgNO_3$ for silver nitrate; $FeSO_4.7H_2O$ for ferric sulfate (II) heptahydrate; $H_2SO_4$ for sulfuric acid; $(NH_4)_2SO_4$ for ammonium sulfate; $K_2SO_4$ for potassium sulfate; $HNO_3$ for nitric acid; $KNO_3$ for potassium nitrate; $CH_3COOH$ for acetic acid; $CH_3COOK$ for potassium acetate; PW for pure water; $SO_4^{2-}$ for sulfate ion; $NO_3^-$ for nitrate ion; $CH_3COO^-$ for acetate ion; and Ag for silver. The SEM pictures of the silver microparticles obtained in Examples B1 and B4 are shown in FIG. 4 and FIG. 5, respectively. Among the results shown in Table 21, the results of Examples B1 to B13 are, wherein in FIG. 6 the molar ratio of the sulfate ion to silver ($SO_4^{2-}$/Ag) is plotted in the horizontal axis, and the ratio (d/D) of the crystallite's diameter to the particle diameter is plotted in the vertical axis in each pH of the first fluid; and further, in FIG. 7 the molar ratio of the sulfate ion to silver ($SO_4^{2-}$/Ag) is plotted in the horizontal axis, and the crystallite's diameter (d) is plotted in the vertical axis in each pH of the first fluid. In Examples B14 to B17, the molar ratio of the sulfate ion to the silver in the mixed fluid to be processed was changed by changing the flow rate of the reducing agent fluid (i.e., first fluid). With regards to the results of Examples B14 to B17, in FIG. 8 the molar ratio of the sulfate ion to silver ($SO_4^{2-}$/Ag) is plotted in the horizontal axis, and the ratio (d/D) of the crystallite's diameter to the particle diameter is plotted in the vertical axis, and further, in FIG. 9 the molar ratio of the sulfate ion to silver ($SO_4^{2-}$/Ag) is plotted in the horizontal axis, and the crystallite's diameter (d) is plotted in the vertical axis.

TABLE 18

| | First fluid: composition | | | | |
| --- | --- | --- | --- | --- | --- |
| Example | PW Concentration (% by weight) | $FeSO_4 \cdot 7H_2O$ | $H_2SO_4$ | $(NH_4)_2SO_4$ | $K_2SO_4$ |
| | | Concentration (mol/L) | | | |
| 1 | 93.2 | 0.245 | 0.0038 | 0.0000 | 0.0000 |
| 2 | 93.2 | 0.245 | 0.0038 | 0.0006 | 0.0000 |
| 3 | 93.2 | 0.245 | 0.0038 | 0.0006 | 0.0006 |
| 4 | 93.2 | 0.245 | 0.0019 | 0.0000 | 0.0000 |
| 5 | 93.2 | 0.245 | 0.0019 | 0.0004 | 0.0000 |
| 6 | 93.2 | 0.245 | 0.0019 | 0.0004 | 0.0004 |
| 7 | 93.2 | 0.245 | 0.0000 | 0.0000 | 0.0000 |
| 8 | 93.2 | 0.245 | 0.0000 | 0.0004 | 0.0000 |
| 9 | 93.2 | 0.245 | 0.0000 | 0.0000 | 0.0016 |
| 10 | 93.2 | 0.245 | 0.0000 | 0.0019 | 0.0000 |
| 11 | 93.2 | 0.245 | 0.0000 | 0.0000 | 0.0023 |
| 12 | 93.2 | 0.245 | 0.0000 | 0.0038 | 0.0000 |
| 13 | 93.2 | 0.245 | 0.0000 | 0.0009 | 0.0038 |
| 14 | 93.2 | 0.245 | 0.0019 | 0.0000 | 0.0000 |
| 15 | 93.2 | 0.245 | 0.0019 | 0.0000 | 0.0000 |
| 16 | 93.2 | 0.245 | 0.0019 | 0.0000 | 0.0000 |
| 17 | 93.2 | 0.245 | 0.0019 | 0.0000 | 0.0000 |

TABLE 19

| Second fluid: composition | |
| --- | --- |
| $AgNO_3$ Concentration (mol/L) | PW Concentration (% by weight) |
| 0.235 | 96.0 |

TABLE 20

| Example | First fluid Supply rate (mL/minute) | First fluid Supply temperature (° C.) | Second fluid Supply rate (mL/minute) | Second fluid Supply temperature (° C.) | (pH) |
|---|---|---|---|---|---|
| 1 | 500 | 28 | 50 | 25 | 5.7 |
| 2 | 500 | 28 | 50 | 25 | 5.7 |
| 3 | 500 | 28 | 50 | 25 | 5.7 |
| 4 | 500 | 28 | 50 | 25 | 5.7 |
| 5 | 500 | 28 | 50 | 25 | 5.7 |
| 6 | 500 | 28 | 50 | 25 | 5.7 |
| 7 | 500 | 28 | 50 | 25 | 5.7 |
| 8 | 500 | 28 | 50 | 25 | 5.7 |
| 9 | 500 | 28 | 50 | 25 | 5.7 |
| 10 | 500 | 28 | 50 | 25 | 5.7 |
| 11 | 500 | 28 | 50 | 25 | 5.7 |
| 12 | 500 | 28 | 50 | 25 | 5.7 |
| 13 | 500 | 28 | 50 | 25 | 5.7 |
| 14 | 200 | 28 | 50 | 25 | 5.7 |
| 15 | 300 | 28 | 50 | 25 | 5.7 |
| 16 | 400 | 28 | 50 | 25 | 5.7 |
| 17 | 1000 | 28 | 50 | 25 | 5.7 |

TABLE 21

| Example | First fluid (pH) | Molar ratio $SO_4^{2-}/Ag$ | Crystallite's diameter d (μm) | Particle diameter D (μm) | d/D |
|---|---|---|---|---|---|
| 1 | 2.0 | 10.59 | 0.245 | 1.845 | 0.13 |
| 2 | 2.0 | 10.61 | 0.221 | 1.946 | 0.11 |
| 3 | 2.0 | 10.64 | 0.209 | 2.112 | 0.10 |
| 4 | 2.6 | 10.51 | 0.467 | 2.563 | 0.18 |
| 5 | 2.6 | 10.52 | 0.454 | 2.632 | 0.17 |
| 6 | 2.6 | 10.54 | 0.443 | 2.699 | 0.16 |
| 7 | 3.7 | 10.43 | 0.867 | 3.151 | 0.28 |
| 8 | 3.7 | 10.44 | 0.641 | 2.563 | 0.25 |
| 9 | 3.7 | 10.49 | 0.486 | 2.864 | 0.17 |
| 10 | 3.8 | 10.51 | 0.477 | 2.874 | 0.17 |
| 11 | 3.8 | 10.52 | 0.356 | 2.321 | 0.15 |
| 12 | 3.8 | 10.59 | 0.320 | 2.236 | 0.14 |
| 13 | 3.8 | 10.63 | 0.319 | 3.120 | 0.10 |
| 14 | 2.6 | 4.20 | 0.918 | 3.214 | 0.29 |
| 15 | 2.6 | 6.30 | 0.792 | 3.621 | 0.22 |
| 16 | 2.6 | 8.41 | 0.660 | 3.321 | 0.20 |
| 17 | 2.6 | 21.01 | 0.363 | 2.684 | 0.14 |

Figure 6:
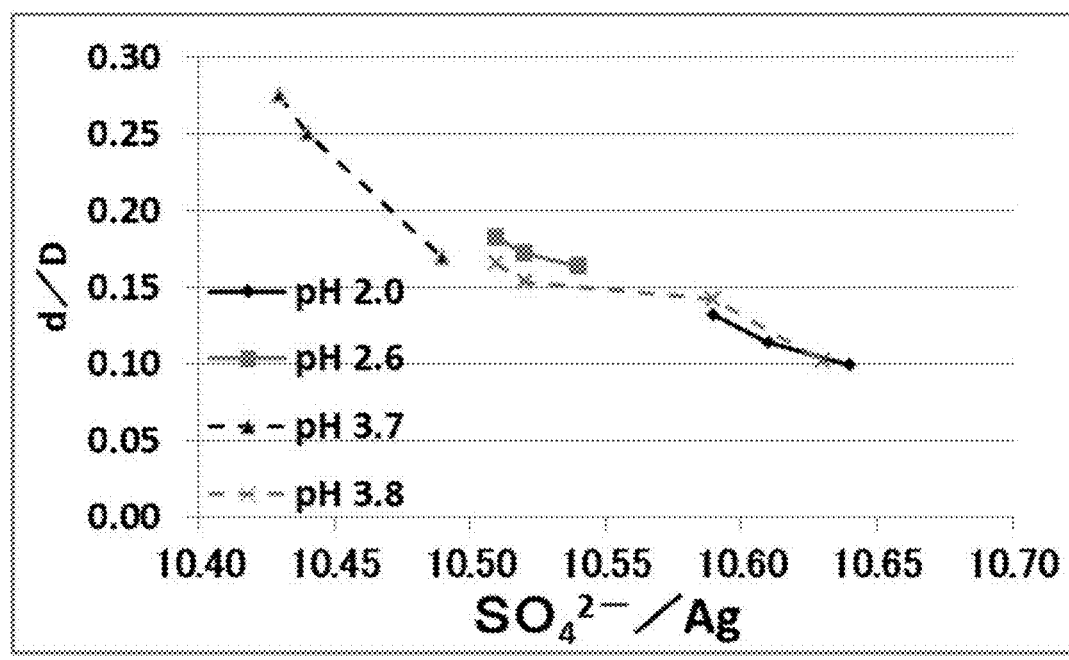
FIG. 6 is the graph in which in each pH of the first fluid the molar ratio of the sulfate ion to silver ($SO_4^{2-}/Ag$) is plotted in the horizontal axis, and the ratio (d/D) of the crystallite's diameter to the particle diameter is plotted in the vertical axis in the silver microparticles obtained in Examples B1 to B13.
Figure 7:
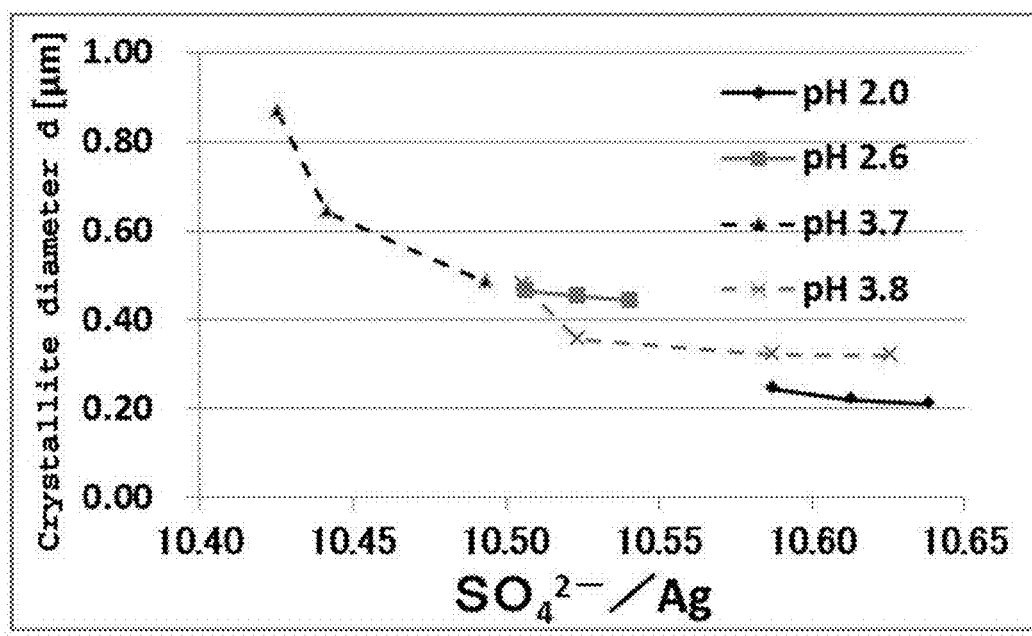
FIG. 7 is the graph in which in each pH of the first fluid the molar ratio of the sulfate ion to silver ($SO_4^{2-}/Ag$) is plotted in the horizontal axis, and the crystallite's diameter (d) is plotted in the vertical axis in the silver microparticles obtained in Examples B1 to B13.

From Table 21, FIG. 6, and FIG. 7, it was confirmed that by controlling the molar ratio ($SO_4^{2-}/Ag$) of the sulfate ion in the first fluid to the silver in the second fluid, growth of the crystallite can be controlled with controlling the particle diameter of the separated silver microparticles. It was further confirmed that reduction of the particle diameter accompanied with reduction of the crystallite's diameter can be suppressed. Therefore, it was confirmed that the ratio (d/D) of the crystallite's diameter to the particle diameter of the silver microparticle can be controlled. In addition, from FIG. 6 and FIG. 7, it can be seen that under the condition where pH of the reducing agent fluid (i.e., first fluid) is made constant in the acidic condition, there is a tendency that the ratio (d/D) becomes smaller as the molar ratio of the sulfate ion in the reducing agent fluid to the silver in the silver-containing fluid becomes higher. Further, it can be seen that this tendency is maintained independent of pH in the acidic condition. Accordingly, it can be seen that by controlling both the molar ratio and pH, the ratio (d/D) can be controlled in a more dynamic range. Furthermore, it was confirmed that by increasing the molar ratio of the sulfate ion in the reducing agent fluid to the silver in the silver-containing fluid, the crystallite's diameter (d) of the separated silver microparticles tends to become smaller.

Figure 8:
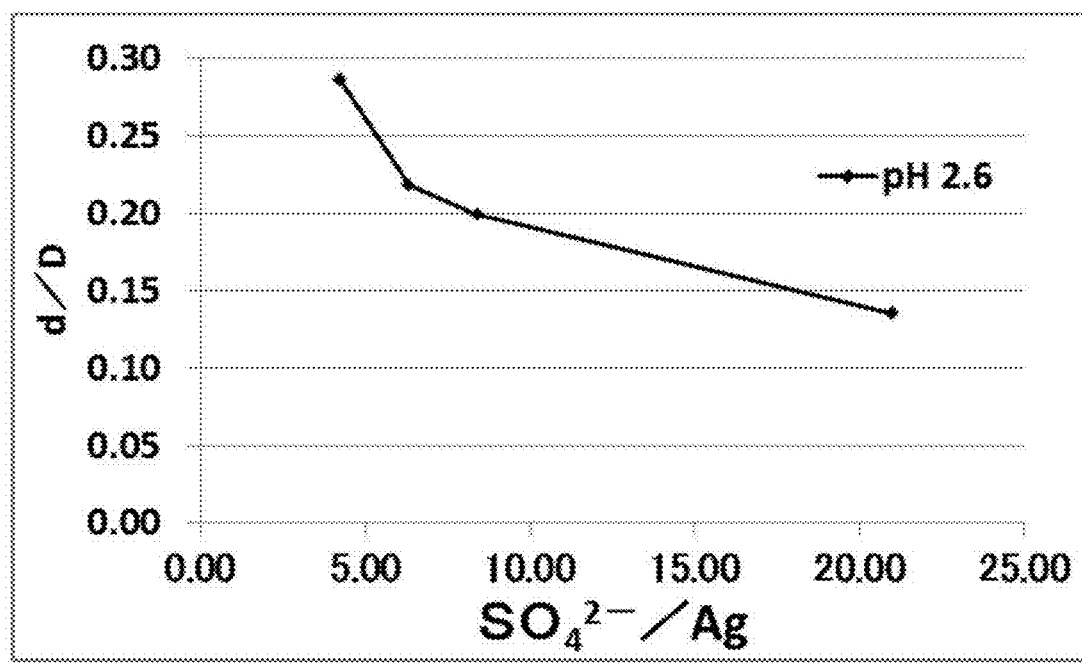
FIG. 8 is the graph in which the molar ratio of the sulfate ion to silver ($SO_4^{2-}/Ag$) is plotted in the horizontal axis, and the ratio (d/D) of the crystallite's diameter to the particle diameter is plotted in the vertical axis in the silver microparticles obtained in Examples B14 to B17.
Figure 9:
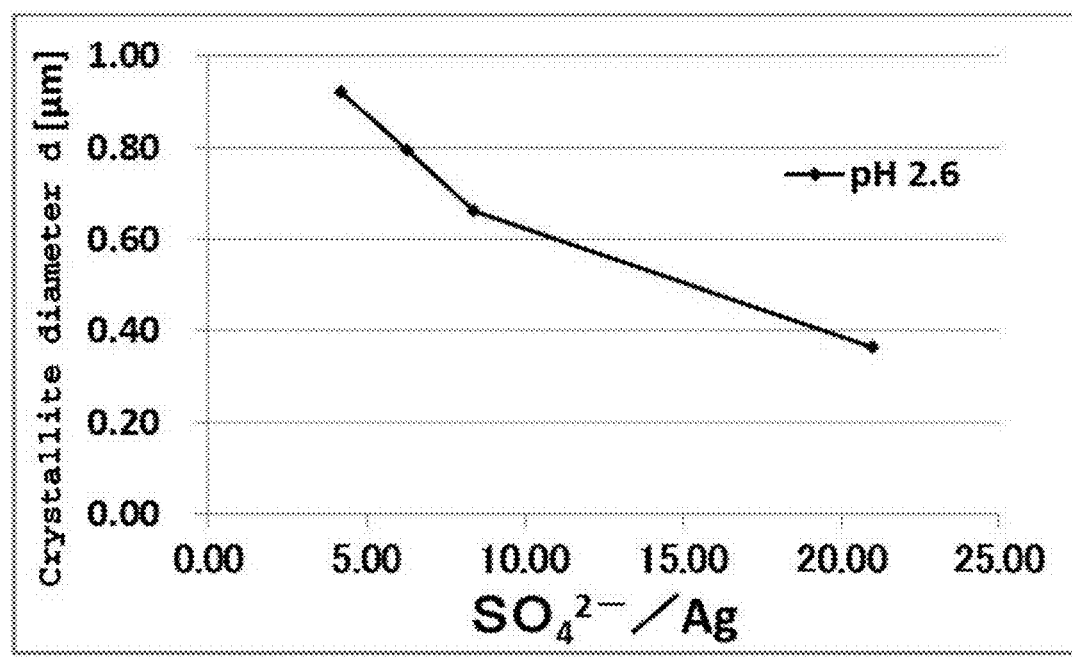
FIG. 9 is the graph in which the molar ratio of the sulfate ion to silver ($SO_4^{2-}/Ag$) is plotted in the horizontal axis, and the crystallite's diameter (d) is plotted in the vertical axis in the silver microparticles obtained in Examples B14 to B17.

In the case, too, that the mixing ratio of the silver-containing fluid and the reducing agent fluid is changed in Examples B14 to B17, it can be seen that from FIG. 8 and FIG. 9, similarly to Examples B1 to B13, the ratio (d/D) becomes smaller by increasing the molar ratio of the sulfate ion to the silver in the mixed fluid to be processed. Further, it was confirmed that by increasing the molar ratio of the sulfate ion to the silver in the mixed fluid to be processed, the crystallite's diameter (d) of the separated silver microparticles becomes smaller.

Comparative Examples B1 to B7

The dry powder of the silver microparticle was obtained by following the procedure of Examples B1 to B17, except that the composition of the reducing agent fluid was changed as shown in Table 22 and the process condition was changed as shown in Table 23. These results are shown in Table 24. In all of Comparative Examples B1 to B7, the silver microparticle dispersion solution discharged from the processing surfaces 1 and 2 showed an acidity.

The reducing agent fluid was prepared as following: after ferric sulfate (II) heptahydrate was dissolved in pure water, nitric acid and/or potassium nitrate was added separately as the nitrate compound, which is different from Examples B1 to B17 in which the sulfate compounds were separately added. In addition, with regard to the results obtained in Table 24, in FIG. 10, in each pH of the first fluid the total molar ratio of the sulfate ion and the nitrate ion to silver ($SO_4^{2-}+NO_3^-/Ag$) is plotted in the horizontal axis, and the ratio (d/D) of the crystallite's diameter to the particle diameter is plotted in the vertical axis; and in FIG. 11, in each pH of the first fluid the total molar ratio of the sulfate ion and the nitrate ion to silver ($SO_4^{2-}+NO_3^-/Ag$) is plotted in the horizontal axis, and the crystallite's diameter (d) is plotted in the vertical axis.

TABLE 22

| Comparative Example | First fluid: composition PW Concentration (% by weight) | $FeSO_4 \cdot 7H_2O$ | $H_2SO_4$ | $(NH_4)_2SO_4$ Concentration (mol/L) | $K_2SO_4$ | $HNO_3$ | $KNO_3$ |
|---|---|---|---|---|---|---|---|
| 1 | 93.2 | 0.245 | 0.0000 | 0.0000 | 0.0000 | 0.0026 | 0.0019 |
| 2 | 93.2 | 0.245 | 0.0000 | 0.0000 | 0.0000 | 0.0026 | 0.0004 |
| 3 | 93.2 | 0.245 | 0.0000 | 0.0000 | 0.0000 | 0.0026 | 0.0000 |
| 4 (Example 7) | 93.2 | 0.245 | 0.0000 | 0.0000 | 0.0000 | 0.0000 | 0.0000 |
| 5 | 93.2 | 0.245 | 0.0000 | 0.0000 | 0.0000 | 0.0000 | 0.0004 |

TABLE 22-continued

| Comparative Example | First fluid: composition | | | | | | |
|---|---|---|---|---|---|---|---|
| | PW Concentration (% by weight) | FeSO$_4$•7H$_2$O | H$_2$SO$_4$ | (NH$_4$)$_2$SO$_4$ Concentration (mol/L) | K$_2$SO$_4$ | HNO$_3$ | KNO$_3$ |
| 6 | 93.2 | 0.245 | 0.0000 | 0.0000 | 0.0000 | 0.0000 | 0.0019 |
| 7 | 93.2 | 0.245 | 0.0000 | 0.0000 | 0.0000 | 0.0000 | 0.0038 |

TABLE 23

| Comparative Example | First fluid | | Second fluid | | (pH) |
|---|---|---|---|---|---|
| | Supply rate (mL/minute) | Supply temperature (° C.) | Supply rate (mL/minute) | Supply temperature (° C.) | |
| 1 | 500 | 28 | 50 | 25 | 5.7 |
| 2 | 500 | 28 | 50 | 25 | 5.7 |
| 3 | 500 | 28 | 50 | 25 | 5.7 |
| 4 (Example 7) | 500 | 28 | 50 | 25 | 5.7 |
| 5 | 500 | 28 | 50 | 25 | 5.7 |
| 6 | 500 | 28 | 50 | 25 | 5.7 |
| 7 | 500 | 28 | 50 | 25 | 5.7 |

TABLE 24

| Comparative Example | First fluid (pH) | Molar ratio SO$_4^{2-}$/Ag | Molar ratio NO$_3^-$/Ag | Molar ratio (SO$_4^{2-}$ + NO$_3^-$)/Ag | Crystallite's diameter d (μm) | Particle diameter D (μm) | d/D |
|---|---|---|---|---|---|---|---|
| 1 | 2.6 | 10.43 | 1.19 | 11.62 | 0.172 | 2.234 | 0.08 |
| 2 | 2.6 | 10.43 | 1.13 | 11.56 | 0.164 | 2.897 | 0.06 |
| 3 | 2.6 | 10.43 | 1.11 | 11.54 | 0.246 | 1.532 | 0.16 |
| 4 (Example 7) | 3.7 | 10.43 | 1.00 | 11.43 | 0.867 | 3.151 | 0.28 |
| 5 | 3.7 | 10.43 | 1.02 | 11.45 | 0.112 | 2.977 | 0.04 |
| 6 | 3.7 | 10.43 | 1.08 | 11.51 | 0.064 | 1.645 | 0.04 |
| 7 | 3.7 | 10.43 | 1.16 | 11.59 | 0.461 | 3.264 | 0.14 |

Figure 10:
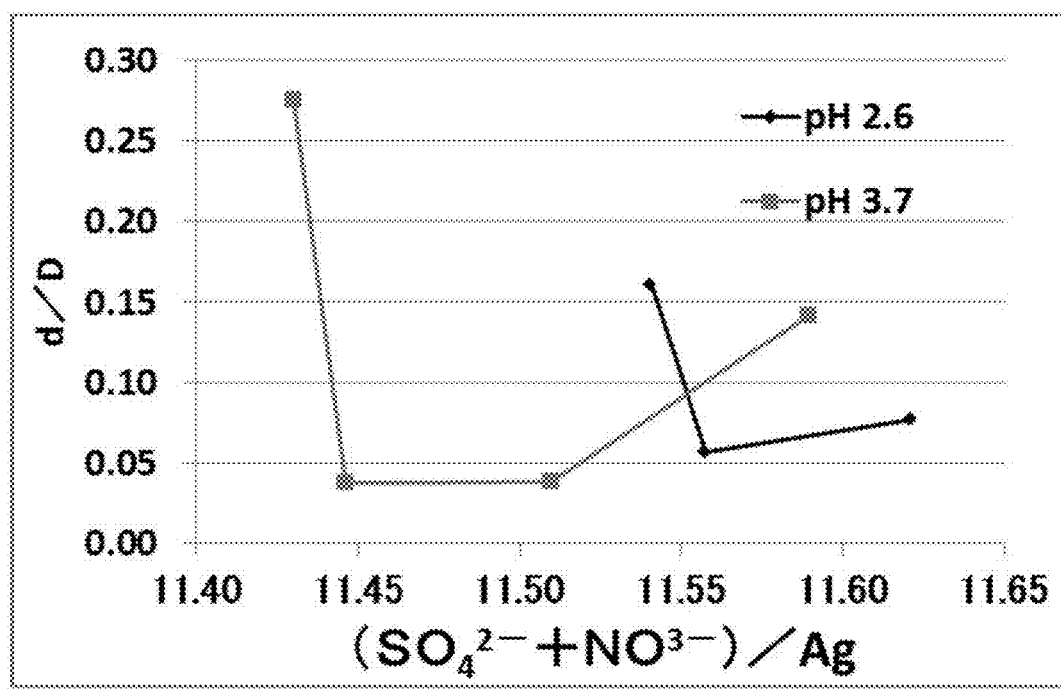
FIG. 10 is the graph in which in each pH of the first fluid the total molar ratio of the sulfate ion and the nitrate ion to silver ($SO_4^{2-}+NO_3^-/Ag$) is plotted in the horizontal axis, and the ratio (d/D) of the crystallite's diameter to the particle diameter is plotted in the vertical axis in the silver microparticles obtained in Comparative Examples B1 to B7.
Figure 11:
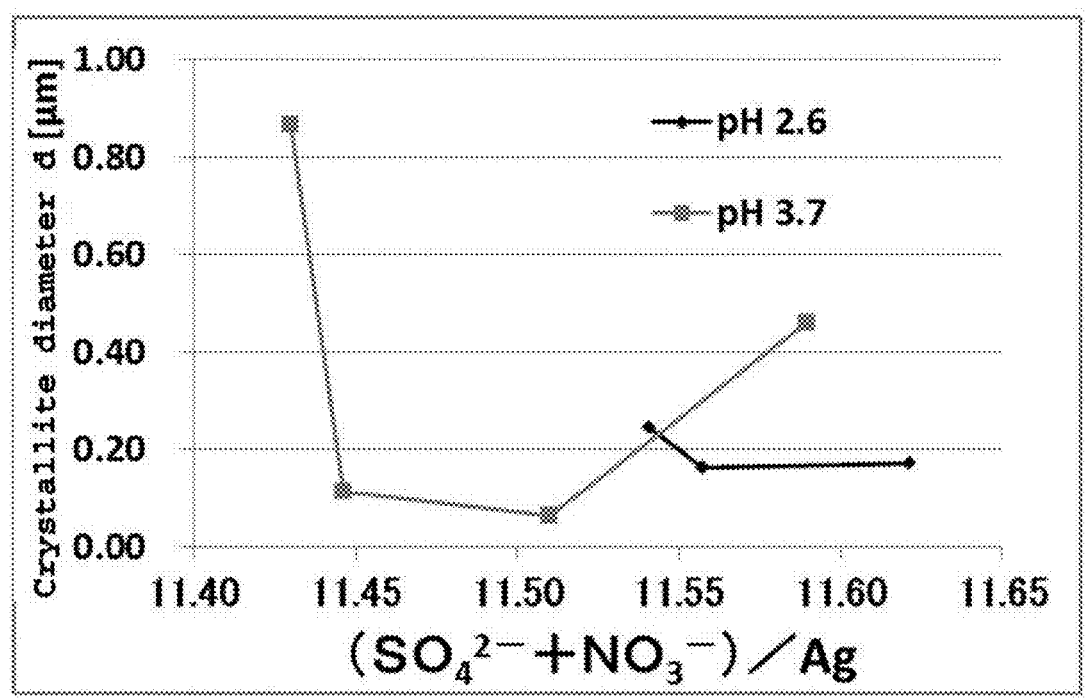
FIG. 11 is the graph in which in each pH of the first fluid the total molar ratio of the sulfate ion and the nitrate ion to silver ($SO_4^{2-}+NO_3^-/Ag$) is plotted in the horizontal axis, and the crystallite's diameter (d) is plotted in the vertical axis in the silver microparticles obtained in Comparative Examples B1 to B7.

From Table 24, FIG. 10, and FIG. 11, when the molar ratio of the sulfate ion in the first fluid to the silver in the second fluid (SO$_4^{2-}$/Ag) was made constant while the nitrate compound was added separately in the first fluid, neither the relationship between the total molar ratio of the sulfate ion and the nitrate ion to silver and the crystallite's diameter nor the relationship between the said total molar ratio and the crystallite's diameter relative to the particle diameter could be found; and thus, the ratio (d/D) could not be controlled.

Comparative Examples B8 to B14

The dry powder of the silver microparticle was obtained by following the procedure of Examples B1 to B17, except that the composition of the reducing agent fluid was changed as shown in Table 25 and the process condition was changed as shown in Table 26. These results are shown in Table 27. In all of Comparative Examples B8 to B14, the silver microparticle dispersion solution discharged from the processing surfaces 1 and 2 showed an acidity.

The reducing agent fluid was prepared as following: after ferric sulfate (II) heptahydrate was dissolved in pure water, acetic acid and/or potassium acetate was added separately as the acetate compound, which is different from Examples B1 to B17 in which the sulfate compounds were separately added. In addition, with regard to the results obtained in Table 27, in FIG. 12, in each pH of the first fluid the total molar ratio of the sulfate ion and the acetate ion to silver (SO$_4^{2-}$+CH$_3$COO$^-$/Ag) is plotted in the horizontal axis, and the ratio (d/D) of the crystallite's diameter to the particle diameter is plotted in the vertical axis; and in FIG. 13, in each pH of the first fluid the total molar ratio of the sulfate ion and the acetate ion to silver (SO$_4^{2-}$+CH$_3$COO$^-$/Ag) is plotted in the horizontal axis, and the crystallite's diameter (d) is plotted in the vertical axis.

TABLE 25

| Comparative Example | First fluid: composition | | | | | | |
|---|---|---|---|---|---|---|---|
| | PW Concentration (% by weight) | FeSO$_4$•7H$_2$O | H$_2$SO$_4$ | (NH$_4$)$_2$SO$_4$ Concentration (mol/L) | K$_2$SO$_4$ | CH$_3$COOH | CH$_3$COOK |
| 8 | 93.2 | 0.245 | 0.0000 | 0.0000 | 0.0000 | 0.0019 | 0.0019 |
| 9 | 93.2 | 0.245 | 0.0000 | 0.0000 | 0.0000 | 0.0019 | 0.0004 |

TABLE 25-continued

| | First fluid: composition | | | | | | |
|---|---|---|---|---|---|---|---|
| Comparative Example | PW Concentration (% by weight) | $FeSO_4 \cdot 7H_2O$ | $H_2SO_4$ | $(NH_4)_2SO_4$ Concentration (mol/L) | $K_2SO_4$ | $CH_3COOH$ | $CH_3COOK$ |
| 10 | 93.2 | 0.245 | 0.0000 | 0.0000 | 0.0000 | 0.0019 | 0.0000 |
| 11 (Example 7) | 93.2 | 0.245 | 0.0000 | 0.0000 | 0.0000 | 0.0000 | 0.0000 |
| 12 | 93.2 | 0.245 | 0.0000 | 0.0000 | 0.0000 | 0.0000 | 0.0004 |
| 13 | 93.2 | 0.245 | 0.0000 | 0.0000 | 0.0000 | 0.0000 | 0.0019 |
| 14 | 93.2 | 0.245 | 0.0000 | 0.0000 | 0.0000 | 0.0000 | 0.0038 |

TABLE 26

| | First fluid | | Second fluid | | |
|---|---|---|---|---|---|
| | Supply | | | | |
| Comparative Example | Supply rate (mL/minute) | Supply temperature (° C.) | Supply rate (mL/minute) | Supply temperature (° C.) | (pH) |
| 8 | 500 | 28 | 50 | 25 | 5.7 |
| 9 | 500 | 28 | 50 | 25 | 5.7 |
| 10 | 500 | 28 | 50 | 25 | 5.7 |
| 11 (Example 7) | 500 | 28 | 50 | 25 | 5.7 |
| 12 | 500 | 28 | 50 | 25 | 5.7 |
| 13 | 500 | 28 | 50 | 25 | 5.7 |
| 14 | 500 | 28 | 50 | 25 | 5.7 |

TABLE 27

| Comparative Example | First fluid (pH) | $SO_4^{2-}/Ag$ | Molar ratio $CH_3COO^-/Ag$ | Molar ratio $(SO_4^{2-} + CH_3COO^-)/Ag$ | Crystallite's diameter d (μm) | Particle diameter D (μm) | d/D |
|---|---|---|---|---|---|---|---|
| 8 | 3.5 | 10.43 | 0.16 | 10.59 | 0.124 | 2.143 | 0.06 |
| 9 | 3.5 | 10.43 | 0.10 | 10.53 | 0.072 | 2.746 | 0.03 |
| 10 | 3.5 | 10.43 | 0.08 | 10.51 | 0.264 | 1.897 | 0.14 |
| 11 (Example 7) | 3.7 | 10.43 | 0.00 | 10.43 | 0.867 | 3.151 | 0.28 |
| 12 | 3.7 | 10.43 | 0.02 | 10.45 | 0.084 | 1.412 | 0.06 |
| 13 | 3.7 | 10.43 | 0.08 | 10.51 | 0.131 | 2.866 | 0.05 |
| 14 | 3.7 | 10.43 | 0.16 | 10.59 | 0.121 | 2.846 | 0.04 |

Figure 12:
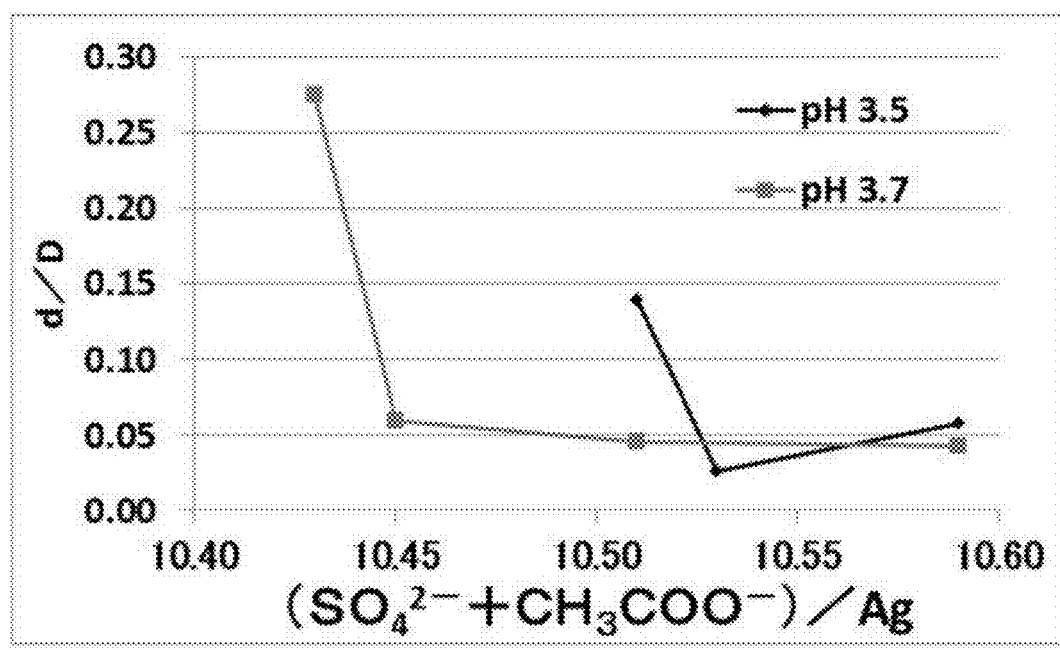
FIG. 12 is the graph in which in each pH of the first fluid the total molar ratio of the sulfate ion and the acetate ion to silver ($SO_4^{2-}+CH_3COO^-/Ag$) is plotted in the horizontal axis, and the ratio (d/D) of the crystallite's diameter to the particle diameter is plotted in the vertical axis in the silver microparticles obtained in Comparative Examples B8 to B14.
Figure 13:
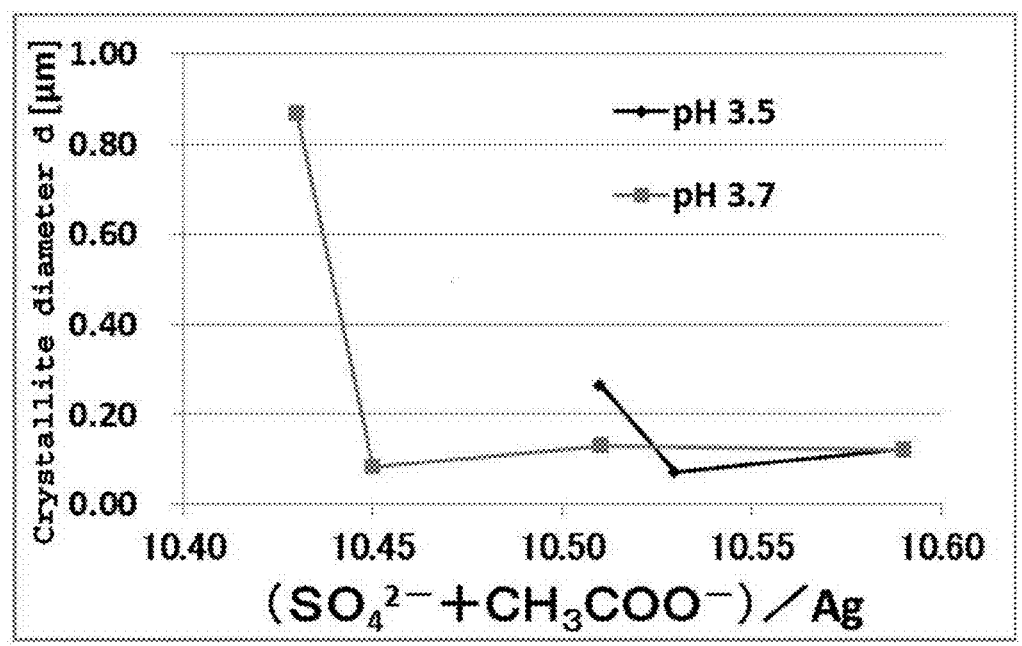
FIG. 13 is the graph in which in each pH of the first fluid the total molar ratio of the sulfate ion and the acetate ion to silver ($SO_4^{2-}+CH_3COO^-/Ag$) is plotted in the horizontal axis, and the crystallite's diameter (d) is plotted in the vertical axis in the silver microparticles obtained in Comparative Examples B8 to B14.

From Table 27, FIG. 12, and FIG. 13, when the molar ratio of the sulfate ion in the first fluid to the silver in the second fluid ($SO_4^{2-}/Ag$) was made constant while the acetic acid compound was added separately in the first fluid, neither the relationship between the total molar ratio of the sulfate ion and the acetate ion to silver and the crystallite's diameter nor the relationship between the said total molar ratio and the crystallite's diameter relative to the particle diameter could be found; and thus, the ratio (d/D) could not be controlled.

Comparative Examples B15 to B17

To compare with Examples B7 to B9, experiments were carried out by the batch method. The composition of the reducing agent fluid (i.e., first fluid) shown in Table 28 was used. Mixing of the first fluid and the second fluid was done by addition of the second fluid with the flow rate as shown in Table 29 into the first fluid with the amount shown in Table 29 in a beaker with stirring the fluid for the period of 1 minute to mix the silver-containing fluid with the reducing agent fluid whereby separating the silver microparticles. The slurry which contains the silver microparticles (dispersion solution of the silver microparticles) was obtained. The composition of the second fluid as well as the recovery method of the particles and the analysis method thereof were the same as those of the Examples B1 to B17.

TABLE 28

| | First fluid: composition | | | | |
|---|---|---|---|---|---|
| Comparative Example | PW Concentration (% by weight) | $FeSO_4 \cdot 7H_2O$ | $H_2SO_4$ Concentration (mol/L) | $(NH_4)_2SO_4$ | $K_2SO_4$ |
| 15 | 93.2 | 0.245 | 0.0000 | 0.0000 | 0.0000 |
| 16 | 93.2 | 0.245 | 0.0000 | 0.0004 | 0.0000 |
| 17 | 93.2 | 0.245 | 0.0000 | 0.0000 | 0.0016 |

TABLE 29

| | First fluid | | Second fluid | | |
|---|---|---|---|---|---|
| | Supply | | | | |
| Comparative Example | Supply rate (mL/minute) | temperature (° C.) | Supply rate (mL/minute) | Supply temperature (° C.) | (pH) |
| 15 | 500 | 28 | 50 | 25 | 5.7 |
| 16 | 500 | 28 | 50 | 25 | 5.7 |
| 17 | 500 | 28 | 50 | 25 | 5.7 |

TABLE 30

| Comparative Example | First fluid (pH) | Molar ratio $SO_4^{2-}/Ag$ | Crystallite's diameter d (μm) | Particle diameter D (μm) | d/D |
|---|---|---|---|---|---|
| 15 | 3.7 | 10.43 | 0.210 | 2.876 | 0.07 |
| 16 | 3.7 | 10.44 | 0.209 | 3.106 | 0.07 |
| 17 | 3.7 | 10.49 | 0.211 | 3.156 | 0.07 |

From Table 30, in the batch tests, there was no significant change in the ratio (d/D) of the crystallite's diameter to the particle diameter even if the molar ratio of the sulfate ion in the first fluid to the silver in the second fluid ($SO_4^{2-}$/Ag) was changed. Especially the crystallite's diameters (d) of the silver microparticles obtained in Comparative Examples B15 to B17 were smaller as compared with those of Examples B7 to B9.

Examples B18 to B30

The silver-containing fluid whose composition is shown in Table 31 was mixed with the reducing agent fluid whose composition is shown in Table 32 by using the fluid processing apparatus shown in FIG. 1 under the condition shown in Table 33 to separate the silver microparticles. The dry powder of the obtained silver microparticles was analyzed. The results of them are shown in Table 34. Meanwhile, the supply pressure of the first fluid was the same as that of the before-mentioned, and the rotation speed of the processing member 10 was 1700 rpm. The dispersion solution of the silver microparticles which was discharged from the processing surfaces 1 and 2 were acidic in all of Examples B18 to B30. The silver-containing fluid was prepared by dissolving silver sulfate into ethylene glycol and pure water, and further, sulfuric acid, ammonium sulfate, or potassium sulfate was separately added to it as the sulfate compound. The reducing agent fluid was prepared by dissolving ferric (II) sulfate heptahydrate and sulfuric acid into pure water.

Abbreviations shown in Tables 31 to 40 are as follows: EG for ethylene glycol; PW for pure water; $Ag_2SO_4$ for silver sulfate; $FeSO_4.7H_2O$ for ferric (II) sulfate heptahydrate; $H_2SO_4$ for sulfuric acid; $(NH_4)_2SO_4$ for ammonium sulfate; $K_2SO_4$ for potassium sulfate; $HNO_3$ for nitric acid; $KNO_3$ for potassium nitrate; $CH_3COOH$ for acetic acid; $CH_3COOK$ for potassium acetate; $SO_4^{2-}$ for sulfate ion; $NO_3^-$ for nitrate ion; $CH_3COO^-$ for acetate ion; and Ag for silver. Among the results obtained in Table 34, with regard to the results of Examples B18 to B26, in FIG. 14, in each pH of the first fluid the molar ratio of the sulfate ion to silver ($SO_4^{2-}$/Ag) is plotted in the horizontal axis, and the ratio (d/D) of the crystallite's diameter to the particle diameter is plotted in the vertical axis; and in FIG. 15, in each pH of the first fluid the molar ratio of the sulfate ion to silver ($SO_4^{2-}$/Ag) is plotted in the horizontal axis, and the crystallite's diameter (d) is plotted in the vertical axis. In Examples B27 to B30, by changing the flow rate of the reducing agent fluid (i.e., second fluid), the molar ratio of the sulfate ion to the silver in the mixed fluid to be processed was changed. With regard to the results of Examples B27 to B30, in FIG. 16, the molar ratio of the sulfate ion to silver ($SO_4^{2-}$/Ag) is plotted in the horizontal axis, and the ratio (d/D) of the crystallite's diameter to the particle diameter is plotted in the vertical axis; and in FIG. 17, the molar ratio of the sulfate ion to silver ($SO_4^{2-}$/Ag) is plotted in the horizontal axis, and the crystallite's diameter (d) is plotted in the vertical axis.

TABLE 31

| Example | First fluid: composition | | | | | |
|---|---|---|---|---|---|---|
| | EG Concentration (% by weight) | PW | $Ag_2SO_4$ | $H_2SO_4$ Concentration (mol/L) | $(NH_4)_2SO_4$ | $K_2SO_4$ |
| 18 | 83.3 | 16.6 | 0.00353 | 0.0018 | 0.0000 | 0.0000 |
| 19 | 83.3 | 16.6 | 0.00353 | 0.0018 | 0.0004 | 0.0000 |
| 20 | 83.3 | 16.6 | 0.00353 | 0.0018 | 0.0004 | 0.0005 |
| 21 | 83.3 | 16.6 | 0.00353 | 0.0009 | 0.0000 | 0.0000 |
| 22 | 83.3 | 16.6 | 0.00353 | 0.0009 | 0.0004 | 0.0000 |
| 23 | 83.3 | 16.6 | 0.00353 | 0.0009 | 0.0004 | 0.0005 |
| 24 | 83.3 | 16.6 | 0.00353 | 0.0000 | 0.0000 | 0.0000 |
| 25 | 83.3 | 16.6 | 0.00353 | 0.0000 | 0.0004 | 0.0000 |
| 26 | 83.3 | 16.6 | 0.00353 | 0.0000 | 0.0004 | 0.0005 |
| 27 | 83.3 | 16.6 | 0.00353 | 0.0000 | 0.0000 | 0.0000 |
| 28 | 83.3 | 16.6 | 0.00353 | 0.0000 | 0.0000 | 0.0000 |
| 29 | 83.3 | 16.6 | 0.00353 | 0.0000 | 0.0000 | 0.0000 |
| 30 | 83.3 | 16.6 | 0.00353 | 0.0000 | 0.0000 | 0.0000 |

TABLE 32

| Second fluid: composition | | |
|---|---|---|
| $FeSO_4.7H_2O$ Concentration (mol/L) | $H_2SO_4$ Concentration (mol/L) | PW Concentration (% by weight) |
| 0.2697 | 0.0010 | 96.0 |

TABLE 33

| Example | First fluid | | Second fluid | | |
|---|---|---|---|---|---|
| | Supply rate (mL/minute) | Supply temperature (° C.) | Supply rate (mL/minute) | Supply temperature (° C.) | (pH) |
| 18 | 500 | 20 | 30 | 20 | 3.4 |
| 19 | 500 | 20 | 30 | 20 | 3.4 |
| 20 | 500 | 20 | 30 | 20 | 3.4 |
| 21 | 500 | 20 | 30 | 20 | 3.4 |
| 22 | 500 | 20 | 30 | 20 | 3.4 |
| 23 | 500 | 20 | 30 | 20 | 3.4 |
| 24 | 500 | 20 | 30 | 20 | 3.4 |
| 25 | 500 | 20 | 30 | 20 | 3.4 |
| 26 | 500 | 20 | 30 | 20 | 3.4 |
| 27 | 500 | 20 | 25 | 20 | 3.4 |
| 28 | 500 | 20 | 60 | 20 | 3.4 |
| 29 | 500 | 20 | 120 | 20 | 3.4 |
| 30 | 500 | 20 | 150 | 20 | 3.4 |

TABLE 34

| Example | First fluid (pH) | Molar ratio $SO_4^{2-}$/Ag | Crystallite's diameter d (μm) | Particle diameter D (μm) | d/D |
|---|---|---|---|---|---|
| 18 | 2.6 | 3.06 | 99.8 | 201.3 | 0.50 |
| 19 | 2.6 | 3.11 | 106.4 | 204.5 | 052 |
| 20 | 2.6 | 3.18 | 108.9 | 197.8 | 0.55 |
| 21 | 3.1 | 2.93 | 72.7 | 203.4 | 0.36 |
| 22 | 3.1 | 2.98 | 76.4 | 206.4 | 0.37 |
| 23 | 3.1 | 3.06 | 97.6 | 199.4 | 0.49 |
| 24 | 5.0 | 2.80 | 50.8 | 198.7 | 0.26 |
| 25 | 5.0 | 2.86 | 55.4 | 196.4 | 0.28 |
| 26 | 5.0 | 2.93 | 64.8 | 197.6 | 0.33 |
| 27 | 5.0 | 2.42 | 44.2 | 204.6 | 0.22 |
| 28 | 5.0 | 5.10 | 96.7 | 235.6 | 0.41 |
| 29 | 5.0 | 9.70 | 123.4 | 208.6 | 0.59 |
| 30 | 5.0 | 12.00 | 156.4 | 204.6 | 0.76 |

Figure 14:
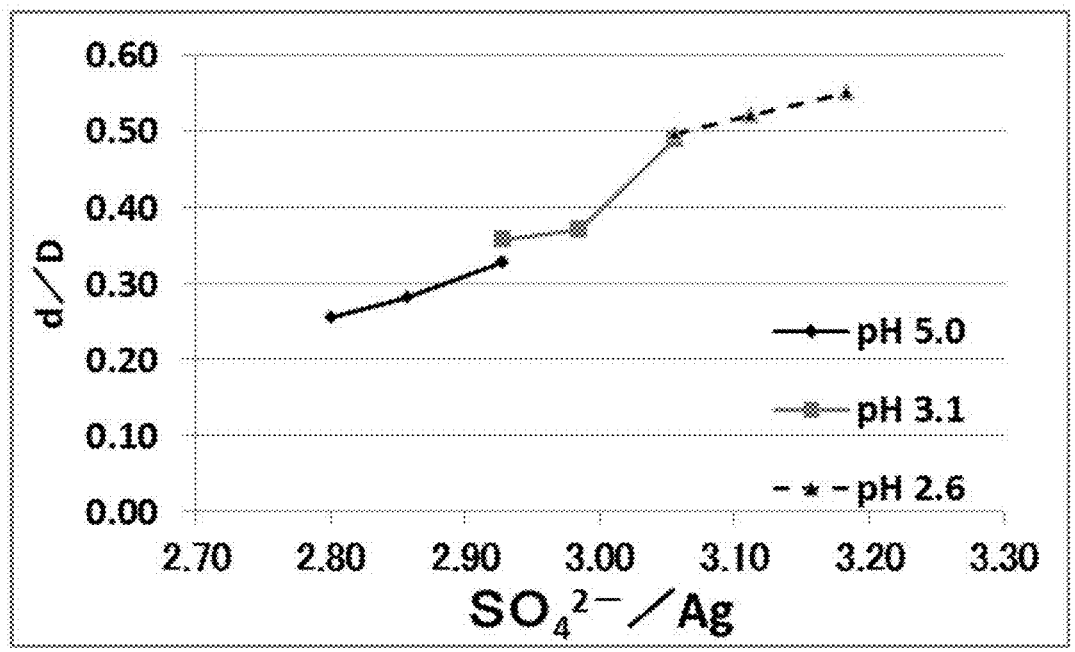
FIG. 14 is the graph in which in each pH of the first fluid the molar ratio of the sulfate ion to silver ($SO_4^{2-}/Ag$) is plotted in the horizontal axis, and the ratio (d/D) of the crystallite's diameter to the particle diameter is plotted in the vertical axis in the silver microparticles obtained in Examples B18 to B26.
Figure 15:
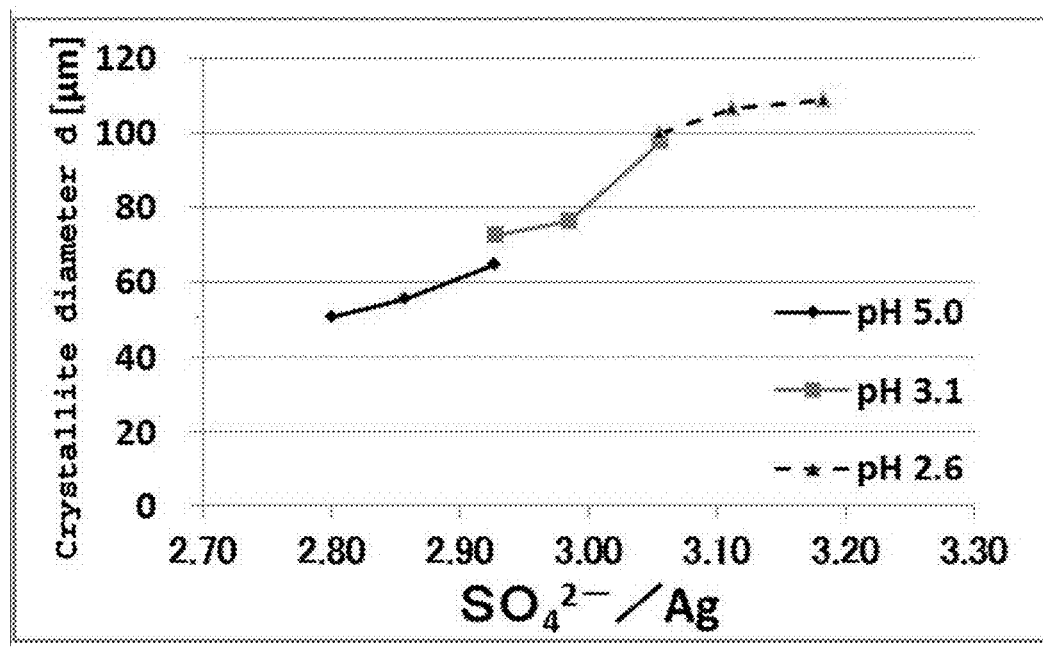
FIG. 15 is the graph in which in each pH of the first fluid the molar ratio of the sulfate ion to silver ($SO_4^{2-}/Ag$) is plotted in the horizontal axis, and the crystallite's diameter (d) is plotted in the vertical axis in the silver microparticles obtained in Examples B18 to B26.

From Table 34, FIG. 14, and FIG. 15, it was confirmed that by controlling the molar ratio ($SO_4^{2-}$/Ag) of the sulfate ion in the mixed fluid to be processed to the silver in the first fluid, growth of the crystallite can be controlled with controlling the particle diameter of the separated silver microparticles. It was further confirmed that growth of the particle diameter accompanied with growth of the crystallite's diameter can be suppressed. Therefore, it was confirmed that the ratio (d/D) of the crystallite's diameter to the particle diameter of the silver microparticle can be controlled. In addition, from FIG. 14 and FIG. 15, it can be seen that under the condition where pH of the silver-containing fluid (i.e., first fluid) is made constant in the acidic condition, there is a tendency that the ratio (d/D) becomes higher as the molar ratio of the sulfate ion in the mixed fluid to be processed to the silver in the silver-containing fluid becomes higher. Further, it can be seen that this tendency is maintained independent of pH in the acidic condition. Accordingly, it can be seen that by controlling both the molar ratio and pH, the ratio (d/D) can be controlled in a more dynamic range. Furthermore, it was confirmed that by increasing the molar ratio of the sulfate ion in the mixed fluid to be processed to the silver in the silver-containing fluid, the crystallite's diameter (d) of the separated silver microparticles tends to become larger.

Figure 16:
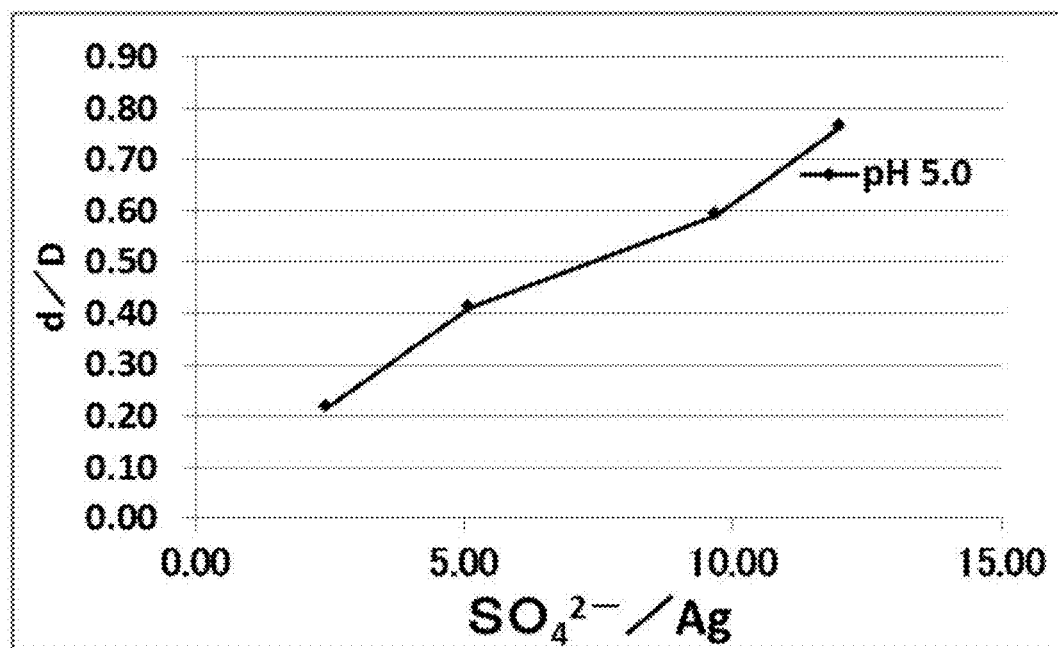
FIG. 16 is the graph in which the molar ratio of the sulfate ion to silver ($SO_4^{2-}/Ag$) is plotted in the horizontal axis, and the ratio (d/D) of the crystallite's diameter to the particle diameter is plotted in the vertical axis in the silver microparticles obtained in Examples B27 to B30.
Figure 17:
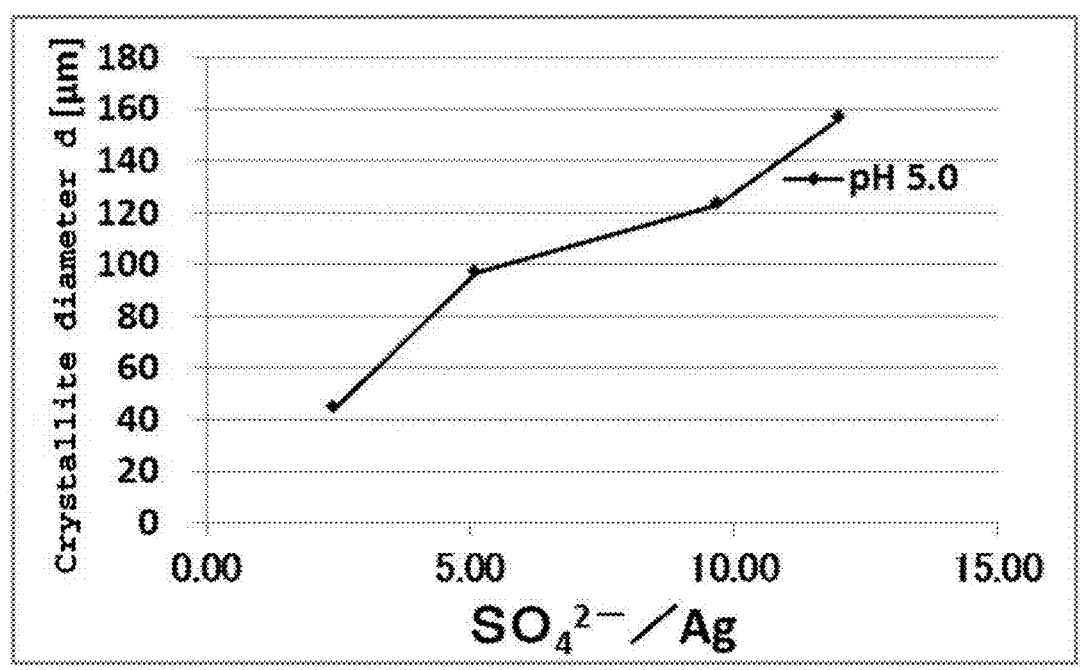
FIG. 17 is the graph in which the molar ratio of the sulfate ion to silver ($SO_4^{2-}/Ag$) is plotted in the horizontal axis, and the crystallite's diameter (d) is plotted in the vertical axis in the silver microparticles obtained in Examples B27 to B30.

In the case, too, that the mixing ratio of the silver-containing fluid and the reducing agent fluid is changed, it can be seen that from FIG. 16 and FIG. 17, similarly to Examples B18 to B26, the ratio (d/D) becomes higher by increasing the molar ratio of the sulfate ion to the silver in the mixed fluid to be processed. Further, it was confirmed that by increasing the molar ratio of the sulfate ion to the silver in the mixed fluid to be processed, the crystallite's diameter (d) of the separated silver microparticles becomes larger.

Comparative Examples B18 to B23

The dry powder of the silver microparticle was obtained by following the procedure of Examples B18 to B30, except that the composition of the silver-containing fluid was changed as shown in Table 35 and the process condition was changed as shown in Table 36. These results are shown in Table 37. In all of Comparative Examples B18 to B26, the silver microparticle dispersion solution discharged from the processing surfaces 1 and 2 showed an acidity.

The silver-containing fluid was prepared as following: after silver sulfate was dissolved in ethylene glycol and pure water, nitric acid and/or potassium nitrate was added separately as the nitric acid compound, which is different from Examples B18 to B30 in which the sulfate compounds were separately added. In addition, with regard to the results obtained in Table 37, in FIG. 18, in each pH of the first fluid the total molar ratio of the sulfate ion and the nitrate ion to silver ($SO_4^{2-}$+$NO_3^-$/Ag) is plotted in the horizontal axis, and the ratio (d/D) of the crystallite's diameter to the particle diameter is plotted in the vertical axis; and in FIG. 19, in each pH of the first fluid the total molar ratio of the sulfate ion and the nitrate ion to silver ($SO_4^{2-}$+$NO_3^-$/Ag) is plotted in the horizontal axis, and the crystallite's diameter (d) is plotted in the vertical axis.

TABLE 35

| | First fluid: composition | | | | | | | |
|---|---|---|---|---|---|---|---|---|
| Comparative Example | EG Concentration (% by weight) | PW | $Ag_2SO_4$ | $H_2SO_4$ | $(NH_4)_2SO_4$ Concentration (mol/L) | $K_2SO_4$ | $HNO_3$ | $KNO_3$ |
| 18 | 83.3 | 16.6 | 0.00353 | 0.0000 | 0.0000 | 0.0000 | 0.0032 | 0.0000 |
| 19 | 83.3 | 16.6 | 0.00353 | 0.0000 | 0.0000 | 0.0000 | 0.0032 | 0.0004 |
| 20 | 83.3 | 16.6 | 0.00353 | 0.0000 | 0.0000 | 0.0000 | 0.0032 | 0.0009 |
| 21 | 83.3 | 16.6 | 0.00353 | 0.0000 | 0.0000 | 0.0000 | 0.0014 | 0.0000 |
| 22 | 83.3 | 16.6 | 0.00353 | 0.0000 | 0.0000 | 0.0000 | 0.0014 | 0.0004 |
| 23 | 83.3 | 16.6 | 0.00353 | 0.0000 | 0.0000 | 0.0000 | 0.0014 | 0.0009 |
| 24 (Example 24) | 83.3 | 16.6 | 0.00353 | 0.0000 | 0.0000 | 0.0000 | 0.0000 | 0.0000 |
| 25 | 83.3 | 16.6 | 0.00353 | 0.0000 | 0.0000 | 0.0005 | 0.0000 | 0.0004 |
| 26 | 83.3 | 16.6 | 0.00353 | 0.0000 | 0.0000 | 0.0000 | 0.0000 | 0.0009 |

TABLE 36

| | First fluid | | Second fluid | | |
|---|---|---|---|---|---|
| Comparative Example | Supply rate (mL/minute) | Supply temperature (° C.) | Supply rate (mL/minute) | Supply temperature (° C.) | (pH) |
| 18 | 500 | 20 | 30 | 20 | 3.4 |
| 19 | 500 | 20 | 30 | 20 | 3.4 |
| 20 | 500 | 20 | 30 | 20 | 3.4 |
| 21 | 500 | 20 | 30 | 20 | 3.4 |
| 22 | 500 | 20 | 30 | 20 | 3.4 |
| 23 | 500 | 20 | 30 | 20 | 3.4 |
| 24 (Example 24) | 500 | 20 | 30 | 20 | 3.4 |
| 25 | 500 | 20 | 30 | 20 | 3.4 |
| 26 | 500 | 20 | 30 | 20 | 3.4 |

TABLE 37

| Comparative Example | First fluid (pH) | Molar ratio $SO_4^{2-}$/Ag | Molar ratio $NO_3^-$/Ag | Molar ratio $(SO_4^{2-} + NO_3^-)$/Ag | Crystallite's diameter d (μm) | Particle diameter D (μm) | d/D |
|---|---|---|---|---|---|---|---|
| 18 | 2.6 | 2.80 | 0.45 | 3.25 | 12.3 | 112.3 | 0.11 |
| 19 | 2.6 | 2.80 | 0.51 | 3.31 | 34.6 | 151.1 | 0.23 |
| 20 | 2.6 | 2.80 | 0.58 | 3.38 | 24.1 | 221.3 | 0.11 |
| 21 | 3.1 | 2.80 | 0.20 | 3.00 | 16.8 | 188.8 | 0.09 |
| 22 | 3.1 | 2.80 | 0.25 | 3.05 | 14.9 | 174.6 | 0.09 |
| 23 | 3.1 | 2.80 | 0.33 | 3.13 | 19.4 | 231.5 | 0.08 |
| 24 (Example 24) | 5.0 | 2.80 | 0.00 | 2.80 | 50.8 | 198.7 | 0.26 |
| 25 | 5.0 | 2.80 | 0.06 | 2.86 | 18.6 | 224.6 | 0.08 |
| 26 | 5.0 | 2.80 | 0.13 | 2.93 | 31.6 | 167.9 | 0.19 |

Figure 18:
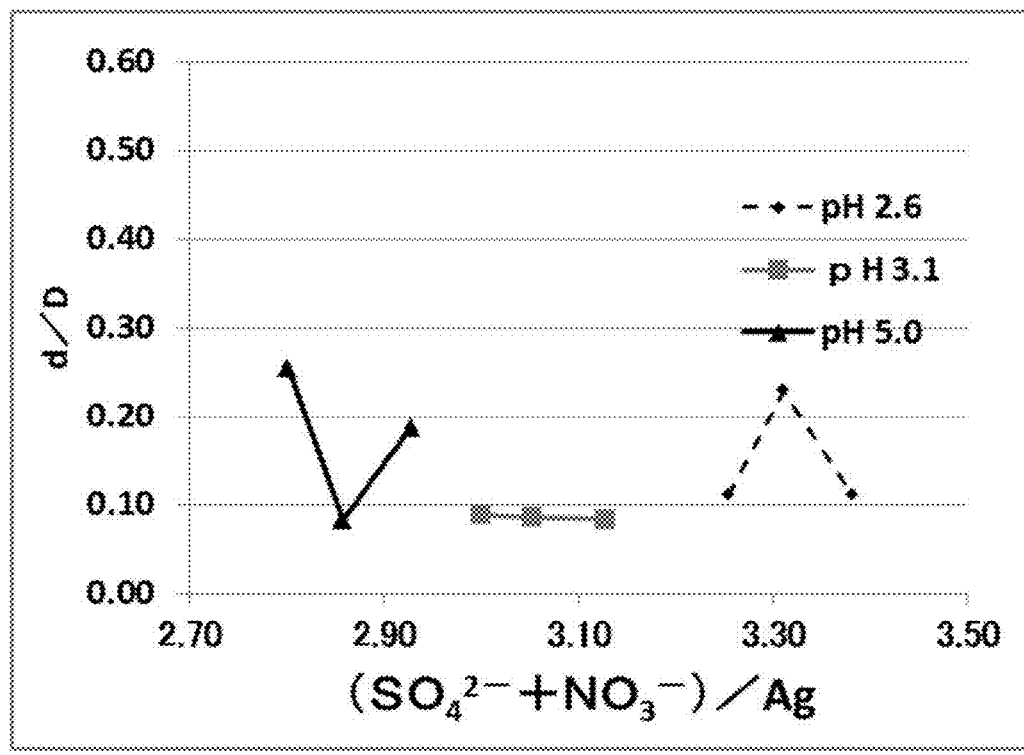
FIG. 18 is the graph in which in each pH of the first fluid the total molar ratio of the sulfate ion and the nitrate ion to silver ($SO_4^{2-}+NO_3^-/Ag$) is plotted in the horizontal axis, and the ratio (d/D) of the crystallite's diameter to the particle diameter is plotted in the vertical axis in the silver microparticles obtained in Comparative Examples B18 to B26.
Figure 19:
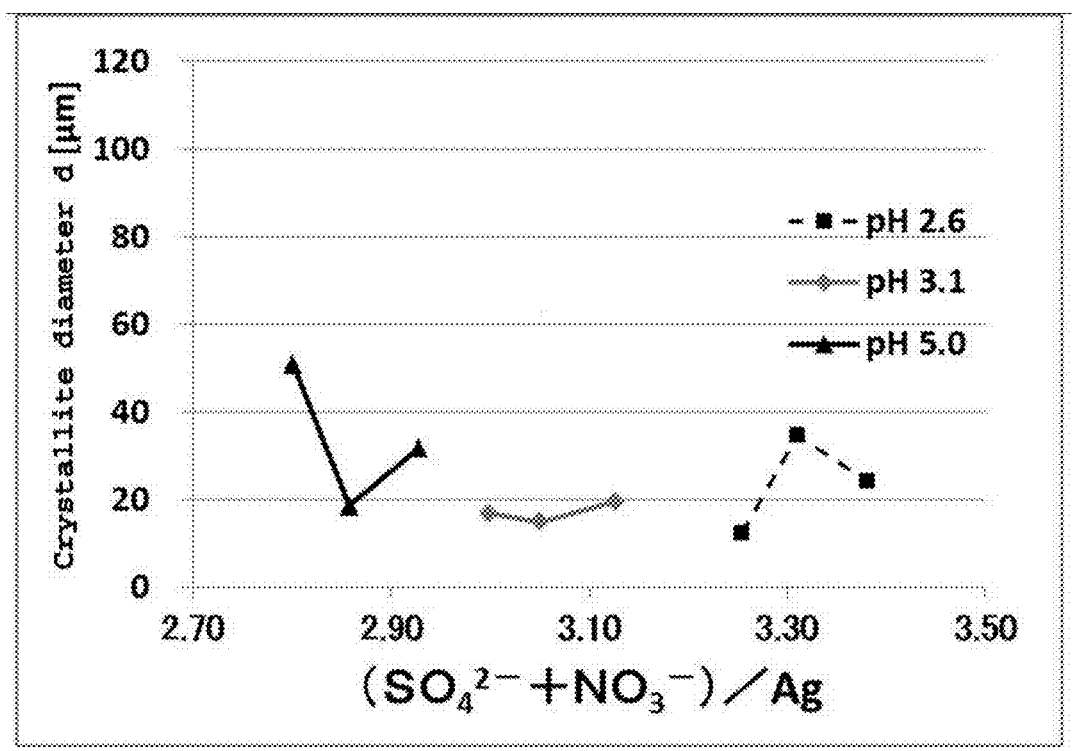
FIG. 19 is the graph in which in each pH of the first fluid the total molar ratio of the sulfate ion and the nitrate ion to silver ($SO_4^{2-}+NO_3^-/Ag$) is plotted in the horizontal axis, and the crystallite's diameter (d) is plotted in the vertical axis in the silver microparticles obtained in Comparative Examples B18 to B26.

From Table 37, FIG. 18, and FIG. 19, when the molar ratio of the sulfate ion in the mixed fluid to be processed to the silver in the first fluid ($SO_4^{2-}$/Ag) was made constant while the nitric acid compound was added separately in the first fluid, neither the relationship between the total molar ratio of the sulfate ion and the nitrate ion to silver and the crystallite's diameter nor the relationship between the said total molar ratio and the crystallite's diameter relative to the particle diameter could be found; and thus, the ratio (d/D) could not be controlled.

Comparative Examples B27 to B35

The dry powder of the silver microparticle was obtained by following the procedure of Examples B18 to B30, except that the composition of the silver-containing fluid was changed as shown in Table 38 and the process condition was changed as shown in Table 39. These results are shown in Table 40. In all of Comparative Examples B27 to B35, the silver microparticle dispersion solution discharged from the processing surfaces 1 and 2 showed an acidity.

The silver-containing fluid was prepared as following: after silver sulfate was dissolved in ethylene glycol and pure water, acetic acid and/or potassium acetate was added separately as the acetic acid compound, which is different from Examples B18 to B30 in which the sulfate compounds were separately added. In addition, with regard to the results obtained in Table 40, in FIG. 20, in each pH of the first fluid the total molar ratio of the sulfate ion and the acetate ion to silver ($SO_4^{2-}$+$CH_3COO^-$/Ag) is plotted in the horizontal axis, and the ratio (d/D) of the crystallite's diameter to the particle diameter is plotted in the vertical axis; and in FIG. 21, in each pH of the first fluid the total molar ratio of the sulfate ion and the acetate ion to silver ($SO_4^{2-}$+$CH_3COO^-$/Ag) is plotted in the horizontal axis, and the crystallite's diameter (d) is plotted in the vertical axis.

TABLE 38

| | First fluid: composition | | | | | | |
|---|---|---|---|---|---|---|---|
| Comparative Example | EG  PW Concentration (% by weight) | $Ag_2SO_4$ | $H_2SO_4$ | $(NH_4)_2SO_4$ | $K_2SO_4$ Concentration (mol/L) | $CH_3COOH$ | $CH_3COOK$ |
| 27 | 83.3  16.6 | 0.00353 | 0.0000 | 0.0000 | 0.0000 | 0.0019 | 0.0000 |
| 28 | 83.3  16.6 | 0.00353 | 0.0000 | 0.0000 | 0.0000 | 0.0019 | 0.0004 |
| 29 | 83.3  16.6 | 0.00353 | 0.0000 | 0.0000 | 0.0000 | 0.0019 | 0.0019 |
| 30 | 83.3  16.6 | 0.00353 | 0.0000 | 0.0000 | 0.0000 | 0.0010 | 0.0000 |
| 31 | 83.3  16.6 | 0.00353 | 0.0000 | 0.0000 | 0.0000 | 0.0010 | 0.0004 |
| 32 | 83.3  16.6 | 0.00353 | 0.0000 | 0.0000 | 0.0000 | 0.0010 | 0.0008 |
| 33 (Example 24) | 83.3  16.6 | 0.00353 | 0.0000 | 0.0000 | 0.0000 | 0.0000 | 0.0000 |
| 34 | 83.3  16.6 | 0.00353 | 0.0000 | 0.0000 | 0.0005 | 0.0000 | 0.0004 |
| 35 | 83.3  16.6 | 0.00353 | 0.0000 | 0.0000 | 0.0000 | 0.0000 | 0.0010 |

TABLE 39

| | First fluid | | Second fluid | | |
|---|---|---|---|---|---|
| Comparative Example | Supply rate (mL/minute) | Supply temperature (° C.) | Supply rate (mL/minute) | Supply temperature (° C.) | (pH) |
| 27 | 500 | 20 | 30 | 20 | 3.4 |
| 28 | 500 | 20 | 30 | 20 | 3.4 |
| 29 | 500 | 20 | 30 | 20 | 3.4 |
| 30 | 500 | 20 | 30 | 20 | 3.4 |
| 31 | 500 | 20 | 30 | 20 | 3.4 |
| 32 | 500 | 20 | 30 | 20 | 3.4 |
| 33 (Example 24) | 500 | 20 | 30 | 20 | 3.4 |
| 34 | 500 | 20 | 30 | 20 | 3.4 |
| 35 | 500 | 20 | 30 | 20 | 3.4 |

TABLE 40

| Comparative Example | First fluid (pH) | Molar ratio $SO_4^{2-}$/Ag | Molar ratio $CH_3COO^-$/Ag | Molar ratio $(SO_4^{2-} + CH_3COO^-)$/Ag | Crystallite's diameter d (μm) | Particle diameter D (μm) | d/D |
|---|---|---|---|---|---|---|---|
| 27 | 3.5 | 2.80 | 0.27 | 3.07 | 11.6 | 132.6 | 0.09 |
| 28 | 3.5 | 2.80 | 0.33 | 3.13 | 31.2 | 141.3 | 0.22 |
| 29 | 3.5 | 2.80 | 0.54 | 3.34 | 28.9 | 164.8 | 0.18 |
| 30 | 3.7 | 2.80 | 0.14 | 2.94 | 32.1 | 187.9 | 0.17 |
| 31 | 3.7 | 2.80 | 0.20 | 3.00 | 14.6 | 331.6 | 0.04 |
| 32 | 3.7 | 2.80 | 0.26 | 3.06 | 9.9 | 147.9 | 0.07 |
| 33 (Example 24) | 5.0 | 2.80 | 0.00 | 2.80 | 50.8 | 198.7 | 0.26 |
| 34 | 5.0 | 2.80 | 0.05 | 2.85 | 19.6 | 231.6 | 0.08 |
| 35 | 5.0 | 2.80 | 0.14 | 2.94 | 15.4 | 197.8 | 0.08 |

Figure 20:
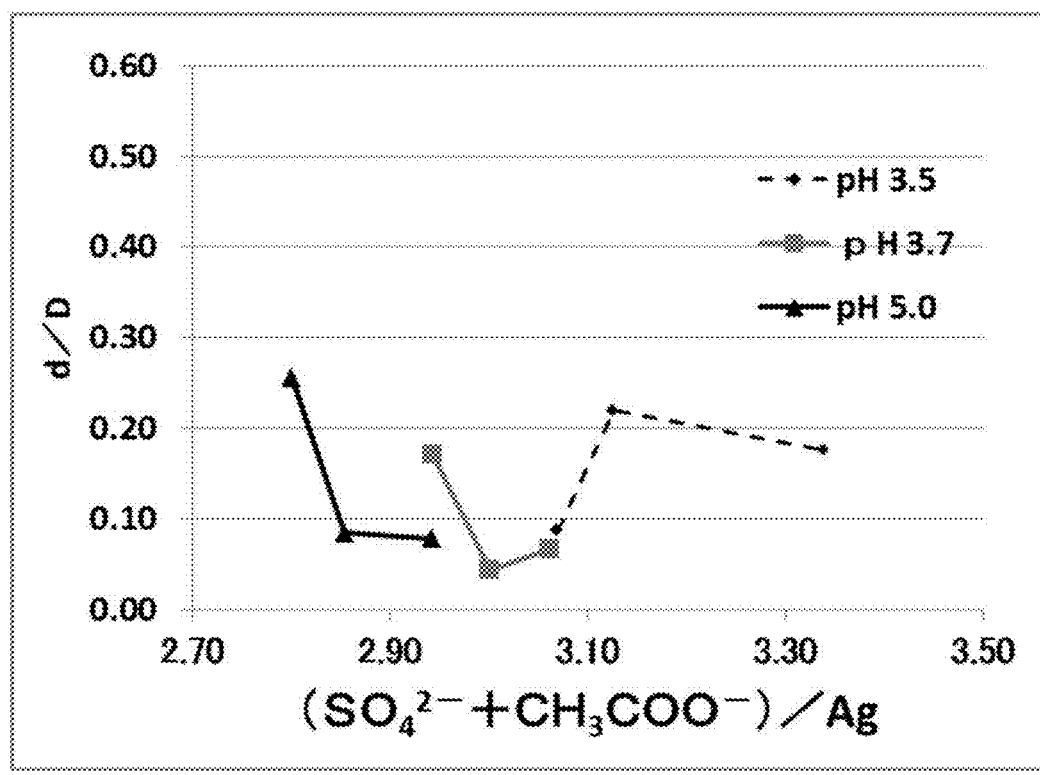
FIG. 20 is the graph in which in each pH of the first fluid the total molar ratio of the sulfate ion and the acetate ion to silver ($SO_4^{2-}+CH_3COO^-/Ag$) is plotted in the horizontal axis, and the ratio (d/D) of the crystallite's diameter to the particle diameter is plotted in the vertical axis in the silver microparticles obtained in Comparative Examples B27 to B35.
Figure 21:
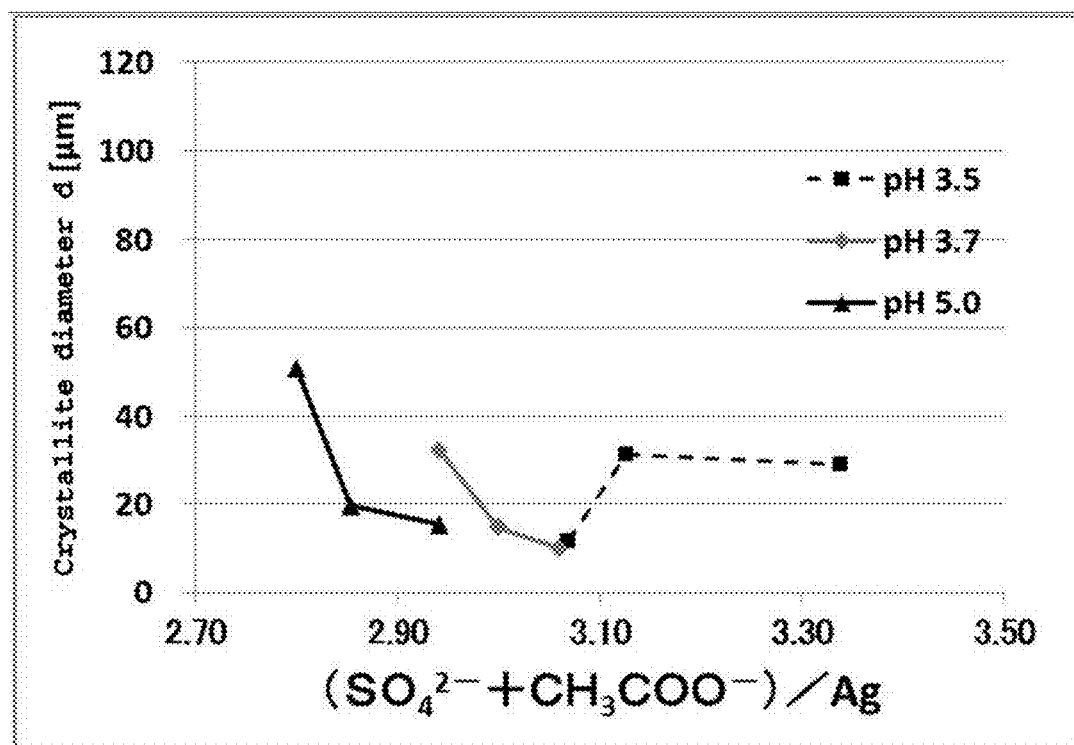
FIG. 21 is the graph in which in each pH of the first fluid the total molar ratio of the sulfate ion and the acetate ion to silver ($SO_4^{2-}+CH_3COO^-/Ag$) is plotted in the horizontal axis, and the crystallite's diameter (d) is plotted in the vertical axis in the silver microparticles obtained in Comparative Examples B27 to B35.

From Table 40, FIG. 20, and FIG. 21, when the molar ratio of the sulfate ion in the mixed fluid to be processed to the silver in the first fluid ($SO_4^{2-}$/Ag) was made constant while the acetic acid compound was added separately in the first fluid, neither the relationship between the total molar ratio of the sulfate ion and the acetate ion to silver and the crystallite's diameter nor the relationship between the said total molar ratio and the crystallite's diameter relative to the particle diameter could be found; and thus, the ratio (d/D) could not be controlled.

As can be clearly seen in Examples B, in the presently applied invention, in the case that only water is used as the solvent for silver or a silver compound, the control can be made in such a way that the ratio (d/D) of the crystallite's diameter (d) to the particle diameter (D) of the obtained silver microparticles may become lower by raising the molar ratio of the sulfate ion in the mixed fluid to the silver in the silver-containing fluid, and also the control can be made in such away that the ratio (d/D) may become higher by lowering the molar ratio of the sulfate ion in the mixed fluid to the silver in the silver-containing fluid.

In the case that a non-aqueous organic solvent represented by a polyol-type (polyvalent alcohol) organic solvent such as ethylene glycol is used as the solvent for silver or a silver compound, or when a combination of a non-aqueous solvent with water is used for it, the control can be made in such a way that the ratio (d/D) of the crystallite's diameter (d) to the particle diameter (D) of the obtained silver microparticles may become lower by lowering the molar ratio of the sulfate ion in the mixed fluid to the silver in the silver-containing fluid, and also the control can be made in such a way that the ratio (d/D) may become higher by raising the molar ratio of the sulfate ion in the mixed fluid to the silver in the silver-containing fluid.

Meanwhile, the operations including preparation of fluids and mixing them for these controls may be done at room temperature as well as other environment than room temperature.

(C) Method for Producing Copper Microparticle

Next, the method for producing the copper microparticle will be specifically explained by showing Examples.

Separation of the Copper Microparticle:

By using the fluid processing apparatus shown in FIG. 1, the copper-dissolved fluid and the reducing agent fluid are mixed in the thin film fluid formed between the processing surfaces 1 and 2 which are disposed in a position they are faced with each other so as to be able to approach to and separate from each other, at least one of which rotates relative to the other, whereby the copper microparticle is separated in this thin film fluid.

Specifically, from the center, the at least any one of the copper-dissolved fluid or the reducing agent fluid is supplied as the first fluid with the supply pressure of 0.50 MPaG. The first fluid is supplied to the sealed space formed between the processing surface 1 of the processing member 10 and the processing surface 2 of the processing member 20 (between the processing surfaces) in FIG. 1. The rotation number of the processing member 10 is 1,700 rpm. The first fluid forms the forced thin film fluid between the processing surfaces 1 and 2, and then it is discharged from the circumferences of the processing members 10 and 20. Any one of the copper-dissolved fluid or the reducing agent fluid other than the foregoing fluid is introduced as the second fluid directly into the thin film fluid formed between the processing surfaces 1 and 2. The copper-dissolved fluid and the reducing agent fluid are mixed between the processing surfaces 1 and 2, the space therebetween being controlled so as to be a very narrow distance, whereby the copper microparticle is separated. The slurry which contains the copper microparticle (nickel microparticle dispersion solution) is discharged from between the processing surfaces 1 and 2.

Method for Recovering Microparticles:

The dispersion solution of the copper microparticles which was discharged from between the processing surfaces 1 and 2 was settled down to precipitate the copper microparticles; and after the supernatant solution thereof was removed, washing by pure water was repeated for 3 times, and then the obtained wet cake was dried at 25° C. and −0.10 MPa to obtain dry powders of the copper microparticles.

Measurement of pH of the first fluid and the second fluid as well as the analysis of the dry powder of the copper microparticle was done as follows.

Measurement of pH:

Measurement of pH was done by using the pH meter (Type D-51, manufactured by HORIBA, Ltd.). Before each of the fluids to be processed was introduced into the fluid processing apparatus, pH of each of the fluids to be processed was measured at room temperature.

Observation by the Scanning Electron Microscope:

Observation by the scanning electron microscope (SEM) was done by using the field-emission-type scanning electron microscope (FE-SEM) (JSM-7500F, manufactured by JEOL Ltd.). The observation condition with the magnification of 10,000 or more was used, wherein the average value of the particle diameters of 100 copper microparticles obtained by the SEM observation was taken as the primary particle diameter.

Measurement of the X-Ray Diffraction:

Measurement of the X-ray diffraction (XRD) was made by using the powder X-ray diffraction measurement instrument X'pert PRO MPD (XRD; manufactured by Panalytical Business Unit of Spectris Co., Ltd.). The measurement conditions were as follows: Cu anticathode, tube voltage of 45 kV, tube current of 40 mA, 0.016 step/10 second, and the measurement range of 10 to 100°/2θ (Cu). The crystallite's diameter of the obtained copper microparticle was calculated from the XRD measurement. The peak confirmed at 47.3° C. was used for the polycrystalline silicon plate, and the Scherrer's equation was applied to the peak appeared near to 43.0° in the obtained copper diffraction pattern.

ICP Analysis—Detection of Impure Elements:

Quantitative analysis of the elements contained in the dry powder of the copper microparticle by the inductively coupled plasma atomic emission spectrophotometry (ICP) was carried out by using ICPS-8100 (manufactured by Shimadzu Corp.).

The solution in which the dry powder of the copper microparticle was dissolved in nitric acid was used for the measurement. In all of Examples C and Comparative Examples C, all the elements other than the copper element were outside the detection limit.

Examples C1 to C14

The reducing agent fluid whose composition is shown in Table 42 and the copper-dissolved fluid whose composition is shown in Table 41 were mixed under the processing condition shown in Table 43 by using the fluid processing apparatus shown in FIG. 1 to separate the copper microparticles. The dry powders of the obtained copper microparticles were analyzed. The results of them are shown in Table 44. Meanwhile, the supply pressure of the first fluid and the rotation number of the processing member 10 were those as mentioned above. The dispersion solution of the copper microparticles which was discharged from between the processing surfaces 1 and 2 was acidic in all of Examples C1 to C14.

The copper-dissolved fluid was prepared by dissolving copper sulfate pentahydrate into ethylene glycol and pure water, followed by addition of a sulfate compound into it. The reducing agent fluid was prepared by dissolving L-ascorbic acid into pure water in Examples C1 to C9; and in Examples C10 to C14, the preparation thereof was done by dissolving L-ascorbic acid into pure water, followed by addition of sulfuric acid into it.

Figure 36:
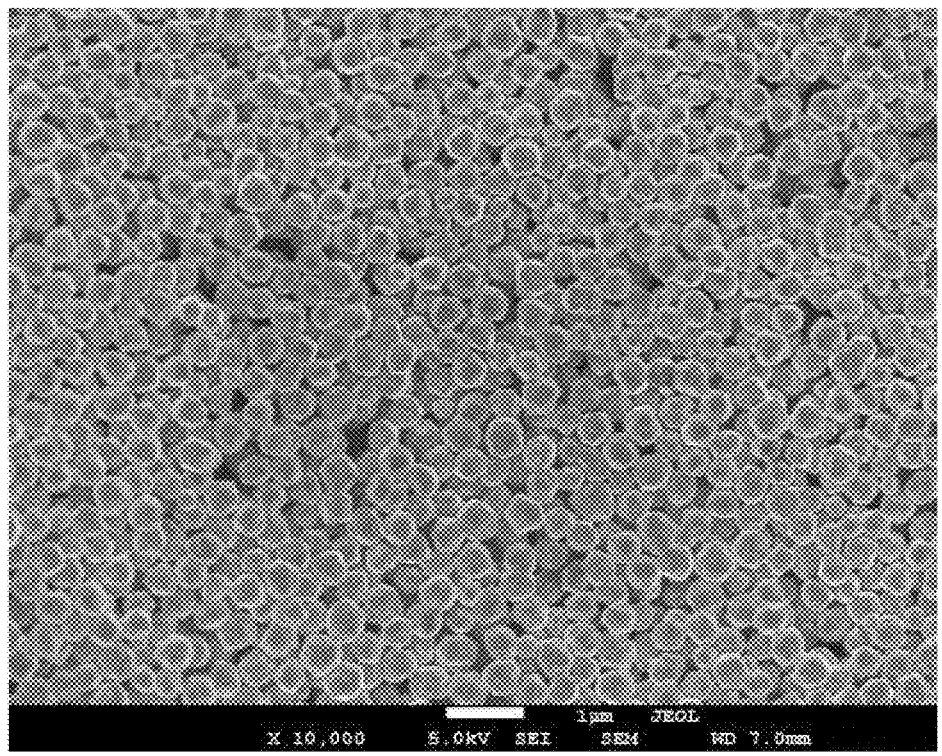
FIG. 36 is the SEM picture of the copper microparticles obtained in Example C7.

Abbreviations shown in Tables 41 to later-mentioned 56 are as follows: EG for ethylene glycol; PW for pure water; $CuSO_4 \cdot 5H_2O$ for copper sulfate pentahydrate; Ascorbic acid for L-ascorbic acid; $H_2SO_4$ for sulfuric acid; $(NH_4)_2SO_4$ for ammonium sulfate; $K_2SO_4$ for potassium sulfate; $HNO_3$ for nitric acid; $KNO_3$ for potassium nitrate; $CH_3COOH$ for acetic acid; $CH_3COOK$ for potassium acetate; $SO_4^{2-}$ for sulfate ion; $NO_3^-$ for nitrate ion; $CH_3COO^-$ for acetate ion; and Cu for copper. Among the results obtained in Table 44, with regard to the results of Examples C1 to C9, in FIG. 22, in each pH of the first fluid the molar ratio of the sulfate ion to copper ($SO_4^{2-}$/Cu) is plotted in the horizontal axis, and the ratio (d/D) of the crystallite's diameter to the particle diameter is plotted in the vertical axis; and in FIG. 23, in each pH of the first fluid the molar ratio of the sulfate ion to copper ($SO_4^{2-}$/Cu) is plotted in the horizontal axis, and the crystallite's diameter (d) is plotted in the vertical axis. In Examples C10 to C12, while the composition of the first fluid was kept as same as that of Example C7, by changing the concentration of sulfuric acid in the reducing agent fluid (i.e., second fluid), the molar ratio of the sulfate ion to the copper in the mixed fluid to be processed was changed. With regard to the results of Examples C10 to C12, in FIG. 24, the molar ratio of the sulfate ion to copper ($SO_4^{2-}$/Cu) is plotted in the horizontal axis, and the ratio (d/D) of the crystallite's diameter to the particle diameter is plotted in the vertical axis; and in FIG. 25, the molar ratio of the sulfate ion to copper ($SO_4^{2-}$/Cu) is plotted in the horizontal axis, and the crystallite's diameter (d) is plotted in the vertical axis. In Examples C11, C13, and C14, by changing the flow rate of the copper-dissolved fluid (i.e., first fluid), whereby changing the mixing ratio of the copper-dissolved fluid to the reducing agent fluid, the molar ratio of the sulfate ion to the copper in the mixed fluid to be processed was changed. With regard to the results of Examples C11, C13, and C14, in FIG. 26, the molar ratio of the sulfate ion to copper ($SO_4^{2-}$/Cu) is plotted in the horizontal axis, and the ratio (d/D) of the crystallite's diameter to the particle diameter is plotted in the vertical axis; and in FIG. 27, the molar ratio of the sulfate ion to copper ($SO_4^{2-}$/Cu) is plotted in the horizontal axis, and the crystallite's diameter (d) is plotted in the vertical axis. Further, the SEM picture of the copper microparticles obtained in Example C7 is shown in FIG. 36.

TABLE 41

| | First fluid: composition | | | | | |
|---|---|---|---|---|---|---|
| Example | EG Concentration (% by weight) | PW Concentration (% by weight) | $CuSO_4 \cdot 5H_2O$ (mol/L) | $H_2SO_4$ (mol/L) | $(NH_4)_2SO_4$ (mol/L) | $K_2SO_4$ (mol/L) |
| 1 | 99.0 | 0.9 | 0.00450 | 0.0011 | 0.0000 | 0.0000 |
| 2 | 99.0 | 0.9 | 0.00450 | 0.0011 | 0.0002 | 0.0000 |
| 3 | 99.0 | 0.9 | 0.00450 | 0.0011 | 0.0002 | 0.0002 |
| 4 | 99.0 | 0.9 | 0.00450 | 0.0004 | 0.0000 | 0.0000 |
| 5 | 99.0 | 0.9 | 0.00450 | 0.0004 | 0.0002 | 0.0000 |
| 6 | 99.0 | 0.9 | 0.00450 | 0.0004 | 0.0002 | 0.0002 |
| 7 | 99.0 | 0.9 | 0.00450 | 0.0000 | 0.0000 | 0.0000 |
| 8 | 99.0 | 0.9 | 0.00450 | 0.0000 | 0.0002 | 0.0000 |
| 9 | 99.0 | 0.9 | 0.00450 | 0.0000 | 0.0002 | 0.0002 |
| 10 | 99.0 | 0.9 | 0.00450 | 0.0000 | 0.0000 | 0.0000 |
| 11 | 99.0 | 0.9 | 0.00450 | 0.0000 | 0.0000 | 0.0000 |
| 12 | 99.0 | 0.9 | 0.00450 | 0.0000 | 0.0000 | 0.0000 |
| 13 | 99.0 | 0.9 | 0.00450 | 0.0000 | 0.0000 | 0.0000 |
| 14 | 99.0 | 0.9 | 0.00450 | 0.0000 | 0.0000 | 0.0000 |

TABLE 42

| | Second fluid: composition | | |
|---|---|---|---|
| Example | PW Concentration (% by weight) | Ascorbic acid (mol/L) | $H_2SO_4$ Concentration (mol/L) |
| 1 | 83.6 | 1.00 | 0.0000 |
| 2 | 83.6 | 1.00 | 0.0000 |
| 3 | 83.6 | 1.00 | 0.0000 |

TABLE 42-continued

| | Second fluid: composition | | |
|---|---|---|---|
| Example | PW Concentration (% by weight) | Ascorbic acid Concentration (mol/L) | $H_2SO_4$ |
| 4 | 83.6 | 1.00 | 0.0000 |
| 5 | 83.6 | 1.00 | 0.0000 |
| 6 | 83.6 | 1.00 | 0.0000 |
| 7 | 83.6 | 1.00 | 0.0000 |
| 8 | 83.6 | 1.00 | 0.0000 |
| 9 | 83.6 | 1.00 | 0.0000 |
| 10 | 83.6 | 1.00 | 0.0022 |
| 11 | 83.6 | 1.00 | 0.0045 |
| 12 | 83.6 | 1.00 | 0.0112 |
| 13 | 83.6 | 1.00 | 0.0045 |
| 14 | 83.6 | 1.00 | 0.0045 |

TABLE 43

| | First fluid | | Second fluid | | |
|---|---|---|---|---|---|
| Example | Supply rate (mL/minute) | Supply temperature (° C.) | Supply rate (mL/minute) | Supply temperature (° C.) | (pH) |
| 1 | 1000 | 150 | 100 | 20 | 2.1 |
| 2 | 1000 | 150 | 100 | 20 | 2.1 |
| 3 | 1000 | 150 | 100 | 20 | 2.1 |
| 4 | 1000 | 150 | 100 | 20 | 2.1 |
| 5 | 1000 | 150 | 100 | 20 | 2.1 |
| 6 | 1000 | 150 | 100 | 20 | 2.1 |
| 7 | 1000 | 150 | 100 | 20 | 2.1 |
| 8 | 1000 | 150 | 100 | 20 | 2.1 |
| 9 | 1000 | 150 | 100 | 20 | 2.1 |
| 10 | 1000 | 150 | 100 | 20 | 2.0 |
| 11 | 1000 | 150 | 100 | 20 | 2.0 |
| 12 | 1000 | 150 | 100 | 20 | 2.0 |
| 13 | 100 | 150 | 100 | 20 | 2.0 |
| 14 | 50 | 150 | 100 | 20 | 2.0 |

TABLE 44

| Example | First fluid (pH) | Molar ratio $SO_4^{2-}$/Cu | Crystallite's diameter d (nm) | Particle diameter D (nm) | d/D |
|---|---|---|---|---|---|
| 1 | 2.0 | 1.24 | 456.3 | 712.3 | 0.64 |
| 2 | 2.0 | 1.29 | 521.3 | 776.4 | 0.67 |
| 3 | 2.0 | 1.33 | 678.9 | 984.6 | 0.69 |
| 4 | 2.9 | 1.09 | 275.8 | 512.3 | 0.54 |
| 5 | 2.9 | 1.13 | 341.3 | 612.3 | 0.56 |
| 6 | 2.9 | 1.18 | 369.4 | 632.1 | 0.58 |
| 7 | 4.0 | 1.00 | 169.9 | 504.3 | 0.34 |
| 8 | 4.0 | 1.04 | 211.6 | 498.7 | 0.42 |
| 9 | 4.0 | 1.09 | 263.4 | 515.6 | 0.51 |
| 10 | 4.0 | 1.05 | 251.4 | 523.6 | 0.48 |
| 11 | 4.0 | 1.10 | 347.6 | 631.2 | 0.55 |
| 12 | 4.0 | 1.25 | 657.7 | 1001.1 | 0.66 |
| 13 | 4.0 | 2.00 | 681.9 | 976.4 | 0.70 |
| 14 | 4.0 | 3.00 | 745.6 | 964.5 | 0.77 |

Figure 22:
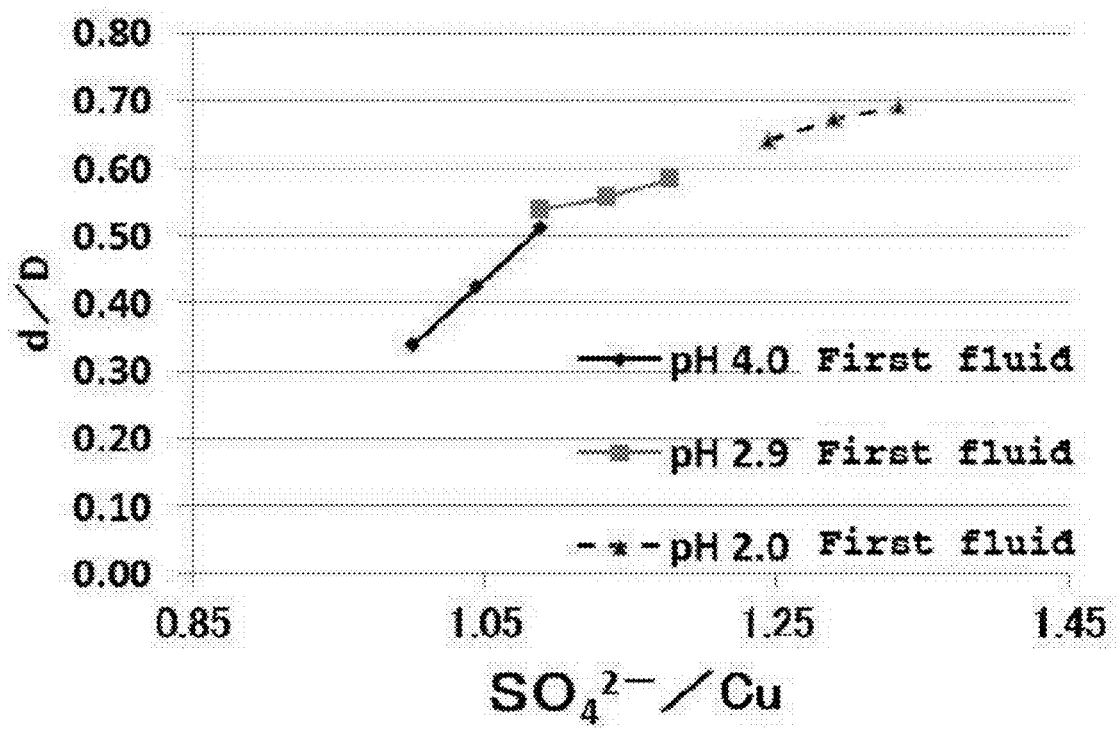
FIG. 22 is the graph in which in each pH of the first fluid the molar ratio of the sulfate ion to copper ($SO_4^{2-}/Cu$) is plotted in the horizontal axis, and the ratio (d/D) of the crystallite's diameter to the particle diameter is plotted in the vertical axis in the copper microparticles obtained in Examples C1 to C9.
Figure 23:
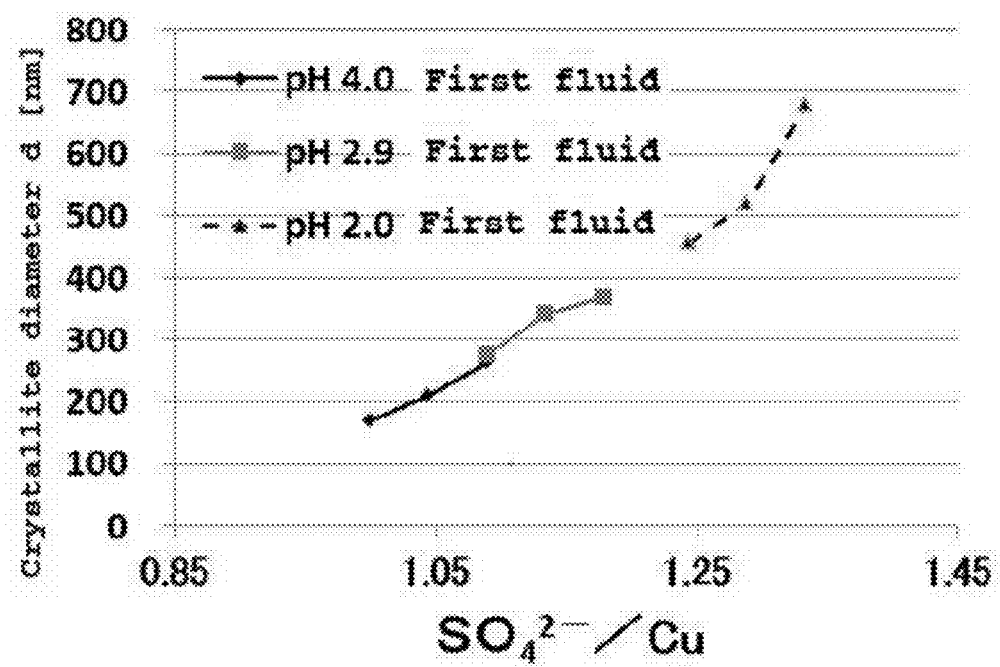
FIG. 23 is the graph in which in each pH of the first fluid the molar ratio of the sulfate ion to copper ($SO_4^{2-}/Cu$) is plotted in the horizontal axis, and the crystallite's diameter (d) is plotted in the vertical axis in the copper microparticles obtained in Examples C1 to C9.

From Table 44, FIG. 22, and FIG. 23, it was confirmed that by controlling the molar ratio ($SO_4^{2-}$/Ag) of the sulfate ion in the mixed fluid to be processed to the copper in the first fluid, growth of the crystallite can be controlled with controlling the particle diameter of the separated copper microparticles. It was further confirmed that growth of the particle diameter accompanied with growth of the crystallite's diameter can be suppressed. Therefore, it was confirmed that the ratio (d/D) of the crystallite's diameter to the particle diameter of the copper microparticle can be controlled. In addition, from FIG. 22 and FIG. 23, it can be seen that under the condition where pH of the copper-dissolved fluid (i.e., first fluid) is made constant in the acidic condition, there is a tendency that the ratio (d/D) becomes higher as the molar ratio of the sulfate ion in the mixed fluid to be processed to the copper in the copper-dissolved fluid becomes higher. Further, it can be seen that this tendency is maintained independent of pH in the acidic condition. Accordingly, it can be seen that by controlling both the molar ratio and pH, the ratio (d/D) can be controlled in a more dynamic range. Furthermore, it was confirmed that by increasing the molar ratio of the sulfate ion in the mixed fluid to be processed to the copper in the copper-dissolved fluid, the crystallite's diameter (d) of the separated copper microparticles tends to become larger.

Figure 24:
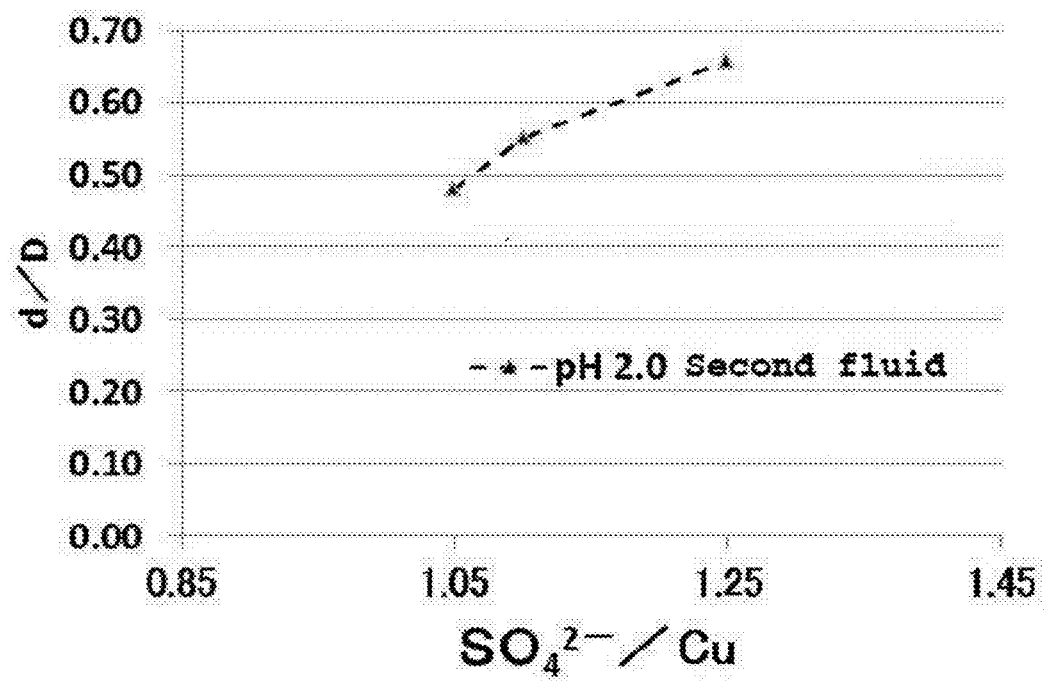
FIG. 24 is the graph in which the molar ratio of the sulfate ion to copper ($SO_4^{2-}/Cu$) is plotted in the horizontal axis, and the ratio (d/D) of the crystallite's diameter to the particle diameter is plotted in the vertical axis in the copper microparticles obtained in Examples C10 to C12.
Figure 25:
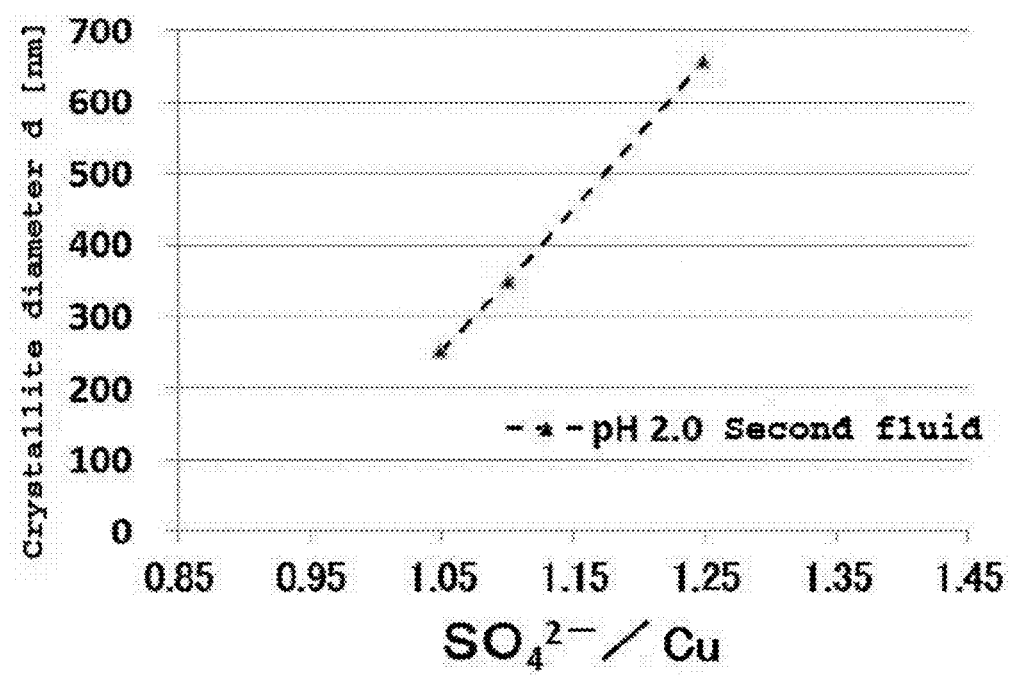
FIG. 25 is the graph in which the molar ratio of the sulfate ion to copper ($SO_4^{2-}/Cu$) is plotted in the horizontal axis, and the crystallite's diameter (d) is plotted in the vertical axis in the copper microparticles obtained in Examples C10 to C12.

From FIG. 24 and FIG. 25, it can be seen that even when concentration of sulfuric acid, which is the sulfate compound, in the second fluid is changed, similarly to Examples C1 to C9, the ratio (d/D) can be raised by raising the molar ratio of the sulfate ion to the copper in the mixed fluid to be processed. Furthermore, it was confirmed that by raising the molar ratio of the sulfate ion to the copper in the mixed fluid to be processed, the crystallite's diameter (d) of the separated copper microparticles can be made larger.

Figure 26:
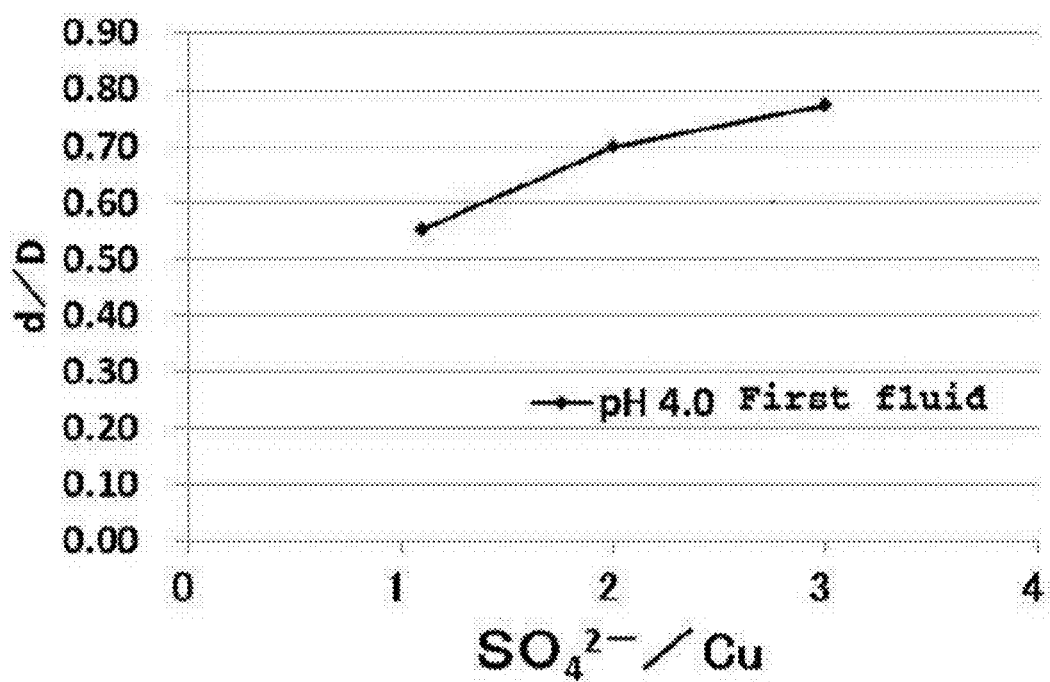
FIG. 26 is the graph in which the molar ratio of the sulfate ion to copper ($SO_4^{2-}/Cu$) is plotted in the horizontal axis, and the ratio (d/D) of the crystallite's diameter to the particle diameter is plotted in the vertical axis in the copper microparticles obtained in Examples C11, C13, and 014.
Figure 27:
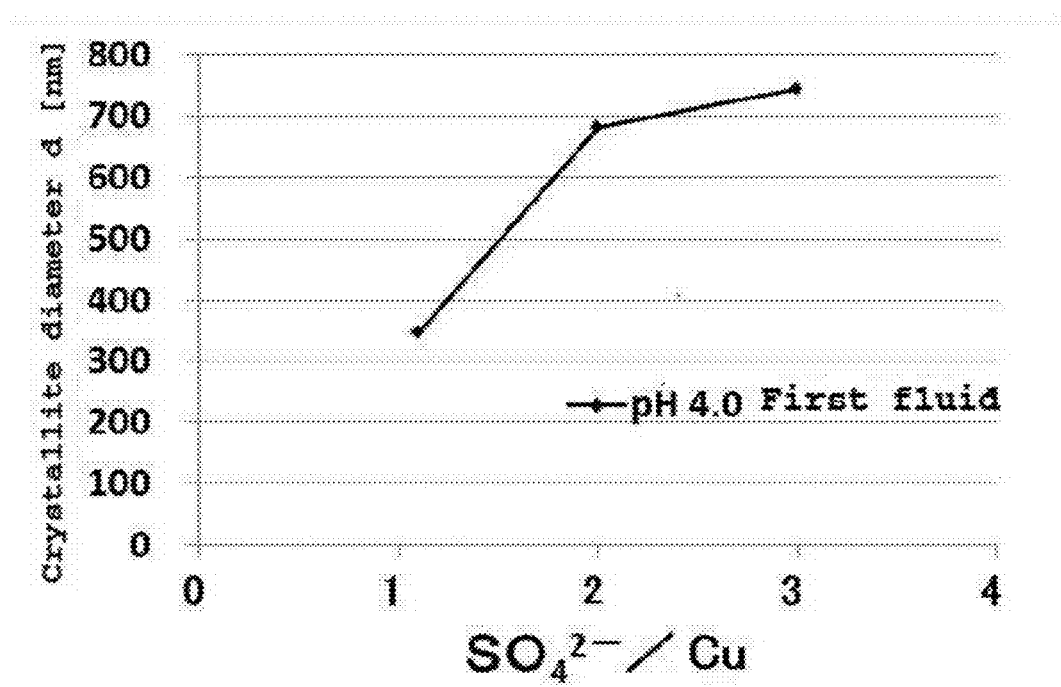
FIG. 27 is the graph in which the molar ratio of the sulfate ion to copper ($SO_4^{2-}/Cu$) is plotted in the horizontal axis, and the crystallite's diameter (d) is plotted in the vertical axis in the copper microparticles obtained in Examples C11, C13, and 014.

It can be seen that from FIG. 26 and FIG. 27, the mixing ratio of the copper-dissolved fluid and the reducing agent fluid is changed, similarly to Examples C1 to C9, the ratio (d/D) becomes higher by increasing the molar ratio of the sulfate ion to the copper in the mixed fluid to be processed.

Further, it was confirmed that by increasing the concentration of the sulfate ion in the mixed fluid to be processed, the crystallite's diameter (d) of the separated copper microparticles becomes larger.

Comparative Examples C1 to C12

The procedure of Examples C1 to C14 was repeated, except that the composition of the copper-dissolved fluid (i.e., first fluid) was changed to those shown in Table 45, the composition of the reducing agent fluid (i.e., second fluid) was changed to those shown in Table 46, and the process conditions were changed to those shown in Table 47, to obtain dry powder of the copper microparticles. The results of them are shown in Table 48. In all of Examples C1 to C12, the dispersion solutions of the copper microparticles which were discharged from between the processing surfaces 1 and 2 were acidic.

Figure 28:
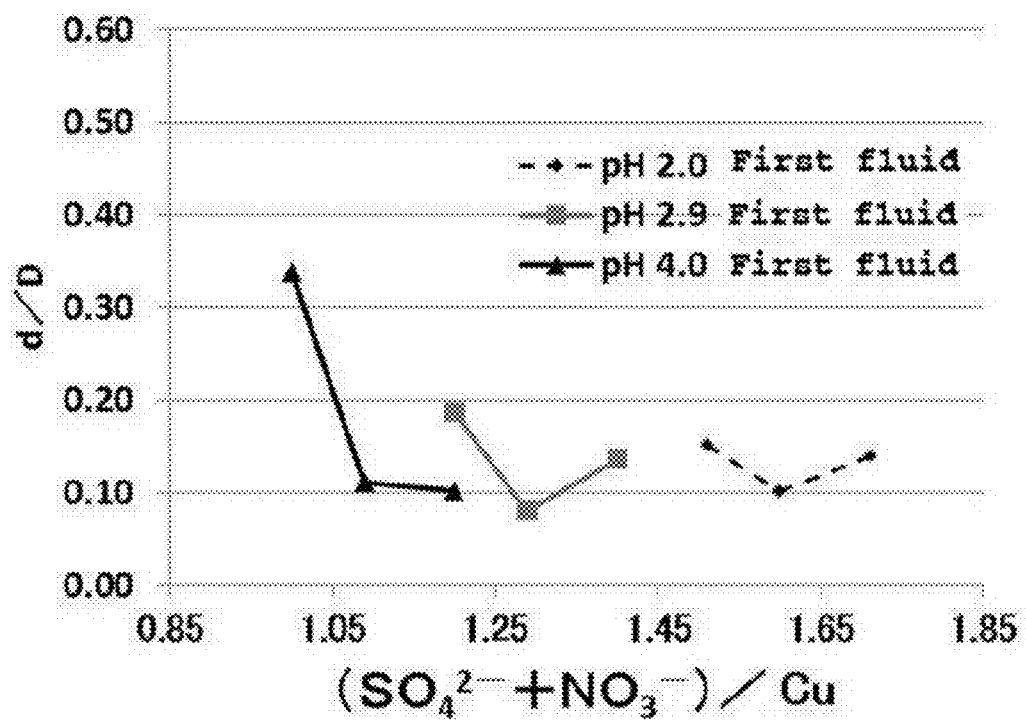
FIG. 28 is the graph in which in each pH of the first fluid the total molar ratio of the sulfate ion and the nitrate ion to copper ($SO_4^{2-}+NO_3^-/Cu$) is plotted in the horizontal axis, and the ratio (d/D) of the crystallite's diameter to the particle diameter is plotted in the vertical axis in the copper microparticles obtained in Comparative Examples C1 to C9.
Figure 29:
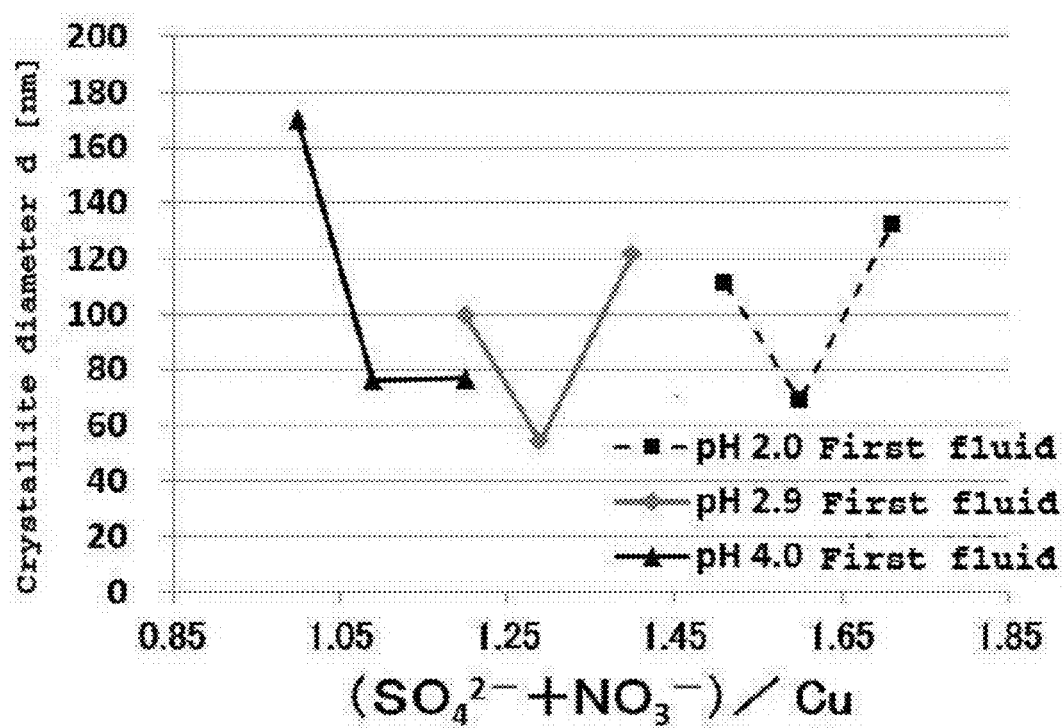
FIG. 29 is the graph in which in each pH of the first fluid the total molar ratio of the sulfate ion and the nitrate ion to copper ($SO_4^{2-}+NO_3^-/Cu$) is plotted in the horizontal axis, and the crystallite's diameter (d) is plotted in the vertical axis in the copper microparticles obtained in Comparative Examples C1 to C9.
Figure 30:
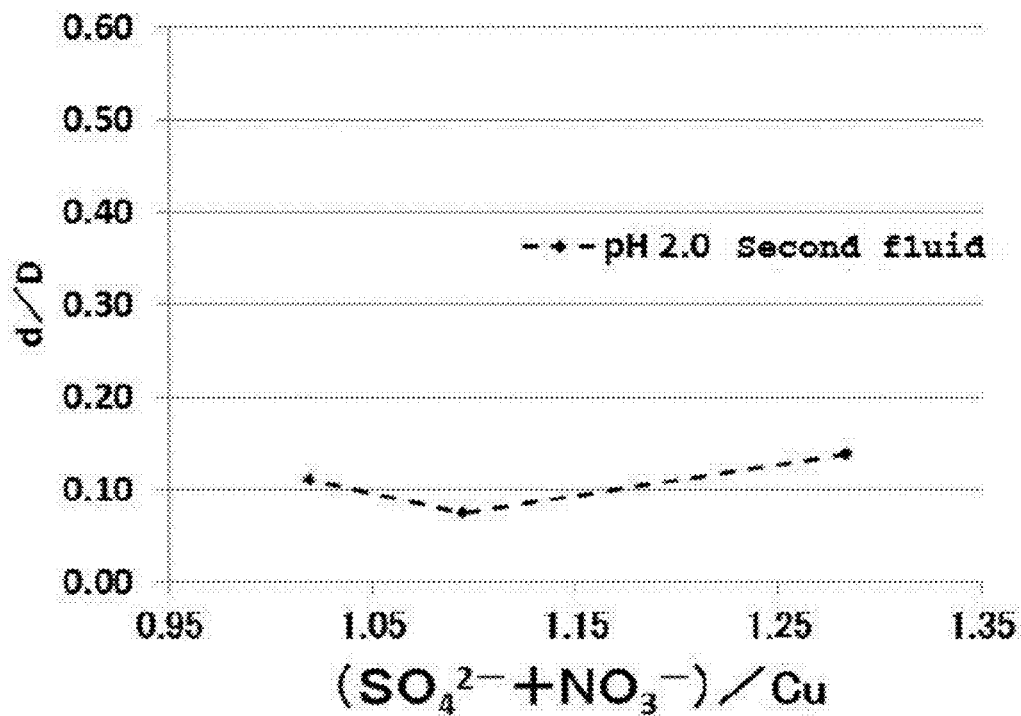
FIG. 30 is the graph in which the total molar ratio of the sulfate ion and the nitrate ion to copper ($SO_4^{2-}+NO_3^-/Cu$) is plotted in the horizontal axis, and the ratio (d/D) of the crystallite's diameter to the particle diameter is plotted in the vertical axis in the copper microparticles obtained in Comparative Examples C10 to C12.
Figure 31:
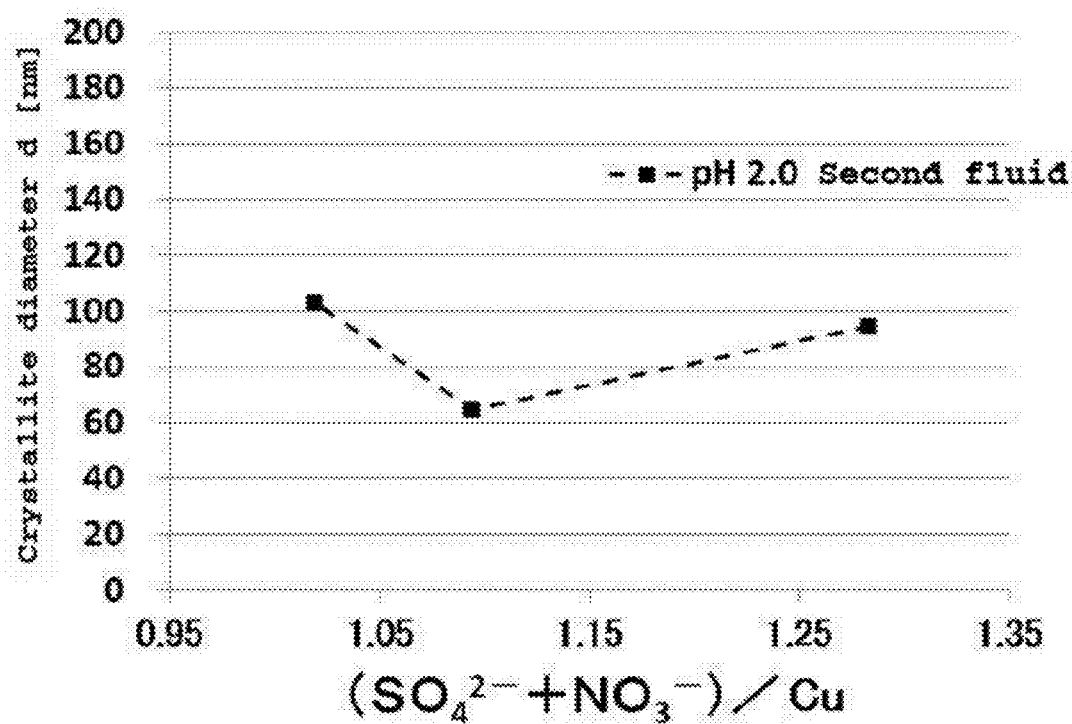
FIG. 31 is the graph in which the total molar ratio of the sulfate ion and the nitrate ion to copper ($SO_4^{2-}+NO_3^-/Cu$) is plotted in the horizontal axis, and the crystallite's diameter (d) is plotted in the vertical axis in the copper microparticles obtained in Comparative Examples C10 to C12.

The copper-dissolved fluid was prepared as following: after copper sulfate pentahydrate was dissolved in ethylene glycol and pure water, nitric acid and/or potassium nitrate was added separately as the nitrate compound, which is different from Examples C1 to C14 in which the sulfate compounds were separately added. The reducing agent fluid was prepared by dissolving L-ascorbic acid into pure water in Comparative Examples C1 to C9; and in Comparative Examples C10 to C12, the preparation thereof was done by dissolving L-ascorbic acid into pure water followed by addition of nitric acid into it. With regard to the results of Comparative Example C1 to C9 obtained in Table 48, in FIG. 28, in each pH of the first fluid the total molar ratio of the sulfate ion and the nitrate ion to copper ($SO_4^{2-}$+$NO_3^-$/Cu) is plotted in the horizontal axis, and the ratio (d/D) of the crystallite's diameter to the particle diameter is plotted in the vertical axis; and in FIG. 29, in each pH of the first fluid the total molar ratio of the sulfate ion and the nitrate ion to copper ($SO_4^{2-}$+$NO_3^-$/Cu) is plotted in the horizontal axis, and the crystallite's diameter (d) is plotted in the vertical axis. In Comparative Examples C10 to C12, nitric acid was dissolved in the reducing agent fluid (i.e., second fluid), and by changing the flow rate of the reducing agent fluid (i.e., second fluid), whereby changing the mixing ratio of the copper-dissolved fluid to the reducing agent fluid (i.e., second fluid), the total molar ratio of the sulfate ion and the nitrate ion to the copper in the mixed fluid to be processed was changed. With regard to the results of Comparative Examples C10 to C12, in FIG. 30, the total molar ratio of the sulfate ion and the nitrate ion to copper ($SO_4^{2-}+NO_3^-/Cu$) is plotted in the horizontal axis, and the ratio (d/D) of the crystallite's diameter to the particle diameter is plotted in the vertical axis; and in FIG. 31, the total molar ratio of the sulfate ion and the nitrate ion to copper ($SO_4^{2-}+NO_3^-/Cu$) is plotted in the horizontal axis, and the crystallite's diameter (d) is plotted in the vertical axis.

TABLE 45

| | First fluid: composition | | | | | | |
|---|---|---|---|---|---|---|---|
| Comparative Example | EG Concentration (% by weight) | PW Concentration | $CuSO_4 \cdot 5H_2O$ | $H_2SO_4$ | $(NH_4)_2SO_4$ Concentration (mol/L) | $K_2SO_4$ | $HNO_3$ | $KNO_3$ |
| 1 | 99.0 | 0.9 | 0.00450 | 0.0000 | 0.0000 | 0.0000 | 0.0023 | 0.0000 |
| 2 | 99.0 | 0.9 | 0.00450 | 0.0000 | 0.0000 | 0.0000 | 0.0023 | 0.0004 |
| 3 | 99.0 | 0.9 | 0.00450 | 0.0000 | 0.0000 | 0.0000 | 0.0023 | 0.0009 |
| 4 | 99.0 | 0.9 | 0.00450 | 0.0000 | 0.0000 | 0.0000 | 0.0009 | 0.0000 |
| 5 | 99.0 | 0.9 | 0.00450 | 0.0000 | 0.0000 | 0.0000 | 0.0009 | 0.0004 |
| 6 | 99.0 | 0.9 | 0.00450 | 0.0000 | 0.0000 | 0.0000 | 0.0009 | 0.0009 |
| 7 (Example 7) | 99.0 | 0.9 | 0.00450 | 0.0000 | 0.0000 | 0.0000 | 0.0000 | 0.0000 |
| 8 | 99.0 | 0.9 | 0.00450 | 0.0000 | 0.0000 | 0.0000 | 0.0000 | 0.0004 |
| 9 | 99.0 | 0.9 | 0.00450 | 0.0000 | 0.0000 | 0.0000 | 0.0000 | 0.0009 |
| 10 | 99.0 | 0.9 | 0.00450 | 0.0000 | 0.0000 | 0.0000 | 0.0000 | 0.0000 |
| 11 | 99.0 | 0.9 | 0.00450 | 0.0000 | 0.0000 | 0.0000 | 0.0000 | 0.0000 |
| 12 | 99.0 | 0.9 | 0.00450 | 0.0000 | 0.0000 | 0.0000 | 0.0000 | 0.0000 |

TABLE 46

| | Second fluid: composition | | |
|---|---|---|---|
| Comparative Example | PW Concentration (% by weight) | Ascorbic acid Concentration (mol/L) | $HNO_3$ |
| 1 | 83.6 | 1.00 | 0.0000 |
| 2 | 83.6 | 1.00 | 0.0000 |
| 3 | 83.6 | 1.00 | 0.0000 |
| 4 | 83.6 | 1.00 | 0.0000 |
| 5 | 83.6 | 1.00 | 0.0000 |
| 6 | 83.6 | 1.00 | 0.0000 |
| 7 (Example 7) | 83.6 | 1.00 | 0.0000 |
| 8 | 83.6 | 1.00 | 0.0000 |
| 9 | 83.6 | 1.00 | 0.0000 |
| 10 | 83.6 | 1.00 | 0.0085 |
| 11 | 83.6 | 1.00 | 0.0085 |
| 12 | 83.6 | 1.00 | 0.0085 |

TABLE 47

| Comparative Example | First fluid | | Second fluid | | |
|---|---|---|---|---|---|
| | Supply rate (mL/minute) | Supply temperature (° C.) | Supply rate (mL/minute) | Supply temperature (° C.) | (pH) |
| 1 | 1000 | 150 | 100 | 20 | 2.1 |
| 2 | 1000 | 150 | 100 | 20 | 2.1 |
| 3 | 1000 | 150 | 100 | 20 | 2.1 |
| 4 | 1000 | 150 | 100 | 20 | 2.1 |
| 5 | 1000 | 150 | 100 | 20 | 2.1 |
| 6 | 1000 | 150 | 100 | 20 | 2.1 |
| 7 (Example 7) | 1000 | 150 | 100 | 20 | 2.1 |
| 8 | 1000 | 150 | 100 | 20 | 2.1 |
| 9 | 1000 | 150 | 100 | 20 | 2.1 |
| 10 | 1000 | 150 | 150 | 20 | 2.0 |
| 11 | 1000 | 150 | 50 | 20 | 2.0 |
| 12 | 1000 | 150 | 10 | 20 | 2.0 |

TABLE 48

| Comparative Example | First fluid (pH) | Molar ratio $SO_4^{2-}/Cu$ | Molar ratio $NO_3^-/Cu$ | Molar ratio $(SO_4^{2-} + NO_3^-)/Cu$ | Crystallite's diameter d (nm) | Particle diameter D (nm) | d/D |
|---|---|---|---|---|---|---|---|
| 1 | 2.0 | 1.00 | 0.51 | 1.51 | 111.2 | 734.8 | 0.15 |
| 2 | 2.0 | 1.00 | 0.60 | 1.60 | 68.9 | 678.9 | 0.10 |
| 3 | 2.0 | 1.00 | 0.71 | 1.71 | 132.4 | 954.6 | 0.14 |
| 4 | 2.9 | 1.00 | 0.20 | 1.20 | 99.7 | 534.1 | 0.19 |
| 5 | 2.9 | 1.00 | 0.29 | 1.29 | 54.3 | 678.9 | 0.08 |
| 6 | 2.9 | 1.00 | 0.40 | 1.40 | 121.6 | 897.6 | 0.14 |
| 7 (Example 7) | 4.0 | 1.00 | 0.00 | 1.00 | 169.9 | 504.3 | 0.34 |
| 8 | 4.0 | 1.00 | 0.09 | 1.09 | 76.3 | 688.4 | 0.11 |
| 9 | 4.0 | 1.00 | 0.20 | 1.20 | 77.1 | 764.3 | 0.10 |
| 10 | 4.0 | 1.00 | 0.28 | 1.28 | 94.60 | 687.90 | 0.14 |

TABLE 48-continued

| Comparative Example | First fluid (pH) | Molar ratio $SO_4^{2-}/Cu$ | Molar ratio $NO_3^-/Cu$ | Molar ratio $(SO_4^{2-} + NO_3^-)/Cu$ | Crystallite's diameter d (nm) | Particle diameter D (nm) | d/D |
|---|---|---|---|---|---|---|---|
| 11 | 4.0 | 1.00 | 0.09 | 1.09 | 64.80 | 874.60 | 0.07 |
| 12 | 4.0 | 1.00 | 0.02 | 1.02 | 103.10 | 941.20 | 0.11 |

From Table 48, FIG. 28 to FIG. 31, when the molar ratio of the sulfate ion in the mixed fluid to be processed to the copper in the first fluid ($SO_4^{2-}/Cu$) was made constant while the nitric acid compound was added separately in the first fluid or the second fluid, neither the relationship between the total molar ratio of the sulfate ion and the nitric ion to copper and the crystallite's diameter nor the relationship between the said total molar ratio and the crystallite's diameter relative to the particle diameter could be found; and thus, the ratio (d/D) could not be controlled.

Comparative Examples C13 to C24

The procedure of Examples C1 to C14 was repeated, except that the composition of the copper-dissolved fluid (i.e., first fluid) was changed to those shown in Table 49, the composition of the reducing agent fluid (i.e., second fluid) was changed to those shown in Table 50, and the process conditions were changed to those shown in Table 51, to obtain dry powder of the copper microparticles. The results of them are shown in Table 52. In all of Comparative Examples C13 to C24, the dispersion solutions of the copper microparticles which were discharged from between the processing surfaces 1 and 2 were acidic.

Figure 32:
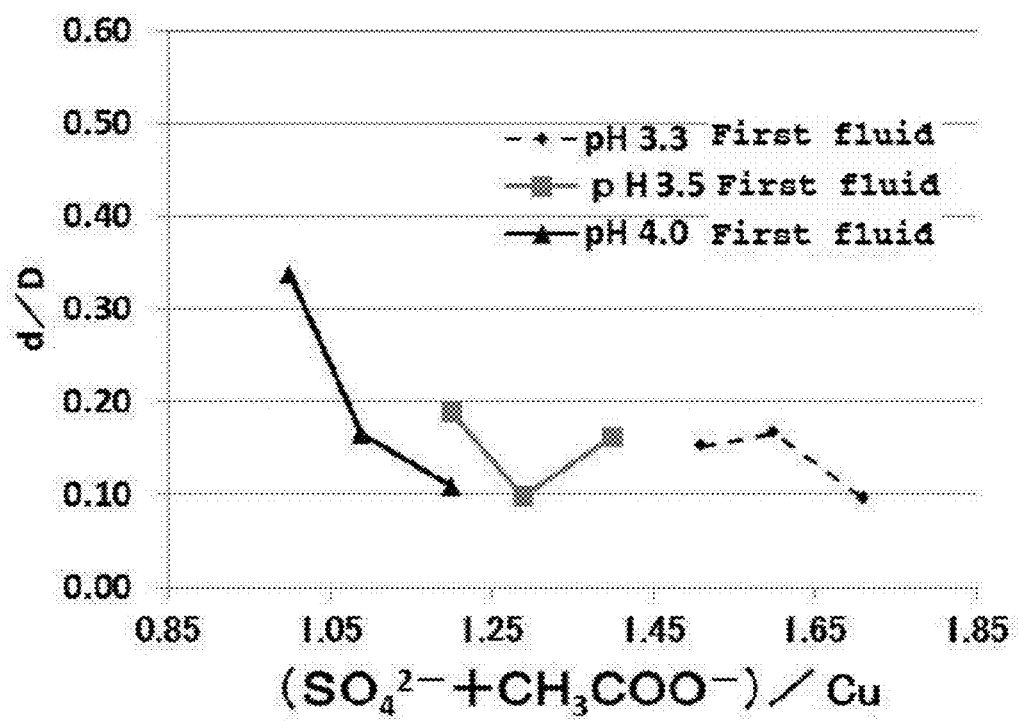
FIG. 32 is the graph in which in each pH of the first fluid the total molar ratio of the sulfate ion and the acetate ion to copper ($SO_4^{2-}+CH_3COO^-/Cu$) is plotted in the horizontal axis, and the ratio (d/D) of the crystallite's diameter to the particle diameter is plotted in the vertical axis in the copper microparticles obtained in Comparative Examples C13 to C21.
Figure 33:
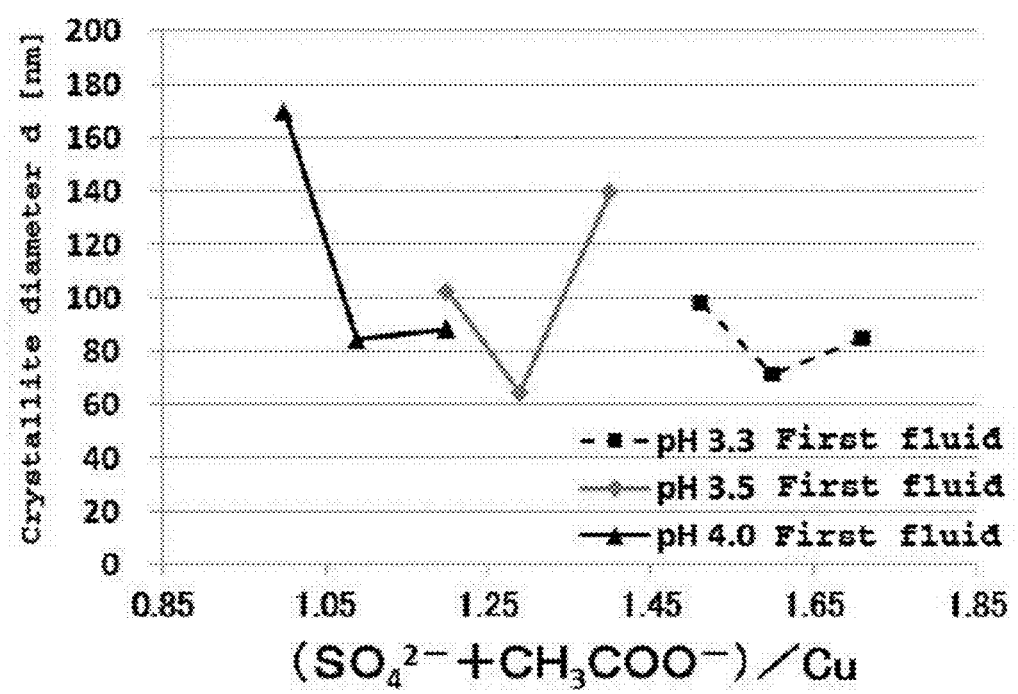
FIG. 33 is the graph in which in each pH of the first fluid the total molar ratio of the sulfate ion and the acetate ion to copper ($SO_4^{2-}+CH_3COO^-/Cu$) is plotted in the horizontal axis, and the crystallite's diameter (d) is plotted in the vertical axis in the copper microparticles obtained in Comparative Examples C13 to C21.
Figure 34:
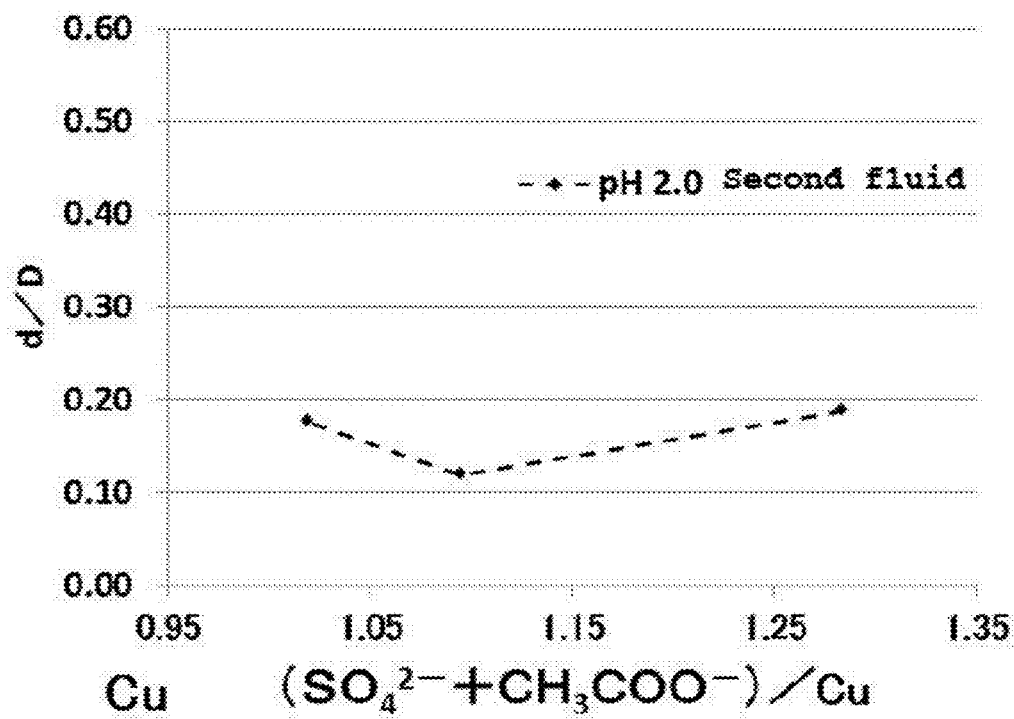
FIG. 34 is the graph in which the total molar ratio of the sulfate ion and the acetate ion to copper ($SO_4^{2-}+CH_3COO^-/Cu$) is plotted in the horizontal axis, and the ratio (d/D) of the crystallite's diameter to the particle diameter is plotted in the vertical axis in the copper microparticles obtained in Comparative Examples C22 to C24.
Figure 35:
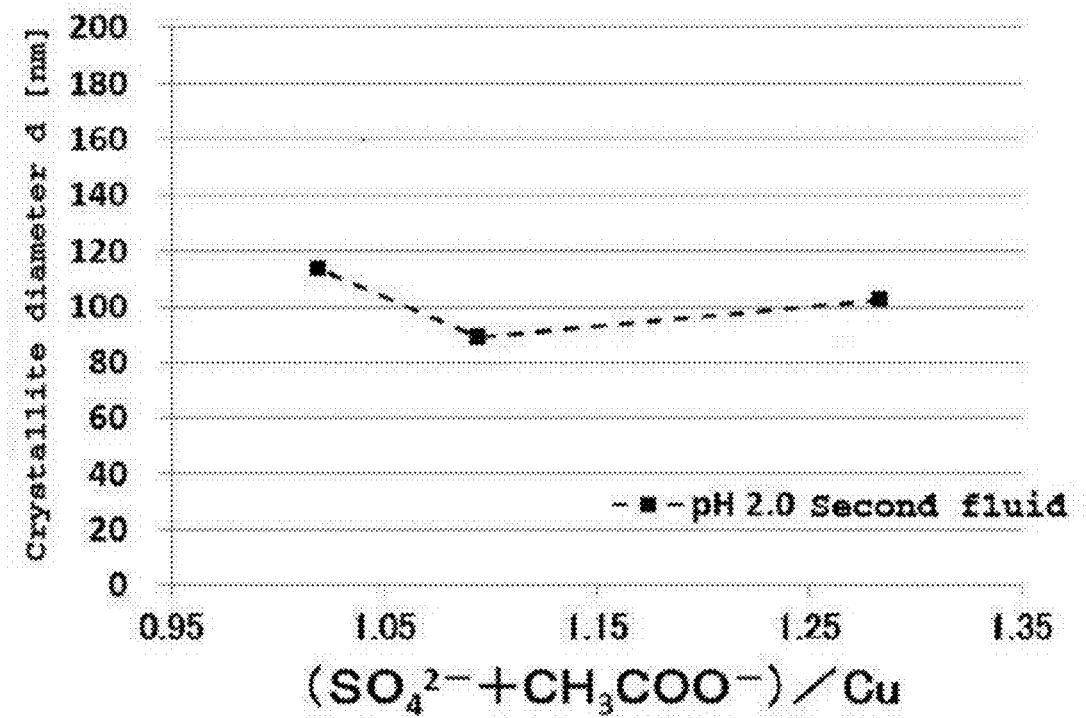
FIG. 35 is the graph in which the total molar ratio of the sulfate ion and the acetate ion to copper ($SO_4^{2-}+CH_3COO^-/Cu$) is plotted in the horizontal axis, and the crystallite's diameter (d) is plotted in the vertical axis in the copper microparticles obtained in Comparative Examples C22 to C24.

The copper-dissolved fluid was prepared as following: after copper sulfate pentahydrate was dissolved in ethylene glycol and pure water, acetic acid and/or potassium acetate was added separately as the acetate acid compound, which is different from Examples C1 to C14 in which the sulfate compounds were separately added. The reducing agent fluid was prepared by dissolving L-ascorbic acid into pure water in Comparative Examples C13 to C21; and in Comparative Examples C22 to C24, the preparation thereof was done by dissolving L-ascorbic acid into pure water followed by addition of acetic acid into it. With regard to the results of Comparative Examples C13 to C21 obtained in Table 52, in FIG. 32, in each pH of the first fluid the total molar ratio of the sulfate ion and the acetate ion to copper ($SO_4^{2-}$+$CH_3COO^-$/Cu) is plotted in the horizontal axis, and the ratio (d/D) of the crystallite's diameter to the particle diameter is plotted in the vertical axis; and in FIG. 33, in each pH of the first fluid the total molar ratio of the sulfate ion and the acetate ion to copper ($SO_4^{2-}$+$CH_3COO^-$/Cu) is plotted in the horizontal axis, and the crystallite's diameter (d) is plotted in the vertical axis. In Comparative Examples C22 to C24, acetic acid was dissolved in the reducing agent fluid (i.e., second fluid), and by changing the flow rate of the reducing agent fluid (i.e., second fluid), whereby changing the mixing ratio of the copper-dissolved fluid to the reducing agent fluid (i.e., second fluid), the total molar ratio of the sulfate ion and the acetate ion to the copper in the mixed fluid to be processed was changed. With regard to the results of Comparative Examples C22 to C24, in FIG. 34, the total molar ratio of the sulfate ion and the acetate ion to copper ($SO_4^{2-}$+$CH_3COO^-$/Cu) is plotted in the horizontal axis, and the ratio (d/D) of the crystallite's diameter to the particle diameter is plotted in the vertical axis; and in FIG. 35, the total molar ratio of the sulfate ion and the acetate ion to copper ($SO_4^{2-}$+$CH_3COO^-$/Cu) is plotted in the horizontal axis, and the crystallite's diameter (d) is plotted in the vertical axis.

TABLE 49

| | First fluid: composition | | | | | | |
|---|---|---|---|---|---|---|---|
| Comparative Example | EG Concentration (% by weight) | PW Concentration (% by weight) | $CuSO_4 \cdot 5H_2O$ (mol/L) | $H_2SO_4$ (mol/L) | $(NH_4)_2SO_4$ (mol/L) | $K_2SO_4$ (mol/L) | $CH_3COOH$ (mol/L) | $CH_3COOK$ (mol/L) |
| 13 | 99.0 | 0.9 | 0.00450 | 0.0000 | 0.0000 | 0.0000 | 0.0023 | 0.0000 |
| 14 | 99.0 | 0.9 | 0.00450 | 0.0000 | 0.0000 | 0.0000 | 0.0023 | 0.0004 |
| 15 | 99.0 | 0.9 | 0.00450 | 0.0000 | 0.0000 | 0.0000 | 0.0023 | 0.0009 |
| 16 | 99.0 | 0.9 | 0.00450 | 0.0000 | 0.0000 | 0.0000 | 0.0009 | 0.0000 |
| 17 | 99.0 | 0.9 | 0.00450 | 0.0000 | 0.0000 | 0.0000 | 0.0009 | 0.0004 |
| 18 | 99.0 | 0.9 | 0.00450 | 0.0000 | 0.0000 | 0.0000 | 0.0009 | 0.0009 |
| 19 (Example 7) | 99.0 | 0.9 | 0.00450 | 0.0000 | 0.0000 | 0.0000 | 0.0000 | 0.0000 |
| 20 | 99.0 | 0.9 | 0.00450 | 0.0000 | 0.0000 | 0.0000 | 0.0000 | 0.0004 |
| 21 | 99.0 | 0.9 | 0.00450 | 0.0000 | 0.0000 | 0.0000 | 0.0000 | 0.0009 |
| 22 | 99.0 | 0.9 | 0.00450 | 0.0000 | 0.0000 | 0.0000 | 0.0000 | 0.0000 |
| 23 | 99.0 | 0.9 | 0.00450 | 0.0000 | 0.0000 | 0.0000 | 0.0000 | 0.0000 |
| 24 | 99.0 | 0.9 | 0.00450 | 0.0000 | 0.0000 | 0.0000 | 0.0000 | 0.0000 |

TABLE 50

| | Second fluid: composition | | |
|---|---|---|---|
| Comparative Example | PW Concentration (% by weight) | Ascorbic acid Concentration (mol/L) | $CH_3COOH$ (mol/L) |
| 13 | 83.6 | 1.00 | 0.0000 |
| 14 | 83.6 | 1.00 | 0.0000 |
| 15 | 83.6 | 1.00 | 0.0000 |
| 16 | 83.6 | 1.00 | 0.0000 |
| 17 | 83.6 | 1.00 | 0.0000 |
| 18 | 83.6 | 1.00 | 0.0000 |
| 19 (Example 7) | 83.6 | 1.00 | 0.0000 |
| 20 | 83.6 | 1.00 | 0.0000 |
| 21 | 83.6 | 1.00 | 0.0000 |
| 22 | 83.6 | 1.00 | 0.0085 |
| 23 | 83.6 | 1.00 | 0.0085 |
| 24 | 83.6 | 1.00 | 0.0085 |

TABLE 51

| Comparative Example | First fluid Supply rate (mL/minute) | First fluid Supply temperature (°C.) | Second fluid Supply rate (mL/minute) | Second fluid Supply temperature (°C.) | (pH) |
|---|---|---|---|---|---|
| 13 | 1000 | 150 | 100 | 20 | 2.1 |
| 14 | 1000 | 150 | 100 | 20 | 2.1 |
| 15 | 1000 | 150 | 100 | 20 | 2.1 |
| 16 | 1000 | 150 | 100 | 20 | 2.1 |
| 17 | 1000 | 150 | 100 | 20 | 2.1 |
| 18 | 1000 | 150 | 100 | 20 | 2.1 |
| 19 (Example 7) | 1000 | 150 | 100 | 20 | 2.1 |
| 20 | 1000 | 150 | 100 | 20 | 2.1 |
| 21 | 1000 | 150 | 100 | 20 | 2.1 |
| 22 | 1000 | 150 | 150 | 20 | 2.0 |
| 23 | 1000 | 150 | 50 | 20 | 2.0 |
| 24 | 1000 | 150 | 10 | 20 | 2.0 |

TABLE 52

| Comparative Example | First fluid (pH) | Molar ratio $SO_4^{2-}$/Cu | Molar ratio $CH_3COO^-$/Cu | Molar ratio ($SO_4^{2-}$ + $CH_3COO^-$)/Cu | Crystallite's diameter d (nm) | Particle diameter D (nm) | d/D |
|---|---|---|---|---|---|---|---|
| 13 | 3.3 | 1.00 | 0.51 | 1.51 | 98.1 | 645.3 | 0.15 |
| 14 | 3.3 | 1.00 | 0.60 | 1.60 | 71.2 | 428.3 | 0.17 |
| 15 | 3.3 | 1.00 | 0.71 | 1.71 | 84.5 | 897.6 | 0.09 |
| 16 | 3.5 | 1.00 | 0.20 | 1.20 | 102.3 | 541.2 | 0.19 |
| 17 | 3.5 | 1.00 | 0.29 | 1.29 | 64.3 | 654.7 | 0.10 |
| 18 | 3.5 | 1.00 | 0.40 | 1.40 | 139.7 | 864.3 | 0.16 |
| 19 (Example 7) | 4.0 | 1.00 | 0.00 | 1.00 | 169.9 | 504.3 | 0.34 |
| 20 | 4.0 | 1.00 | 0.09 | 1.09 | 84.3 | 512.3 | 0.16 |
| 21 | 4.0 | 1.00 | 0.20 | 1.20 | 88.4 | 812.3 | 0.11 |
| 22 | 4.0 | 1.00 | 0.28 | 1.28 | 102.30 | 547.10 | 0.19 |
| 23 | 4.0 | 1.00 | 0.09 | 1.09 | 89.10 | 748.90 | 0.12 |
| 24 | 4.0 | 1.00 | 0.02 | 1.02 | 113.60 | 645.60 | 0.18 |

From Table 52, FIG. 32 to FIG. 35, when the molar ratio of the sulfate ion in the mixed fluid to be processed to the copper in the first fluid ($SO_4^{2-}$/Cu) was made constant while the acetic acid compound was added separately in the first fluid or the second fluid, neither the relationship between the total molar ratio of the sulfate ion and the acetate ion to copper and the crystallite's diameter nor the relationship between the said total molar ratio and the crystallite's diameter relative to the particle diameter could be found; and thus, the ratio (d/D) could not be controlled.

Comparative Examples C25 to C27

To compare with Examples C7 to C9, experiments were carried out by the batch method. The composition of the copper-dissolved fluid (i.e., first fluid) shown in Table 53 was used. The composition of the reducing agent fluid (i.e., second fluid) shown in Table 54 was used. Mixing of the first fluid and the second fluid was done by addition of the second fluid with the flow rate as shown in Table 55 into the first fluid with the amount shown in Table 55 in a beaker with stirring the fluid for the period of 1 minute to mix the copper-dissolved fluid with the reducing agent fluid whereby separating the copper microparticles. The slurry which contains the copper microparticles (dispersion solution of the copper microparticles) was obtained. The composition of the recovery method of the particles and the analysis method thereof were the same as those of the Examples C1 to C14.

TABLE 53

| | First fluid: composition | | | | | |
|---|---|---|---|---|---|---|
| Comparative Example | EG Concentration (% by weight) | PW Concentration (% by weight) | $CuSO_4 \cdot 5H_2O$ Concentration (mol/L) | $H_2SO_4$ Concentration (mol/L) | $(NH_4)_2SO_4$ Concentration (mol/L) | $K_2SO_4$ Concentration (mol/L) |
| 25 | 99.0 | 0.9 | 0.00450 | 0.0000 | 0.0000 | 0.0000 |
| 26 | 99.0 | 0.9 | 0.00450 | 0.0000 | 0.0002 | 0.0000 |
| 27 | 99.0 | 0.9 | 0.00450 | 0.0000 | 0.0002 | 0.0002 |

TABLE 54

| Comparative Example | Second fluid: composition | | |
|---|---|---|---|
| | PW Concentration (% by weight) | Ascorbic acid Concentration (mol/L) | $H_2SO_4$ |
| 25 | 83.6 | 1.00 | 0.0000 |
| 26 | 83.6 | 1.00 | 0.0000 |
| 27 | 83.6 | 1.00 | 0.0000 |

TABLE 55

| Comparative Example | First fluid | | Second fluid | | |
|---|---|---|---|---|---|
| | Supply rate (mL/minute) | Supply temperature (° C.) | Supply rate (mL/minute) | Supply temperature (° C.) | (pH) |
| 25 | 1000 | 150 | 100 | 20 | 2.1 |
| 26 | 1000 | 150 | 100 | 20 | 2.1 |
| 27 | 1000 | 150 | 100 | 20 | 2.1 |

TABLE 56

| Comparative Example | First fluid (PH) | Molar ratio $SO_4^{2-}/Cu$ | Crystallite's diameter d (μm) | Particle diameter D (μm) | d/D |
|---|---|---|---|---|---|
| 25 | 4.0 | 1.00 | 54.1 | 386.4 | 0.14 |
| 26 | 4.0 | 1.04 | 46.9 | 546.7 | 0.09 |
| 27 | 4.0 | 1.09 | 63.9 | 498.6 | 0.13 |

From Table 56, in the batch tests, there was no significant change in the ratio (d/D) of the crystallite's diameter to the particle diameter even if the molar ratio of the sulfate ion in the mixed fluid to be processed to the copper in the first fluid ($SO_4^{2-}/Cu$) was changed. Especially the crystallite's diameters (d) of the copper microparticles obtained in Comparative Examples C25 to C27 were smaller as compared with those of Examples C7 to C9.

As can be clearly seen in Examples C, in the case that a non-aqueous organic solvent represented by a polyol-type (polyvalent alcohol) organic solvent such as ethylene glycol is used together with water as the solvent for the copper-dissolved fluid, the control can be made in such a way that the ratio (d/D) of the crystallite's diameter (d) to the particle diameter (D) of the obtained copper microparticles may become lower by lowering the molar ratio of the sulfate ion in the mixed fluid to be processed to the copper in the copper-dissolved fluid, and also the control can be made in such a way that the ratio (d/D) may become higher by raising the molar ratio of the sulfate ion in the mixed fluid to the copper in the copper-dissolved fluid.

Although not shown in Examples C, even when only the above-mentioned non-aqueous solvent was used as the solvent for the copper-dissolved fluid, the same tendency was confirmed.

Meanwhile, the operations including preparation of these fluids and mixing them in these controls may be done at room temperature as well as an environment other than room temperature.

As discussed above, Examples in which three metals are used are shown, wherein nickel has a higher ionization tendency than hydrogen, copper has a slightly lower ionization tendency than hydrogen, and silver is a metal having a low ionization tendency. Silver and copper are the homologous elements of the group 11 in the periodic table, wherein silver is the precious metal of the fifth period, while copper is a non-precious metal of the fourth period. Nickel, as same as copper, is in the fourth period; but different from copper, it is a metal of the iron group. Accordingly, these three metals have different characteristics with each other; nonetheless, the ratio (d/D) of the crystallite's diameter (d) to the particle diameter (D) becomes possible, so that it is presumed that by execution of the presently applied invention, the same control can be made even in the metals other than these three metals.

In Examples with regard to (A) method for producing nickel microparticle, the acidic nickel compound fluid (i.e., metal fluid) and the basic reducing agent fluid were used, wherein the dispersion solution of the nickel microparticles discharged from between the processing surfaces 1 and 2 was basic. The pH conditions as shown above can be equally applied to silver, copper, and other metals as well.

On the other hand, in each Example with regard to (B) method for producing silver microparticle and (C) method for producing copper microparticle, the acidic silver-containing fluid and the acidic copper-dissolved fluid (i.e., metal fluids) and the acidic reducing agent fluid were used, wherein the dispersion solution of the silver microparticles or of the copper microparticles discharged from between the processing surfaces 1 and 2 was acidic. The pH conditions as shown above can be equally applied to nickel and other metals as well.

1 first processing surface
2 second processing surface
10 first processing member
11 first holder
20 second processing member
21 second holder
d1 first introduction part
d2 second introduction part
d20 opening

The invention claimed is:

1. A method for producing metal microparticle, wherein
   at least two fluids to be processed are used,
   of these fluids to be processed, at least one fluid to be processed is a metal fluid in which a metal or a metal compound is dissolved in a solvent,
   at least one fluid to be processed other than the said fluid to be processed is a reducing agent fluid which contains a reducing agent,
   of these fluids to be processed, at least one fluid to be processed contains a sulfate ion,
   the fluids to be processed are mixed to form a thin film fluid between at least two processing surfaces which are disposed in a position they are faced with each other so as to be able to approach to and separate from each other, at least one of which rotates relative to the other, whereby separating metal microparticle derived from the metal or the metal compound in the metal fluid, and
   by increasing a molar ratio of the sulfate ion to the metal in the mixed fluid to be processed, a ratio (d/D) of a crystallite's diameter (d) of the metal microparticle to a particle diameter (D) of the metal microparticle is controlled to a range of 0.3 or more.

2. The method for producing metal microparticle according to claim 1, wherein of the fluids to be processed, at least one fluid to be processed contains a polyol.

3. The method for producing metal microparticle according to claim 2, wherein
   by increasing at least one of (a) concentration of the metal in the metal fluid, (b) concentration of the sulfate ion in the fluid to be processed before the mixing, and (c) mixing ratio of the fluids to be processed which are going to be mixed, the molar ratio of the metal and the sulfate ion in the mixed fluid to be processed is controlled to increase.

4. The method for producing metal microparticle according to claim 2, wherein
the solvent is a polyol solvent.

5. The method for producing metal microparticle according to claim 2, wherein
when executing the control, the ratio (d/D) of the crystallite's diameter (d) of the metal microparticle to a particle diameter (D) of the metal microparticle is controlled by controlling pH of the mixed fluid to be processed.

6. The method for producing metal microparticle according to claim 2, wherein
when executing the control, the molar ratio of the sulfate ion in the metal fluid and/or the reducing agent fluid to the metal in the metal fluid is changed.

7. The method for producing metal microparticle according to claim 1, wherein
by increasing at least one of (a) concentration of the metal in the metal fluid, (b) concentration of the sulfate ion in the fluid to be processed before the mixing, and (c) mixing ratio of the fluids to be processed which are going to be mixed, the molar ratio of the metal and the sulfate ion in the mixed fluid to be processed is controlled to increase.

8. The method for producing metal microparticle according to claim 7, wherein
the solvent is a polyol solvent.

9. The method for producing metal microparticle according to claim 7, wherein
when executing the control, the ratio (d/D) of the crystallite's diameter (d) of the metal microparticle to a particle diameter (D) of the metal microparticle is controlled by controlling pH of the mixed fluid to be processed.

10. The method for producing metal microparticle according to claim 7, wherein
when executing the control, the molar ratio of the sulfate ion in the metal fluid and/or the reducing agent fluid to the metal in the metal fluid is changed.

11. The method for producing metal microparticle according to claim 1, wherein
the solvent is a polyol solvent.

12. The method for producing metal microparticle according to claim 11, wherein
when executing the control, the ratio (d/D) of the crystallite's diameter (d) of the metal microparticle to a particle diameter (D) of the metal microparticle is controlled by controlling pH of the mixed fluid to be processed.

13. The method for producing metal microparticle according to claim 11, wherein
when executing the control, the molar ratio of the sulfate ion in the metal fluid and/or the reducing agent fluid to the metal in the metal fluid is changed.

14. The method for producing metal microparticle according to claim 1, wherein
when executing the control, the ratio (d/D) of the crystallite's diameter (d) of the metal microparticle to a particle diameter (D) of the metal microparticle is controlled by controlling pH of the mixed fluid to be processed.

15. The method for producing metal microparticle according to claim 14, wherein
when executing the control, pH of the metal fluid and/or the reducing agent fluid which is introduced into between the at least two processing surfaces is controlled in such a way that the said pH is constant under an acidic condition.

16. The method for producing metal microparticle according to claim 14, wherein
when executing the control, pH of the metal fluid and/or the reducing agent fluid which is introduced into between the at least two processing surfaces is changed under an acidic condition.

17. The method for producing metal microparticle according to claim 1, wherein
when executing the control, the molar ratio of the sulfate ion in the metal fluid and/or the reducing agent fluid to the metal in the metal fluid is changed.

18. The method for producing metal microparticle according to claim 1, wherein
the metal or the metal compound comprises at least one of nickel, silver, copper, a nickel compound, a silver compound, or a copper compound.

19. The method for producing metal microparticle according to claim 1, wherein
a first processing surface and a second surface are provided as the at least two processing surfaces,
the fluids to be processed are introduced into between the first processing surface and the second processing surfaces,
by a pressure of the fluids to be processed, a force to move the first processing surface and the second processing surface in a direction to separate with each other is generated,
by this force, a space is kept between the first processing surface and the second processing surface, and
the fluids to be processed which pass through this space kept between the first processing surface and the second processing surface form the thin film fluid.

20. The method for producing metal microparticle according to claim 1, wherein
one of the metal fluid and the reducing agent fluid passes through between the at least two processing surfaces while forming the thin film fluid,
a separate introduction path independent of the flow path through which the one of the metal fluid and the reducing agent fluid runs is arranged,
at least one opening leading to the separate introduction path is arranged in at least any one of the at least two processing surfaces, and
the other of the metal fluid and the reducing agent is introduced from the opening into between the at least two processing surfaces, whereby mixing the metal fluid and the reducing agent fluid to form the thin film fluid.

* * * * *